(12) United States Patent
DeBord et al.

(10) Patent No.: US 11,874,252 B2
(45) Date of Patent: Jan. 16, 2024

(54) APPARATUS AND METHODS FOR ION MANIPULATION HAVING IMPROVED DUTY CYCLE

(71) Applicant: MOBILion Systems, Inc., Chadds Ford, PA (US)

(72) Inventors: John Daniel DeBord, West Grove, PA (US); Liulin Deng, Chester Springs, PA (US); Nathan Paul Roehr, Wilmington, DE (US)

(73) Assignee: MOBILion Systems, Inc., Chadds Ford, PA (US)

( * ) Notice: Subject to any disclaimer, the term of this patent is extended or adjusted under 35 U.S.C. 154(b) by 118 days.

(21) Appl. No.: 17/337,733

(22) Filed: Jun. 3, 2021

(65) Prior Publication Data
US 2021/0382006 A1      Dec. 9, 2021

Related U.S. Application Data

(60) Provisional application No. 63/035,174, filed on Jun. 5, 2020.

(51) Int. Cl.
*G01N 27/623*      (2021.01)
*H01J 49/02*       (2006.01)
(Continued)

(52) U.S. Cl.
CPC ........ *G01N 27/623* (2021.01); *H01J 49/0031* (2013.01); *H01J 49/022* (2013.01);
(Continued)

(58) Field of Classification Search
CPC .. G01N 27/623; H01J 49/0031; H01J 49/022; H01J 49/061; H01J 49/062; H01J 49/10
(Continued)

(56) References Cited

U.S. PATENT DOCUMENTS

| 5,789,745 A | 8/1998 | Martin et al. |
| 6,791,078 B2 | 9/2004 | Giles et al. |

(Continued)

FOREIGN PATENT DOCUMENTS

| EP | 1942340 A1 | 7/2008 |
| GB | 2457769 A | 9/2009 |

(Continued)

OTHER PUBLICATIONS

PCT International Search Report and Written Opinion dated Oct. 27, 2021, for Int'l App. No. PCT/US2021/035641 (14 pages).
(Continued)

*Primary Examiner* — Kiet T Nguyen
(74) *Attorney, Agent, or Firm* — McCarter & English, LLP

(57) ABSTRACT

An apparatus for ion manipulation having improved duty cycle includes first and second separation regions separated by a switch that alternates between guiding ions to each of the separation regions. The separation regions separate the ions based on mobility over respective time periods that at least partially overlap. The apparatus can additionally or alternatively include a pre-separation region that filters ions prior to accumulating ions, thus allowing an accumulation region to accumulate for a longer time period. The apparatus can additionally or alternatively include a plurality of gates along the separation region(s) to simultaneously filter a plurality of ion packets sequentially released into the separation region(s). Methods for ion manipulation having improved duty cycle involve separating ions on two separation regions over first and second time periods that at least partially overlap, pre-filtering ions prior to accumulation and separation, and/or simultaneously filtering a plurality of ions packets are also provided.

18 Claims, 53 Drawing Sheets

(51) Int. Cl.
  *H01J 49/06* (2006.01)
  *H01J 49/00* (2006.01)
  *H01J 49/10* (2006.01)

(52) U.S. Cl.
  CPC .......... *H01J 49/061* (2013.01); *H01J 49/062* (2013.01); *H01J 49/10* (2013.01)

(58) Field of Classification Search
  USPC ................................................ 250/281, 282
  See application file for complete search history.

(56) References Cited

U.S. PATENT DOCUMENTS

| | | |
|---|---|---|
| 6,794,641 B2 | 9/2004 | Bateman et al. |
| 6,800,846 B2 | 10/2004 | Bateman et al. |
| 6,812,453 B2 | 11/2004 | Bateman et al. |
| 6,872,939 B2 | 3/2005 | Bateman et al. |
| 6,884,995 B2 | 4/2005 | Bateman et al. |
| 6,891,157 B2 | 5/2005 | Bateman et al. |
| 6,914,241 B2 | 7/2005 | Giles et al. |
| 7,071,467 B2 | 7/2006 | Bateman |
| 7,095,013 B2 | 8/2006 | Bateman et al. |
| 7,154,088 B1 | 12/2006 | Blain et al. |
| 7,157,698 B2 | 1/2007 | Makarov et al. |
| 7,205,538 B2 | 4/2007 | Bateman et al. |
| 7,342,224 B2 | 3/2008 | Makarov et al. |
| 7,405,401 B2 | 7/2008 | Hoyes |
| 7,456,394 B2 | 11/2008 | Cameron et al. |
| 7,491,930 B2 | 2/2009 | Shvartsburg et al. |
| 7,507,953 B2 | 3/2009 | Makarov et al. |
| 7,514,676 B1 | 4/2009 | Page et al. |
| 7,714,278 B2 | 5/2010 | Boyle et al. |
| 7,781,728 B2 | 8/2010 | Senko et al. |
| 7,829,841 B2 | 11/2010 | Bateman et al. |
| 7,838,826 B1 | 11/2010 | Park |
| 7,888,635 B2 | 2/2011 | Belov et al. |
| 7,960,694 B2 | 6/2011 | Hoyes |
| 8,288,717 B2 | 10/2012 | Park |
| 8,319,177 B2 | 11/2012 | Boyle et al. |
| 8,378,297 B2 | 2/2013 | Vidal-De-Miguel |
| 8,384,024 B2 | 2/2013 | Miller et al. |
| 8,389,933 B2 | 3/2013 | Hoyes |
| 8,487,240 B2 | 7/2013 | Koehl |
| 8,581,177 B2 | 11/2013 | Kovtoun |
| 8,581,178 B2 | 11/2013 | Miller et al. |
| 8,742,339 B2 | 6/2014 | Hoyes |
| 8,809,769 B2 | 8/2014 | Park |
| 8,829,464 B2 | 9/2014 | Hoyes et al. |
| 8,835,839 B1 | 9/2014 | Anderson et al. |
| 8,901,490 B1 | 12/2014 | Chen et al. |
| 8,907,273 B1 | 12/2014 | Chen et al. |
| 8,921,772 B2 | 12/2014 | Verenchikov |
| 8,941,054 B2 | 1/2015 | Park et al. |
| 8,941,055 B2 | 1/2015 | Park et al. |
| 8,946,626 B2 | 2/2015 | Giles et al. |
| 8,969,800 B1 | 3/2015 | Tolmachev et al. |
| 9,063,086 B1 | 6/2015 | Garimella et al. |
| 9,082,604 B2 | 7/2015 | Verenchikov |
| 9,123,516 B2 | 9/2015 | Hasegawa et al. |
| 9,123,518 B2 | 9/2015 | Giles et al. |
| 9,281,170 B2 | 3/2016 | Park et al. |
| 9,281,172 B2 | 3/2016 | Bateman et al. |
| 9,417,211 B2 | 8/2016 | Verenchikov |
| 9,425,035 B2 | 8/2016 | Giles et al. |
| 9,429,543 B2 | 8/2016 | Jiang et al. |
| 9,455,132 B2 | 9/2016 | Mordehai et al. |
| 9,683,964 B2 | 6/2017 | Park et al. |
| 9,704,701 B2 | 7/2017 | Ibrahim et al. |
| 9,741,552 B2 | 8/2017 | Park et al. |
| 9,812,311 B2 | 11/2017 | Anderson et al. |
| 9,865,442 B2 | 1/2018 | Giles et al. |
| 9,880,129 B2 | 1/2018 | Bateman |
| 9,887,074 B2 | 2/2018 | Belov |
| 9,939,408 B2 | 4/2018 | Giles et al. |
| 9,939,409 B2 | 4/2018 | Ibrahim et al. |
| 9,966,244 B2 | 5/2018 | Anderson et al. |
| 10,018,592 B2 | 7/2018 | Ibrahim et al. |
| 10,032,617 B2 | 7/2018 | Welkie |
| 10,060,879 B2 | 8/2018 | Silveira |
| 10,192,728 B2 | 1/2019 | Zhang et al. |
| 10,224,194 B2 | 3/2019 | Ibrahim et al. |
| 10,224,196 B2 | 3/2019 | Giles et al. |
| 10,241,079 B2 | 3/2019 | Betz et al. |
| 10,317,362 B2 | 6/2019 | Harder et al. |
| 10,317,364 B2 | 6/2019 | Garimella et al. |
| 10,319,575 B2 | 6/2019 | Brown et al. |
| 10,332,723 B1 | 6/2019 | Ibrahim et al. |
| 10,408,792 B2 | 9/2019 | Betz et al. |
| 10,424,474 B2 | 9/2019 | Ibrahim et al. |
| 10,446,381 B2 | 10/2019 | Giles et al. |
| 10,460,920 B1 | 10/2019 | Smith |
| 10,466,202 B2 | 11/2019 | Ibrahim et al. |
| 10,473,620 B2 | 11/2019 | Harder et al. |
| 10,497,552 B2 | 12/2019 | Ibrahim et al. |
| 10,522,337 B2 | 12/2019 | Rizzo et al. |
| 10,665,443 B2 | 5/2020 | Ibrahim et al. |
| 10,692,710 B2 | 6/2020 | Prabhakaran et al. |
| 10,720,315 B2 | 7/2020 | Taghioskoui |
| 10,741,375 B2 | 8/2020 | Hamid et al. |
| 10,804,089 B2 | 10/2020 | Ibrahim et al. |
| 10,811,244 B2 | 10/2020 | Green et al. |
| 10,840,077 B2 | 11/2020 | Taghioskoui |
| 10,861,687 B2 | 12/2020 | Wildgoose et al. |
| 10,976,283 B2 | 4/2021 | Ibrahim et al. |
| 11,209,393 B2 | 12/2021 | Garimella et al. |
| 11,293,898 B2 | 4/2022 | Prasad et al. |
| 11,322,340 B2 | 5/2022 | Hamid et al. |
| 11,460,439 B2 | 10/2022 | DeBord et al. |
| 11,543,384 B2 | 1/2023 | DeBord et al. |
| 2008/0308721 A1 | 12/2008 | Senko et al. |
| 2009/0090853 A1 | 4/2009 | Schoen et al. |
| 2012/0153140 A1 | 6/2012 | Makarov |
| 2016/0071715 A1 | 3/2016 | Anderson et al. |
| 2017/0213713 A1 | 7/2017 | Green et al. |
| 2017/0338093 A1* | 11/2017 | Green .................. G01N 27/622 |
| 2018/0236426 A1 | 8/2018 | Finlay |
| 2019/0004011 A1 | 1/2019 | Garimella et al. |
| 2019/0056352 A1 | 2/2019 | Ibrahim et al. |
| 2019/0103261 A1 | 4/2019 | Ibrahim et al. |
| 2019/0348268 A1 | 11/2019 | Hamid et al. |
| 2019/0369049 A1 | 12/2019 | Ridgeway |
| 2019/0369050 A1 | 12/2019 | Garimella et al. |
| 2020/0161119 A1 | 5/2020 | Richardson et al. |
| 2020/0200708 A1 | 6/2020 | Ibrahim et al. |
| 2020/0227247 A1 | 7/2020 | Boumsellek et al. |
| 2020/0278319 A1 | 9/2020 | Melhrist et al. |
| 2020/0321190 A1 | 10/2020 | Ibrahim et al. |
| 2020/0321208 A1 | 10/2020 | Cooks et al. |
| 2020/0326304 A1 | 10/2020 | Giles et al. |
| 2020/0373139 A1 | 11/2020 | DeBord et al. |
| 2020/0378922 A1 | 12/2020 | Ibrahim et al. |
| 2020/0381241 A1 | 12/2020 | Park et al. |
| 2020/0395202 A1 | 12/2020 | Richardson et al. |
| 2021/0080429 A1 | 3/2021 | DeBord et al. |
| 2021/0310989 A1 | 10/2021 | DeBord et al. |
| 2021/0364467 A1 | 11/2021 | DeBord et al. |
| 2022/0074891 A1 | 3/2022 | DeBord et al. |
| 2022/0128509 A1 | 4/2022 | Giles et al. |
| 2022/0136999 A1 | 5/2022 | Garimella et al. |
| 2022/0365027 A1 | 11/2022 | Makarov |
| 2023/0008420 A1 | 1/2023 | Krioutchkov et al. |
| 2023/0052193 A1 | 2/2023 | Krioutchkov et al. |
| 2023/0103674 A1 | 4/2023 | DeBord et al. |
| 2023/0187194 A1 | 6/2023 | Deng et al. |

FOREIGN PATENT DOCUMENTS

| | | |
|---|---|---|
| WO | 2005/031290 A2 | 4/2005 |
| WO | 2020/079446 A1 | 4/2020 |
| WO | 2020/201732 A1 | 10/2020 |
| WO | 2020/240197 A1 | 12/2020 |
| WO | 2020/243194 A1 | 12/2020 |
| WO | 2021/247820 A1 | 12/2021 |

(56) References Cited

FOREIGN PATENT DOCUMENTS

OTHER PUBLICATIONS

PCT Invitation to Pay Additional Fees dated Aug. 16, 2021, for Int'l App. No. PCT/US2021/035641 (2 pages).
N. Agbonknkon, "Counter-flow Ion Mobility Analysis: Design, Instrumentation, and Characterization," Theses and Dissertations 1215, Nov. 14, 2007, https://scholarsarchive.byu.edu/etd/1215 (230 pages).
Donohoe, et al., "A New Ion Mobility—Linear Ion Trap Instrument for Complex Mixture Analysis," Anal. Chem., vol. 86, Iss. 16, pp. 8121-8128, Aug. 19, 2014 (17 pages).
Henderson et al., "ESI/Ion Trap/Ion Mobility/Time-of-Flight Mass Spectrometry for Rapid and Sensitive Analysis of Biomolecular Mixtures," Anal. Chem., vol. 71, Iss. 2, pp. 291-301, Jan. 15, 1999 (Abstract only—1 page).
Hoaglund-Hyzer et al., "Ion Trap/Ion Mobility/Quadrupole/Time-of-Flight Mass Spectrometry for Peptide Mixture Analysis," Anal. Chem., vol. 73, Iss. 2, pp. 177-184, Jan. 15, 2001 (Abstract only—1 page).
Ibrahim et al., "Development of a New Ion Mobility (Quadrupole) Time-of-Flight Mass Spectrometer," Int'l Journal of Mass Spectrometry, 377 (2015) 655-662, Jul. 28, 2014 (8 pages).
Jiang et al., "Ion Mobility—Mass Spectrometry," Encyclopedia of Anal. Chem., 2013, DOI: 10.1002/9780470027318. a9292 (21 pages).
Li et al., "Ion Mobility Spectrometry with High Ion Utilization Efficiency Using Traveling Wave-Based Structures for Lossless Ion Manipulations (SLIM)," poster presented at the Proceedings of the 68th ASMS Conference on Mass Spectrometry and Allied Topics, Online Meeting, Jun. 1-12, 2020 (1 page).
Li et al., "Ion Mobility Spectrometry with High Ion Utilization Efficiency Using Traveling Wave-Based Structures for Lossless Ion Manipulations," Anal. Chem., vol. 92, Iss. 22, pp. 14930-14938, Oct. 26, 2020 (9 pages).
Wu et al., "Separation of Isomeric Peptides Using Electrospray Ionization/High-Resolution Ion Mobility Spectrometry," Anal. Chem., vol. 72, Iss. 2, pp. 391-395, Jan. 15, 2000 (Abstract only—1 page).
Zhang et al., "Ion Trapping, Storage, and Ejection in Structures for Lossless Ion Manipulations," Anal. Chem. 2015, 87, 6010-6016, May 14, 2015 (7 pages).
Benigni et al., "Oversampling Selective Accumulation Trapped Ion Mobility Spectrometry Coupled to FT-ICR MS: Fundamentals and Applications," Anal. Chem., 2016, 88, pp. 7404-7412, published Jun. 24, 2016 (9 pages).
Brodeur et al., "Experimental Investigation of the Ion Surfing Transport Method," Int'l Journal of Mass Spec., vol. 336, pp. 53-60, Feb. 2013 (8 pages).
Chen et al., "Mobility-Selected Ion Trapping and Enrichment Using Structures for Lossless Ion Manipulations," Anal. Chem., 2016, 88, pp. 1728-1733, published Jan. 11, 2016 (6 pages).
Eaton et al., "Principles of Ion Selection, Alignment, and Focusing in Tandem Ion Mobility Implemented Using Structures for Lossless Ion Manipulations (SLIM)," J. Am. Soc. Mass Spectrom., vol. 30, pp. 1115-1125, Apr. 2019 (11 pages).
F. W. Schmidlin, "A New Nonlevitated Mode of Traveling Wave Toner Transport," IEEE, Copyright 1988 (5 pages).
G. Bollen, "Ion Surfing' with Radiofrequency Carpets," Int'l Journal of Mass Spec., vol. 299, pp. 131-138, Jan. 2011 (8 pages).
Hamid et al., "Characterization of Traveling Wave Ion Mobility Separations in Structures for Lossless Ion Manipulations," Anal. Chem., 2015, 87, pp. 11301-11308, published Oct. 28, 2015 (8 pages).
Masuda et al., "Movement of Blood Cells in Liquid by Nonuniform Traveling Field," IEEE Transactions on Industry Applications, vol. 24, No. 2, pp. 217-222, Mar./Apr. 1988 (6 pages).
Webb et al., "Mobility-Resolved Ion Selection in Uniform Drift Field Ion Mobility Spectrometry/Mass Spectrometry: Dynamic Switching in Structures for Lossless Ion Manipulations," Anal. Chem., 2014, 86, pp. 9632-9637, published Sep. 15, 2014 (6 pages).

\* cited by examiner

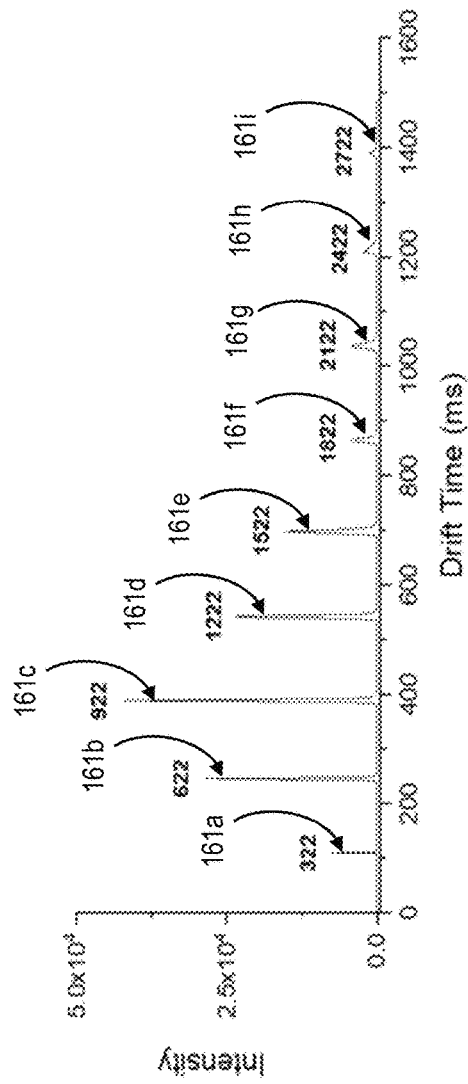
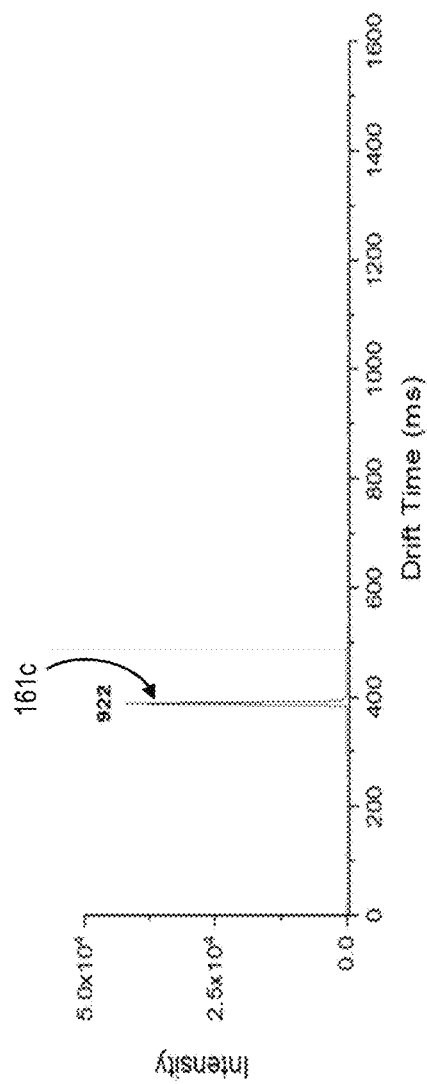
FIG. 7A
FIG. 7B

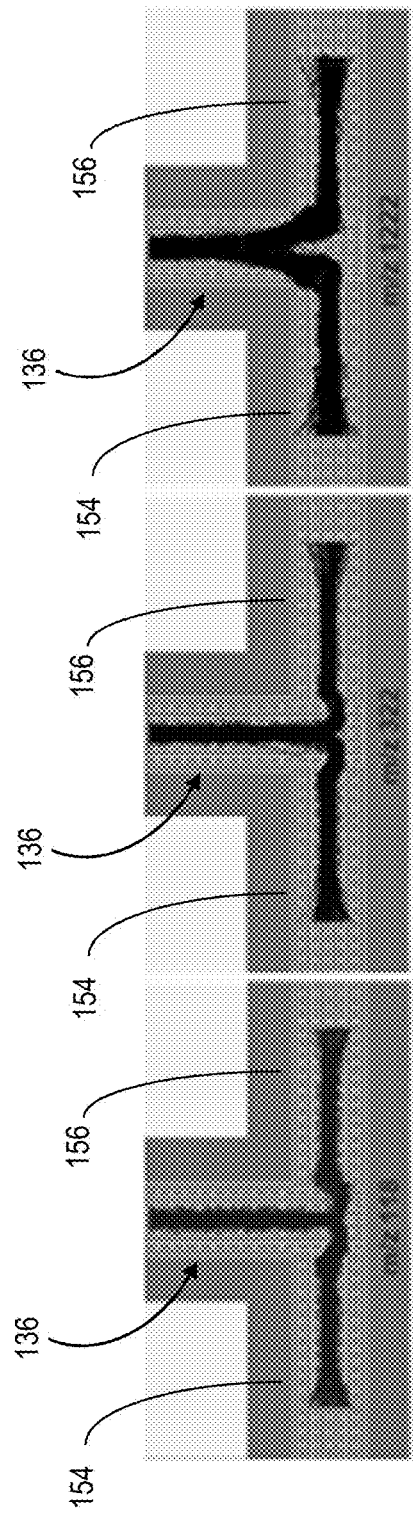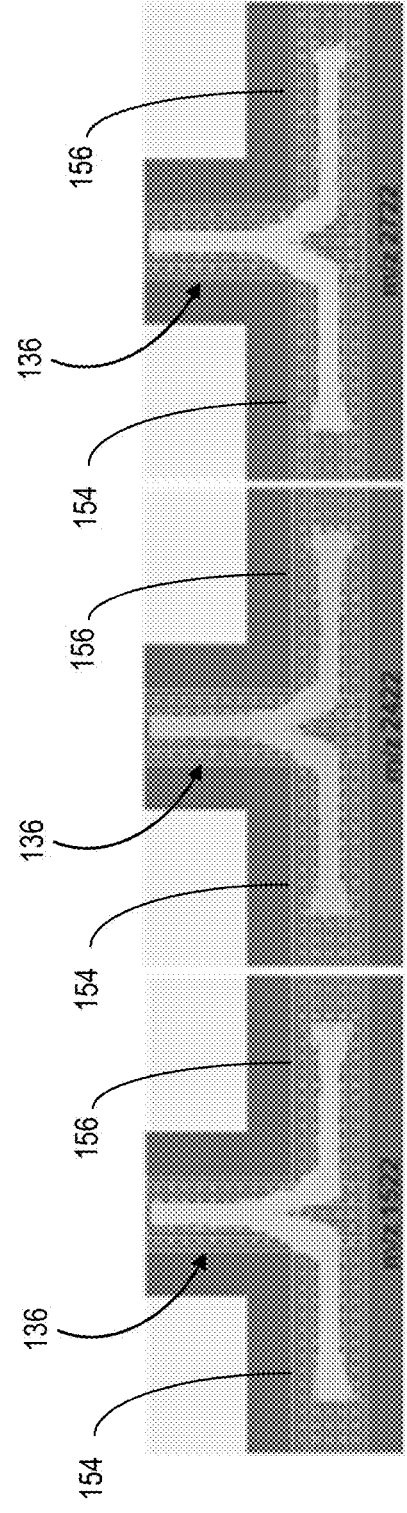

APPARATUS AND METHODS FOR ION MANIPULATION HAVING IMPROVED DUTY CYCLE

CROSS-REFERENCE TO RELATED APPLICATIONS

The present application claims the benefit of priority to U.S. Provisional Patent Application No. 63/035,174, filed on Jun. 5, 2020, which is herein incorporated by reference in its entirety.

TECHNICAL FIELD

The present disclosure relates generally to the fields of ion mobility spectrometry (IMS) and mass spectrometry (MS). More specifically, the present disclosure relates to apparatus and methods for ion manipulation having improved duty cycle.

RELATED ART

IMS is a technique for separating and identifying ions in gaseous phase based on their mobilities. For example, IMS can be employed to separate structural isomers and macromolecules that have different sizes or shapes. IMS relies on applying a constant or a time-varying electric field to a mixture of ions within a static or dynamic background gas. An ion having a larger mobility (or smaller collision cross section [CCS]) moves faster under the influence of the electric field compared to an ion with a smaller mobility (or larger CCS). By applying the electric field over a separation distance (e.g., in a drift tube) of an IMS device, ions from an ion mixture can be temporally or spatially separated based on their mobility. Because ions with different mobilities arrive at the end of the drift tube at different times (temporal separation) they can be identified based on the time of detection by a detector at the end of the drift tube. Resolution of the mobility separation can be varied by changing the separation distance.

MS is an analytical technique that can separate a mixture of chemical species based on their mass-to-charge ratio. MS involves ionizing the mixture of chemical species followed by acceleration of the ion mixture in the presence of electric and/or magnetic fields. In some mass spectrometers, ions having the same mass-to-charge ratio undergo the same deflection or time dependent response. Ions with different mass-to-charge ratios can undergo different deflections or time dependent response and can be identified based on the spatial or temporal position of detection by a detector (e.g., electron multiplier).

IMS combined with MS can generate an IMS-MS spectrum that can be used in a broad range of applications, including metabolomics, glycomics, and proteomics. IMS-MS ion separation can be performed by coupling an ion mobility spectrometer with a mass spectrometer. For example, an ion mobility spectrometer can first separate the ions based on their mobility. Ions having different mobilities can arrive at the mass spectrometer at different times, and are then separated based on their mass-to-charge ratio. One example of an IM spectrometer is a structure for lossless ion manipulations (SLIM) device that can generate an IMS spectrum with minimal ion loss. SLIM devices can use traveling wave separation as one technique to separate ions of different mobilities as they traverse a path thereof.

However, IMS devices that implement time based separation techniques can have low duty cycles associated therewith. That is, the time spent accumulating ions prior to separation can be much lower than the amount of time spent separating the ions. For example, a SLIM device that separates ions for 1.5 seconds, but accumulates ions for only 15 milliseconds will have a 1% duty cycle. In contrast, IMS devices that implement space based separation techniques, such as differential mobility separation (DMS) devices and field asymmetric ion mobility spectrometry (FAIMS) devices, can have higher duty cycles associated therewith. However, such IMS devices can intrinsically have lower transmission efficiency, resolution and sensitivity, when compared to IMS devices that implement time-based separation techniques. Moreover, these time-based IMS devices are also limited by space-charge effects, which limit the number of ions that can be accumulated prior to separation, and thus limit the amount of time for which an IMS device can accumulate ions prior to separation and the number of targeted ions that can be accumulated in a single ion packet.

Accordingly, there is a need for additional systems and methods for ion manipulation that have an increased duty cycle and address the above-identified challenges.

SUMMARY

The present disclosure relates to apparatus and methods for ion manipulation having improved duty cycle.

In accordance with embodiments of the present disclosure, exemplary apparatus for ion manipulation having improved duty cycle are provided. An apparatus for ion manipulation having improved duty cycle includes a first separation region configured to receive ions and generate a first traveling drive potential, a second separation region configured to receive ions and generate a second traveling drive potential, and a switch configured to receive ions and alternate between generating a first electric field and a second electric field. The first electric field is configured to guide a first portion of the ions toward the first separation region and the second electric field is configured to guide a second portion of the ions toward the second separation region. The first separation region is positioned between the switch and an exit region, and the second separation region is positioned between the switch and the exit region. The first traveling drive potential is configured to guide the first portion of the ions to the exit region through the first separation region and separate the first portion of the ions based on mobility of the ions during a first separation time period. The second traveling drive potential is configured to guide the second portion of the ions to the exit region through the second separation region and separate the second portion of the ions based on mobility of the ions during a second separation time period, which at least partially overlaps with the first time period.

In one aspect, the switch can be configured to accumulate the first portion of the ions prior to generating the first electric field, and accumulate the second portion of the ions prior to generating the second electric field. In another aspect, the first and second separation regions can have a substantially nonlinear configuration. In such aspects, at least a portion of the first and second separation regions can be nested.

In another aspect, the apparatus can include a pre-filter region and an accumulation region positioned between the switch and the first separation region. The pre-filter region can be configured to receive the first portion of the ions from the switch and perform a first ion mobility filtering operation on the first portion of the ions to separate the first portion of the ions into a first group of ions and a second group of ions based on mobility of the ions. The accumulation region can be configured to receive the first group of ions from the pre-filter region, accumulate the first group of ions into a packet, and release the packet into the first separation region, which can be configured to separate the ions based on mobility of the ions. The pre-filter region can be configured to selectively reduce the amount of ions provided to the accumulation region and increase the amount of time the accumulation region can accumulate ions. In such aspects, the pre-filter region can include a separation path and a pre-filter switch. The separation path can be positioned between the switch and the pre-filter switch, and the pre-filter switch can be positioned between the separation path and the accumulation region. Additionally, the separation path can be configured to generate a third traveling drive potential, which can be configured to separate the ions based on mobility of the ions, and the pre-filter switch can be configured to operate in a first mode of operation where the pre-filter switch transfers the first group of ions entering the pre-filter switch from the separation path to the accumulation region and a second mode of operation where the pre-filter switch transfers the second group of ions entering the pre-filter switch from the separation path to a discard region.

In other aspects, the apparatus can include a plurality of gates positioned along the first separation region, which can be configured to successively filter ions based on mobility. In such aspects, the accumulation region can be configured to accumulate ions into a plurality of separate ion packets and sequentially release the plurality of separate ion packets into the first separation region, which can be configured to simultaneously separate the plurality of separate ion packets. Additionally, the plurality of gates can be configured to simultaneously filter the ions of two or more of the plurality of separate ion packets released into the first separation region.

In such aspects, each of the plurality of gates can include a guard electrode configured to switch between generating a third electric field that repels ions and a fourth electric field that attracts ions. Alternatively, each of the plurality of gates can be configured to switch between generating the first traveling drive potential that guides the ions through the first separation region and a third traveling drive potential that removes ions from the first separation region.

In other aspects where the apparatus includes a plurality of gates positioned along the separation region, the switch can be configured to receive a plurality of ions, accumulate the plurality of ions into a plurality of separate ion packets, and release two or more of the plurality of separate ion packets into the first separation region, which can be configured to simultaneously separate the ions of the two or more separate ion packets, and the plurality of gates can be configured to simultaneously filter the ions of the two or more separate ion packets released into the first separation region. In such aspects, each of the plurality of gates can include a guard electrode configured to switch between generating a third electric field that repels ions and a fourth electric field that attracts ions. Alternatively, each of the plurality of gates can be configured to switch between generating the first traveling drive potential that guides the ions through the first separation region and a third traveling drive potential that removes ions from the first separation region.

In other aspects, the apparatus can include an accumulation region configured to accumulate ions into a plurality of ion packets and release the plurality of ion packets into a transfer region positioned between the accumulation region and the switch, and the transfer region can be configured to generate a third traveling drive potential, the third traveling drive potential configured to guide the plurality of ion packets through the transfer region and to the switch.

In still other aspects, the apparatus can include a pre-filter region, an accumulation region, and a transfer region. The pre-filter region can be configured to receive the plurality of ions and perform a first ion mobility filtering operation on the plurality of ions to separate the ions into a first group of ions and a second group of ions based on mobility of the ions. The accumulation region can be configured to receive the first group of ions from the pre-filter region, accumulate the first group of ions into one or more ion packets, and release the one or more ion packets into the transfer region, which can be configured to transfer the one or more ion packets to the switch. Additionally, the pre-filter region can be configured to reduce the amount of ions provided to the accumulation region and increase the amount of time the accumulation region can accumulate ions.

In other aspects, the apparatus can include a third second separation region that is configured to receive ions and generate a third traveling drive potential. The switch can be configured to receive ions and alternate between guiding the first portion of the ions toward the first separation region, the second portion of the ions toward the second separation region, and a third portion of the ions toward the third separation region. The third separation region can be positioned between the switch and the exit region, and the third traveling drive potential can be configured to guide the third portion of the ions to the exit region through the third separation region and separate the third portion of the ions based on mobility of the ions during a third separation time period. In such aspects, the first separation time period, the second separation time period, and the third separation time period can at least partially overlap.

An apparatus for ion manipulation having improved duty cycle includes a pre-filter region, an accumulation region, and an ion mobility separation region. The pre-filter region is configured to receive ions and perform a first ion mobility filtering operation on the ions to separate the ions into a first group of ions and a second group of ions based on mobility of the ions. The accumulation region is configured to receive the first group of ions from the pre-filter region, accumulate the first group of ions into an ion packet, and release the ion packet into the ion mobility separation region configured separate the ions based on mobility of the ions. The pre-filter region is configured to reduce the amount of ions provided to the accumulation region and increase the amount of time the accumulation region can accumulate ions.

In some aspects, the pre-filter region can include a separation path and a pre-filter switch, the pre-filter switch positioned between the separation path and the accumulation region. In such aspects, the separation path can be configured to generate a first traveling drive potential that is configured to separate the ions based on mobility of the ions, and the pre-filter switch can be configured to be operable in a first mode of operation where the pre-filter switch transfers the first group of ions entering the pre-filter switch from the separation path to the accumulation region, and a second mode of operation where the pre-filter switch transfers the second group of ions entering the pre-filter switch from the separation path to a discard region. In such aspects, when the pre-filter switch is in the first mode of operation it can generate a second traveling drive potential that transfers ions to the accumulation region, and when in the second mode of operation it can generate a third traveling drive potential that transfers ions to the discard region.

In other aspects, the apparatus can include a plurality of gates positioned along the ion mobility separation region that are configured to successively filter ions based on mobility. In such aspects, the accumulation region can be configured to accumulate ions into a plurality of separate ion packets and sequentially release the plurality of separate ion packets into the ion mobility separation region, which can be configured to simultaneously separate the plurality of separate ion packets, and the plurality of gates can be configured to simultaneously filter the ions of two or more of the plurality of separate ion packets released into the ion mobility separation region. In such aspects, each of the plurality of gates can include a guard electrode that is configured to switch between generating a first electric field that repels ions and a second electric field that attracts ions. In other such aspects, the ion mobility separation region can generate a first traveling drive potential that is configured to guide the ions of the plurality of ion packets through the ion mobility separation region and separate the ions based on mobility of the ions, and each of the plurality of gates can be configured to switch between generating the first traveling drive potential that guides the ions through the ion mobility separation region and a second traveling drive potential that removes ions from the ion mobility separation region.

An apparatus for ion manipulation having improved duty cycle includes an accumulation region, an ion mobility separation path, and a plurality of gates positioned along the ion mobility separation path. The accumulation region is configured to receive a plurality of ions, accumulate the plurality of ions into a plurality of separate ion packets, and sequentially release the plurality of separate ion packets into the ion mobility separation path. The ion mobility separation path is configured to receive the plurality of ion packets from the accumulation region and generate a traveling drive potential that is configured to simultaneously guide the ions of each of the plurality of ion packets through the ion mobility separation path and simultaneously separate the ions of each of the plurality of ion packets based on mobility of the ions. The plurality of gates are configured to simultaneously filter the ions of each of the plurality of separate ion packets.

In some aspects, each of the plurality of gates can include a guard electrode that is configured to switch between generating a first electric field that repels ions and a second electric field that attracts ions. In other aspects, each of the plurality of gates can be configured to switch between generating the traveling drive potential that guides the ions through the ion mobility separation region and a second traveling drive potential that removes ions from the ion mobility separation region.

In other aspects, the ion mobility separation region can have a substantially nonlinear configuration. In such aspects, the ion mobility separation region can include a plurality of turns, and each of the plurality of gates can be positioned at one of the turns.

A method for ion manipulation having improved duty cycle involves providing a first plurality of ions to an ion manipulation device that has a first separation region, a second separation region, a switch configured to receive ions and alternate between guiding ions to the first separation region and the second separation region, and an exit region. The first separation region and the second separation region are positioned between the switch and the exit region. The method also involves receiving, at the switch, the first plurality of ions, and guiding, by the switch, the first plurality of ions to the first separation region. The method also includes providing a second plurality of ions to the ion manipulation device, receiving the second plurality of ions at the switch, and guiding, by the switch, the second plurality of ions to the second separation region. The method additionally includes separating the first plurality of ions based on mobility of the ions by the first separation region during a first separation time period, and separating the second plurality of ions based on mobility of the ions by the second separation region during a second separation time period that at least partially overlaps the first separation time period.

In some aspects, the switch can be configured to alternate between generating a first electric field and a second electric field. In such aspects, the step of guiding the first plurality of ions to the first separation region by the switch can involve applying a first voltage signal to the switch and generating, by the switch, the first electric field based on the first voltage signal. The first electric field can guide the first plurality of ions to the first separation region. Additionally, in such aspects, the step of guiding the second plurality of ions to the second separation region by the switch can involve applying a second voltage signal to the switch and generating, by the switch, the second electric field based on the second voltage signal. The second electric field can guide the second plurality of ions to the second separation region. In such aspects, the first electric field can comprise a first traveling drive potential, and the second electric field can comprise a second traveling drive potential.

In other aspects, the first separation region can be configured to generate a first traveling drive potential and the second separation region can be configured to generate a second traveling drive potential. In such aspects, the step of separating the first plurality of ions based on mobility of the ions by the first separation region can also involve applying a first voltage signal to the first separation region, and generating, by the first separation region, the first traveling drive potential based on the first voltage signal, where the first traveling drive potential guides the first plurality of ions through the first separation region to the exit region and separates the ions based on mobility of the ions during the first separation time period. Also, in such aspects, the step of separating the second plurality of ions based on mobility of the ions by the second separation region can also involve applying a second voltage signal to the second separation region, and generating, by the second separation region, the second traveling drive potential based on the second voltage signal, where the second traveling drive potential guides the second plurality of ions through the second separation region to the exit region and separates the ions based on mobility of the ions during the second separation time period that at least partially overlaps the first separation time period.

In some other aspects, the method can involve accumulating, by the switch, the first plurality of ions prior to guiding, by the switch, the first plurality of ions to the first separation region, and accumulating, by the switch, the second plurality of ions prior to guiding, by the switch, the second plurality of ions to the second separation region.

In some other aspects, the first and second separation regions can have a substantially nonlinear configuration. In such aspects, at least a portion of the first and second separation regions can be nested.

In still other aspects, the method can further involve providing the ion manipulation device with a pre-filter region and an accumulation region positioned between the switch and the first separation region. In such aspects, the method can also involve receiving, at the pre-filter region, the first plurality of ions from the switch. This method can also include filtering, by the pre-filter region, the first plurality of ions into a first group of ions and a second group of ions based on mobility of the ions. This method can further include receiving the first group of ions at the accumulation region, accumulating the first group of ions into an ion packet by the accumulation region, and releasing the ion packet into the first separation region. This method can also include separating the ions of the ion packet based on mobility of the ions by the first separation region.

In such aspects, the pre-filter region can be configured to reduce the amount of ions received by the accumulation region and increase the amount of time in which the accumulation region accumulates ions.

In other such aspects, the pre-filter region can include a separation path and a pre-filter switch. The separation path can be positioned between the switch and the pre-filter switch, and the pre-filter switch can be positioned between the separation path and the accumulation region. In such aspects, the method can further include applying a first voltage signal to the separation path, and generating, by the separation path, a first traveling drive potential based on the first voltage signal, which separates the first plurality of ions based on mobility of the ions. This method can also include operating the pre-filter switch in in a first mode of operation, and transferring, by the pre-filter switch operating in the first mode of operation, the first group of ions entering the pre-filter switch from the separation path to the accumulation region. This method can further include operating the pre-filter switch in a second mode of operation, and transferring, by the pre-filter switch operating in the second mode of operation, the second group of ions entering the pre-filter switch from the separation path to a discard region.

In some aspects the ion manipulation device can include a plurality of gates positioned along the first separation region, which can be configured to successively filter ions based on mobility. In such aspects, the method can involve accumulating the first group of ions into a plurality of separate ion packets by the accumulation region, releasing the plurality of separate ion packets into the first separation region sequentially, and filtering the ions of two or more of the plurality of separate ion packets released into the first separation region simultaneously with the plurality of gates. In some such aspects, each of the plurality of gates can include a guard electrode that is configured to switch between generating a first electric field that repels ions and a second electric field that attracts ions. In other such aspects, each of the plurality of gates can be configured to switch between generating a first traveling drive potential that guides the ions through the first separation region and a second traveling drive potential that removes ions from the first separation region.

In some aspects, the ion manipulation device can include a plurality of gates positioned along the first separation region, which can be configured to successively filter ions based on mobility. In such aspects, the method can also involve accumulating the first plurality of ions into a plurality of separate ion packets by the switch, releasing two or more of the plurality of separate ion packets into the first separation region, and filtering the ions of the two or more ion packets released into the first separation region simultaneously with the plurality of gates. In some such aspects, each of the plurality of gates can include a guard electrode that is configured to switch between generating a first electric field that repels ions and a second electric field that attracts ions. In some other such aspects, each of the plurality of gates can be configured to switch between generating a first traveling drive potential that guides the ions through the first separation region and a second traveling drive potential that removes ions from the first separation region.

In some aspects, the method can further include accumulating the plurality of ions into a plurality of ion packets by an accumulation region of the ion manipulation device, releasing the plurality of ion packets from the accumulation region of the ion manipulation device into a transfer region positioned between the accumulation region and the switch, and guiding the plurality of ion packets through the transfer region and to the switch.

In some other aspects, the method can further include receiving the plurality of ions at a pre-filter region of the ion manipulation device, filtering the plurality of ions by the pre-filter region to separate the plurality of ions into a first group of ions and a second group of ions based on mobility of the ions, receiving the first group of ions at an accumulation region of the ion manipulation device, accumulating the first group of ions into one or more ion packets by the accumulation region, releasing the one or more ion packets from the accumulation region into a transfer region of the ion manipulation device, and transferring the one or more ion packets to the switch by the accumulation region. In such aspects, the pre-filter region can be configured to reduce the amount of ions received by the accumulation region and increase the amount of time the accumulation region can accumulate ions.

A method for ion manipulating having improved duty cycle includes providing a plurality of ions to an ion manipulation device having a pre-filter region, an accumulation region, and an ion mobility separation region. The method further includes receiving the plurality of ions at the pre-filter region, and filtering the plurality of ions by the pre-filter region into a first group of ions and a second group of ions based on mobility of the ions. The method also includes receiving the first group of ions at the accumulation region, and accumulating the first group of ions into an ion packet. The method additionally includes releasing the ion packet into the ion mobility separation region, and separating the ions of the first group of ions based on mobility of the ions by the ion mobility separation region.

In some aspects, the pre-filter region can be configured to selectively reduce the amount of ions received by the accumulation region and increase the amount of time that the accumulation region accumulates ions for.

In other aspects, the pre-filter region can include a separation path and a pre-filter switch, the pre-filter switch positioned between the separation path and the accumulation region. In such aspects, the method can further include applying a first voltage signal to the separation path and generating a first traveling drive potential based on the first voltage signal by the separation path, where the first traveling drive potential separates the plurality of ions based on mobility of the ions. This method can also include operating the pre-filter switch in a first mode of operation and transferring, by the pre-filter switch operating in the first mode of operation, the first group of ions entering the pre-filter switch from the separation path to the accumulation region. This method can also include operating the pre-filter switch in a second mode of operation, and transferring, by the pre-filter switch operating in the second mode of operation, the second group of ions entering the pre-filter switch from the separation path to a discard region.

In such aspects, the step of operating the pre-filter switch in the first mode of operation can involve applying a second voltage signal to the pre-filter switch and generating a second traveling drive potential based on the second voltage signal by the pre-filter switch, where the second traveling drive potential guides the first group of ions entering the pre-filter switch to the accumulation region. In this method, the step of operating the pre-filter switch in the second mode of operation can involve applying a third voltage signal to the pre-filter switch and generating a third traveling drive potential based on the third voltage signal by the pre-filter switch, where the third traveling drive potential guiding the second group of ions entering the pre-filter to the discard region.

In other aspects, the ion manipulation device can include a plurality of gates positioned along the ion mobility separation region, the plurality of gates configured to successively filter ions based on mobility. In such aspects, the method can also include accumulating the first group of ions into a plurality of separate ion packets with the accumulation region, sequentially releasing the plurality of separate ion packets into the ion mobility separation region from the accumulation region, and simultaneously filtering the ions of two or more of the plurality of separate ion packets released into the ion mobility separation region with the plurality of gates. In some such aspects, each of the plurality of gates can include a guard electrode that is configured to switch between generating a first electric field that repels ions and a second electric field that attracts ions. In other such aspects, the ion mobility separation region can generate a first traveling drive potential that is configured to guide the ions of the plurality of ion packets through the ion mobility separation region and separate the ions based on mobility of the ions, and each of the plurality of gates can be configured to switch between generating the first traveling drive potential that guides the ions through the ion mobility separation region and a second traveling drive potential that removes ions from the ion mobility separation region.

A method of ion manipulation having improved duty cycle involves providing a plurality of ions to an ion manipulation device having an accumulation region, an ion mobility separation region, and a plurality of gates positioned along the ion mobility separation region. The method further includes receiving the plurality of ions at the accumulation region, and accumulating the plurality of ions into a plurality of separate ion packets by the accumulation region. The method further involves applying a first voltage signal to the ion mobility separation region, and generating a first traveling drive potential based on the first voltage signal by the ion mobility separation region, where the first traveling drive potential guides the ions of the plurality of ion packets through the ion mobility separation region and separates the ions of the plurality of ion packets based on mobility of the ions. The method also involves simultaneously filtering the plurality of ion packets released into the ion mobility separation region with the plurality of gates.

In some aspects, each of the plurality of gates can include a guard electrode that is configured to switch between generating a first electric field that repels ions and a second electric field that attracts ions. In other aspects, each of the plurality of gates can be configured to switch between generating the first traveling drive potential that guides the ions through the ion mobility separation region and a second traveling drive potential that removes ions from the ion mobility separation region.

In other aspects, the ion mobility separation region can have a substantially nonlinear configuration. In such aspects, the ion mobility separation region can include a plurality of turns. Also, in such aspects, each of the plurality of gates can be positioned at one of the plurality of turns.

Other features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The foregoing features of the present disclosure will be apparent from the following Detailed Description of the Invention, taken in connection with the accompanying drawings, in which:

FIG. 7A shows a first plot of intensity as a function of time illustrating an arrival time distribution for a plurality of ions having different mobilities moving through the SLIM filter of FIG. 4 under the influence of an AC traveling waveform when ion gates of the SLIM filter are deactivated;

FIG. 7B shows a second plot of intensity as a function of time illustrating an arrival time distribution for the plurality of ions of FIG. 7A moving through the SLIM filter of FIG. 4 under the influence of an AC traveling waveform when the ion gates of the SLIM filter are periodically activated to filter ions;

FIGS. 8A-F are enlarged views of the Area 8-8 of FIG. 4 showing an exit of the SLIM filter of FIG. 4 where two ion paths combine and showing the flow path for ions having mass to charge ratios (m/z) of 118, 322, 1222, 1522, 2422, and 2722;

DETAILED DESCRIPTION

The present disclosure relates to apparatus and methods for ion manipulation having improved duty cycle, as described in detail below in connection with FIGS. 1-33.

Ions can be separated based on their mobility via ion mobility spectrometry (IMS). Mobility separation can be achieved, for example, by applying one or more potential waveforms (e.g., traveling potential waveforms, direct current (DC) potential, or both) on a collection of ions. IMS-based separations can be achieved by structures for lossless ion manipulation (SLIM) that can systematically apply traveling and/or DC potential waveforms to a collection of ions, such as the devices disclosed and described in U.S. Pat. No. 8,835,839 entitled "Method and Apparatus for Ion Mobility Separations Utilizing Alternating Current Waveforms" and U.S. Pat. No. 10,317,364 entitled "Ion Manipulation Device," both of which are incorporated herein by reference in their entirety. This can result in a continuous stream of ions that are temporally/spatially separated based on their mobility. In some implementations, it can be desirable to select ions having a predetermined mobility range from a collection of ions. This can be achieved by mobility-based filtering of ions in SLIM devices ("SLIM filters"). SLIM filters (e.g., low pass filters, high pass filters, band pass filters, etc.) can apply a superposition to multiple potential waveforms that are directed (e.g., traveling) in different directions (e.g., in two-dimensions). Properties of the potential waveforms (e.g., amplitude, shape, frequency, etc.) can determine the properties of the SLIM filter (e.g., bandwidth, cut-off mobility values, etc.).

The present disclosure utilizes the aforementioned SLIM devices to not only transfer and separate ions of different mobilities, but to also accumulate ions within the respective SLIM device for subsequent separation and analysis. In this regard, different waveforms can be applied to different regions of the SLIM device, e.g., one or more electrodes grouped together, to trap ions in an accumulation region until the space-charge limit is reached or a sufficient number of ions are accumulated.

Figure 1:
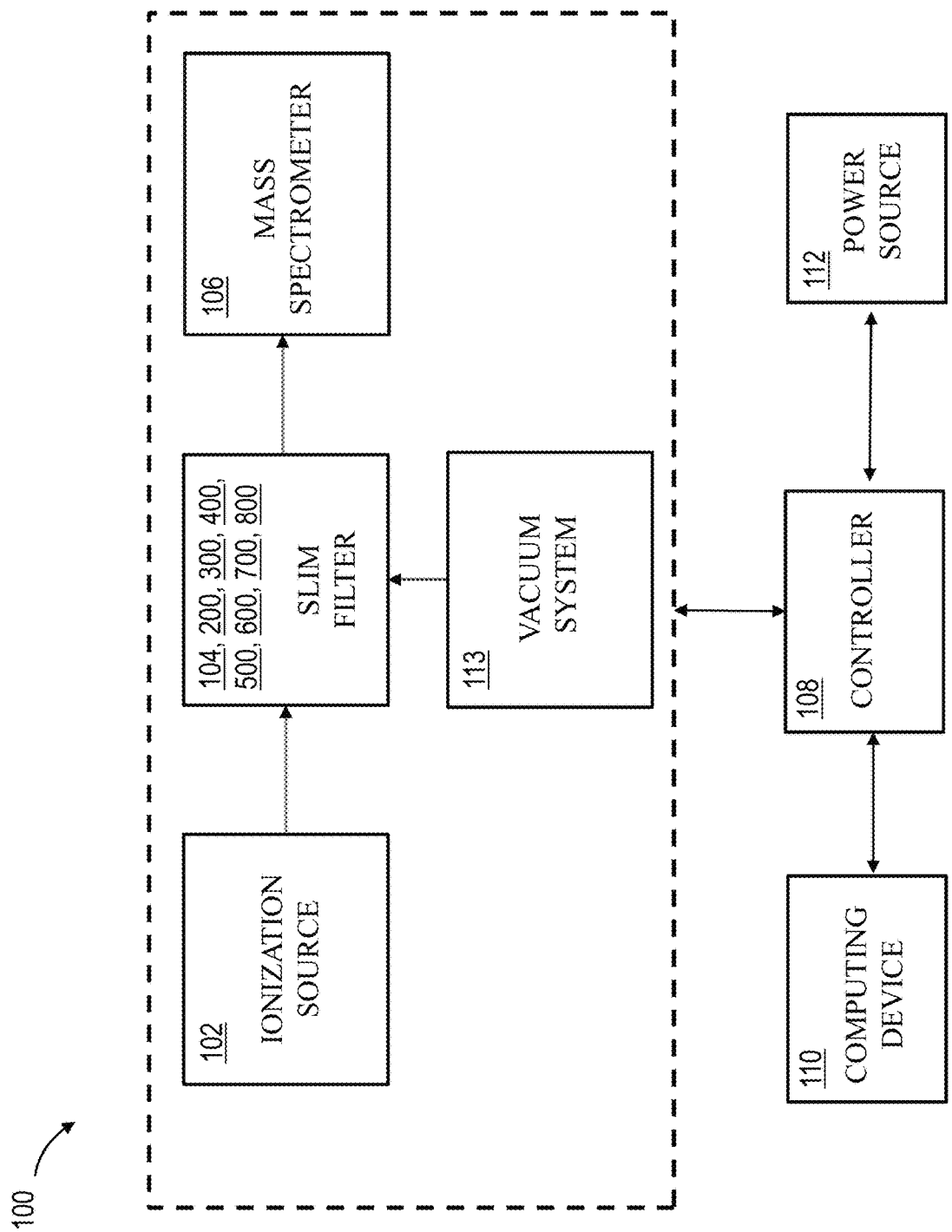
FIG. 1 is a schematic diagram of an exemplary ion mobility separation (IMS) system of the present disclosure.

FIG. 1 is a schematic diagram of an exemplary ion mobility separation (IMS) system 100 in accordance with the present disclosure. The IMS system 100 includes an ionization source 102, a SLIM filter 104, a mass spectrometer 106, a controller 108, a computing device 110, a power source 112, and a vacuum system 113. The ionization source 102 generates ions (e.g., ions having varying mobility and mass-to-charge-ratios) and injects the ions into the SLIM filter 104 (discussed in greater detail in connection with FIGS. 2-7). The SLIM filter 104 can be configured to transfer ions, accumulate ions, separate ions, filter ions, and/or store ions (enrichment) depending on the desired functionality and waveforms applied thereto. In this regard, the SLIM filter 104 can be used to select ions with one or more predetermined ranges of mobility and direct the selected band (or bands) of ions to a detector, e.g., the mass spectrometer 106. The vacuum system 113 can be in fluidic communication with the SLIM filter 104 and regulate the gas pressure within the SLIM filter 104. Specifically, the vacuum system 113 can provide nitrogen to the SLIM filter 104 while maintaining the pressure therein at a consistent pressure.

Figure 2:
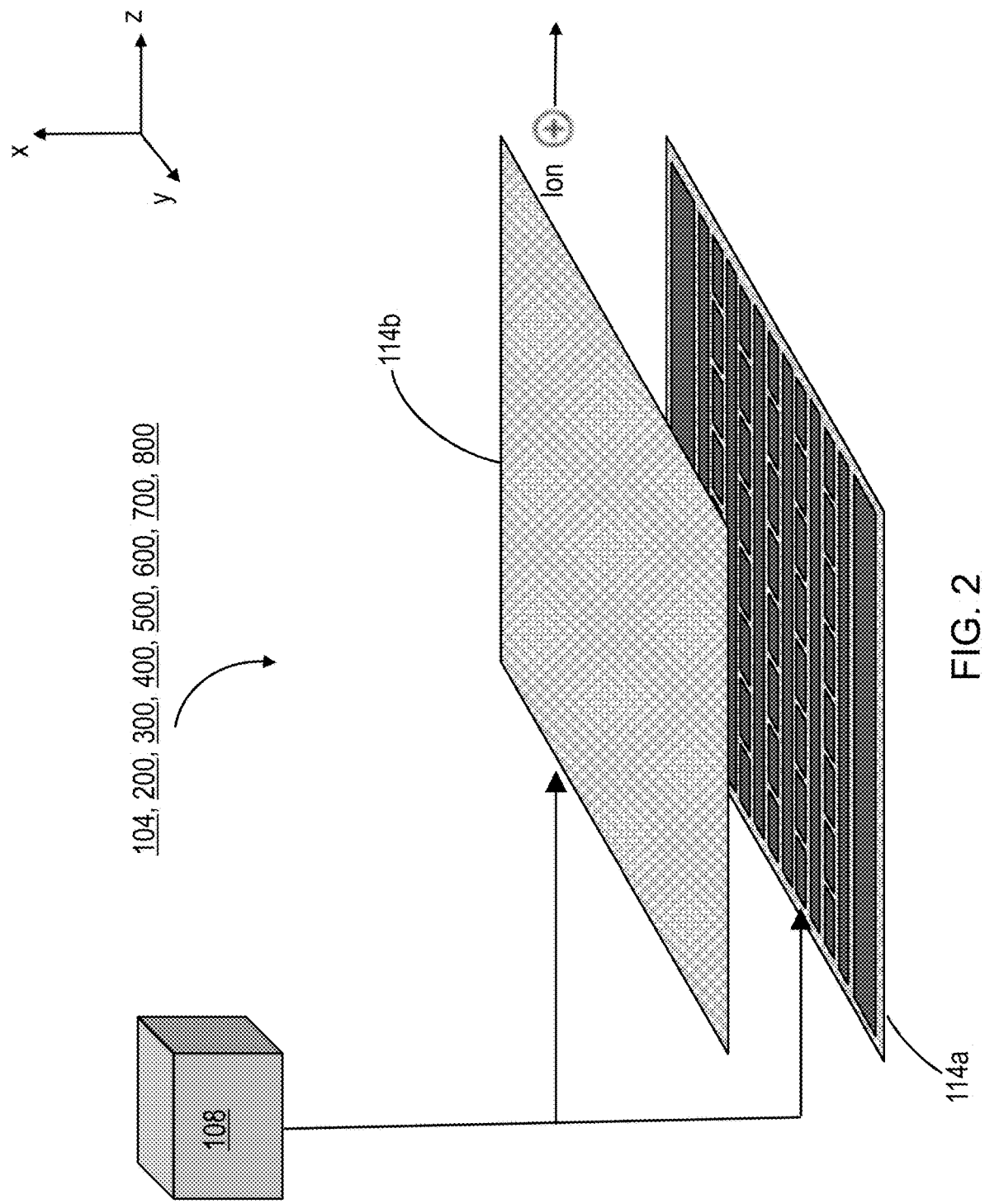
FIG. 2 is a diagrammatic view of a portion of an exemplary SLIM filter that can be used with the IMS system of FIG. 1.

As shown in FIG. 2, the SLIM filter 104 can include one or more surfaces 114a, 114b (e.g., printed circuit board surfaces) that can have a plurality of electrodes arranged thereon. The electrodes can receive voltage signals, a voltage waveform, and/or a current waveform (e.g., a DC voltage or current, an RF voltage or current, or an AC voltage or current, or a superposition thereof), and can generate a potential (e.g., a potential gradient) to confine ions in the SLIM filter 104, accumulate ions in the SLIM filter 104, and guide ions through the SLIM filter 104, which can result in the accumulation and separation of ions based on their mobility, as discussed in greater detail below.

The controller 108 can control operation of the ionization source 102, the SLIM filter 104, the mass spectrometer 106, and the vacuum system 113. For example, the controller 108 can control the rate of injection of ions into the SLIM filter 104 by the ionization source 102, the threshold mobility of the SLIM filter 104, and ion detection by the mass spectrometer 106. The controller 108 can also control the characteristics and motion of potential waveforms in the SLIM filter 104 (e.g., by applying RF/AC/DC potentials to the electrodes of the SLIM filter 104) in order to transfer, accumulate, and/or separate ions. Moreover, the controller 108 can control the timing, various switches, gates, and regions of the SLIM filter 104, as discussed in greater detail below.

The controller 108 can control the generation of potential waveforms by applying RF/AC/DC potentials to the electrodes of the SLIM filter 104. The controller 108 can control the properties of the potential waveforms (e.g., amplitude, shape, frequency, etc.) by varying the properties of the applied RF/AC/DC potential (or current). In this regard, the controller 108 can vary the properties of the potential waveforms for different regions of the SLIM filter 104, e.g., different groupings of electrodes, to trap/accumulate ions and subsequently separate ions, or open and close gates to filter ions. This can be done in an effort to increase ion mobility resolution, increase signal-to-noise ratio, achieve sharp separation around a targeted mobility, and increase duty cycle (e.g., the ratio of time accumulating ions to the time it takes for the ions to travel through the SLIM filter 104).

The controller 108 can receive power from the power source 112, which can be, for example, a DC power source that provides DC voltage to the controller 108. The controller 108 can include multiple power supply modules (e.g., current and/or voltage supply circuits) that generate various voltage (or current) signals that drive the electrodes of the SLIM filter 104. For example, the controller 108 can include RF control circuits that generate RF voltage signals, traveling wave control circuits that generate traveling wave voltage signals, DC control circuits that generate DC voltage signals, etc. The RF voltage signals, traveling wave voltage signals, and DC voltage signals can be applied to the electrodes of the SLIM filter 104. The controller 108 can also include a master control circuit that can control the operation of the RF/traveling wave/DC control circuits. For example, the master control circuit can control the amplitude and/or phase of voltage (or current) signals generated by the RF/traveling wave/DC control circuits to achieve a desirable operation of the mobility filter system 100.

As discussed above, the SLIM filter 104 can generate DC/traveling potential waveforms (e.g., resulting from potentials generated by multiple electrodes in the SLIM filter 104) and DC potentials, which can perform mobility-based separations and cause ion accumulation. The traveling potential waveform can travel at a predetermined speed based on, for example, frequency of voltage signals applied to the electrodes. In some implementations, the traveling potential waveform can be spatially periodic and the spatial periodicity can depend on the phase differences between the voltage signals applied to adjacent electrode pairs. In some implementations, the phase differences can determine the direction of propagation of the potential waveform. In some implementations, the waveform applied to accumulation/trapping/gate electrodes can control accumulation of ions in the SLIM filter 104. The master control circuit can control the frequency and/or phase of voltage outputs of RF/traveling wave/DC control circuits such that the traveling potential waveform has a desirable (e.g., predetermined) spatial periodicity and/or speed, and the accumulation waveforms/potentials sufficiently restrict ion motion and thus accumulate ions.

In some implementations, the controller 108 can be communicatively coupled to a computing device 110. For example, the computing device 110 can provide operating parameters of the IMS system 100 via a control signal to the master control circuit. In some implementations, a user can provide the computing device 110 (e.g., via a user interface) with the operating parameters. Based on the operating parameters received via the control signal, the master control circuit can control the operation of the RF/AC/DC control circuits which in turn can determine the operation of the coupled SLIM filter 104. In some implementations, RF/AC/DC control circuits can be physically distributed over the IMS system 100. For example, one or more of the RF/AC/DC control circuits can be located in the IMS system 100, and the various RF/AC/DC control circuits can operate based on power from the power source 150.

FIG. 2 is a diagrammatic view of a portion of an exemplary SLIM filter 104 that can be used with the IMS system 100 of FIG. 1. The SLIM filter 104 includes a first surface 114a and a second surface 114b. The first and second surfaces 114a, 114b can be arranged (e.g., parallel to one another) to define one or more ion channels there between. The first surface 114a and the second surface 114b can include electrodes 116, 118a-f, 120a-e, 122a-h (see FIG. 3), e.g., arranged as arrays of electrodes on the surfaces facing the ion channel. The electrodes 116, 118a-f, 120a-e, 122a-h on the first surface 114a and second surface 114b can be electrically coupled to the controller 108 and receive voltage (or current) signals or waveforms therefrom. In some implementations, the first surface 114a and second surface 114b can include a backplane that includes multiple conductive channels that allow for electrical connection between the controller 108 and the electrodes 116, 118a-f, 120a-e, 122a-h on the first surface 114a and the second surface 114b. In some implementations, the number of conductive channels can be fewer than the number of electrodes 116, 118a-f, 120a-e, 122a-h. In other words, multiple electrodes 116, 118a-f, 120a-e, 122a-h can be connected to a single electrical channel. As a result, a given voltage (or current) signal can be transmitted to multiple electrodes 116, 118a-f, 120a-e, 122a-h simultaneously. Based on the received voltage (or current) signals, the electrodes 116, 118a-f, 120a-e, 122a-h can generate one or more potentials (e.g., a superposition of various potentials) that can confine, drive, and/or separate ions along a propagation axis (e.g., z-axis).

Figure 3:
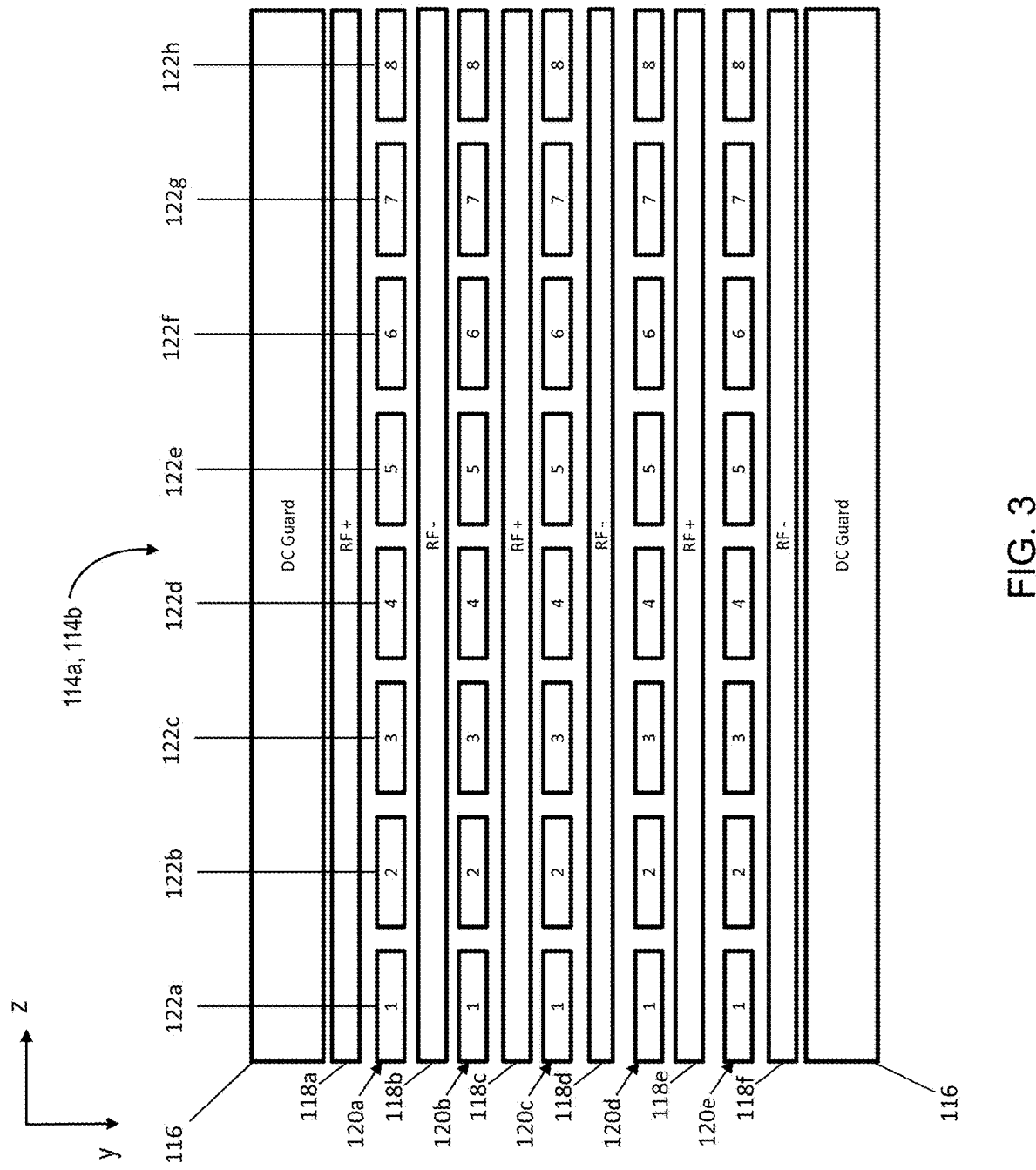
FIG. 3 is a schematic diagram illustrating an exemplary arrangement of electrodes on a surface of the SLIM filter of FIG. 2.

FIG. 3 is a schematic diagram of the first and second surfaces 114a, 114b of the SLIM filter 104 illustrating a first exemplary arrangement of electrodes 116, 118a-f, 120a-e, 122a-h thereon. The first and second surfaces 114a, 114b can be substantially mirror images relative to a parallel plane, and thus it should be understood that the description of the first surface 114a applies equally to the second surface 114b, and the second surface 114b can include electrodes with similar electrode arrangement to the first surface 114a.

The first surface 114a includes guard electrodes 116, a plurality of continuous electrodes 118a-f, and a plurality of segmented electrode arrays 120a-e. Each of the plurality of continuous electrodes 118a-f can receive voltage (or current) signals, or can be connected to ground potential, and can generate a pseudopotential that can prevent or inhibit ions from approaching the first surface 114a. The plurality of continuous electrodes 118a-f can be rectangular in shape with the longer edge of the rectangle arranged along the direction of propagation of ions undergoing mobility separation, e.g., along the propagation axis which is parallel to the z-axis shown in FIG. 3. The plurality of continuous electrodes 118a-f can be separated from each other along a lateral direction, e.g., along the y-axis, which can be perpendicular to the direction of propagation, e.g., the z-axis.

Figure 4:
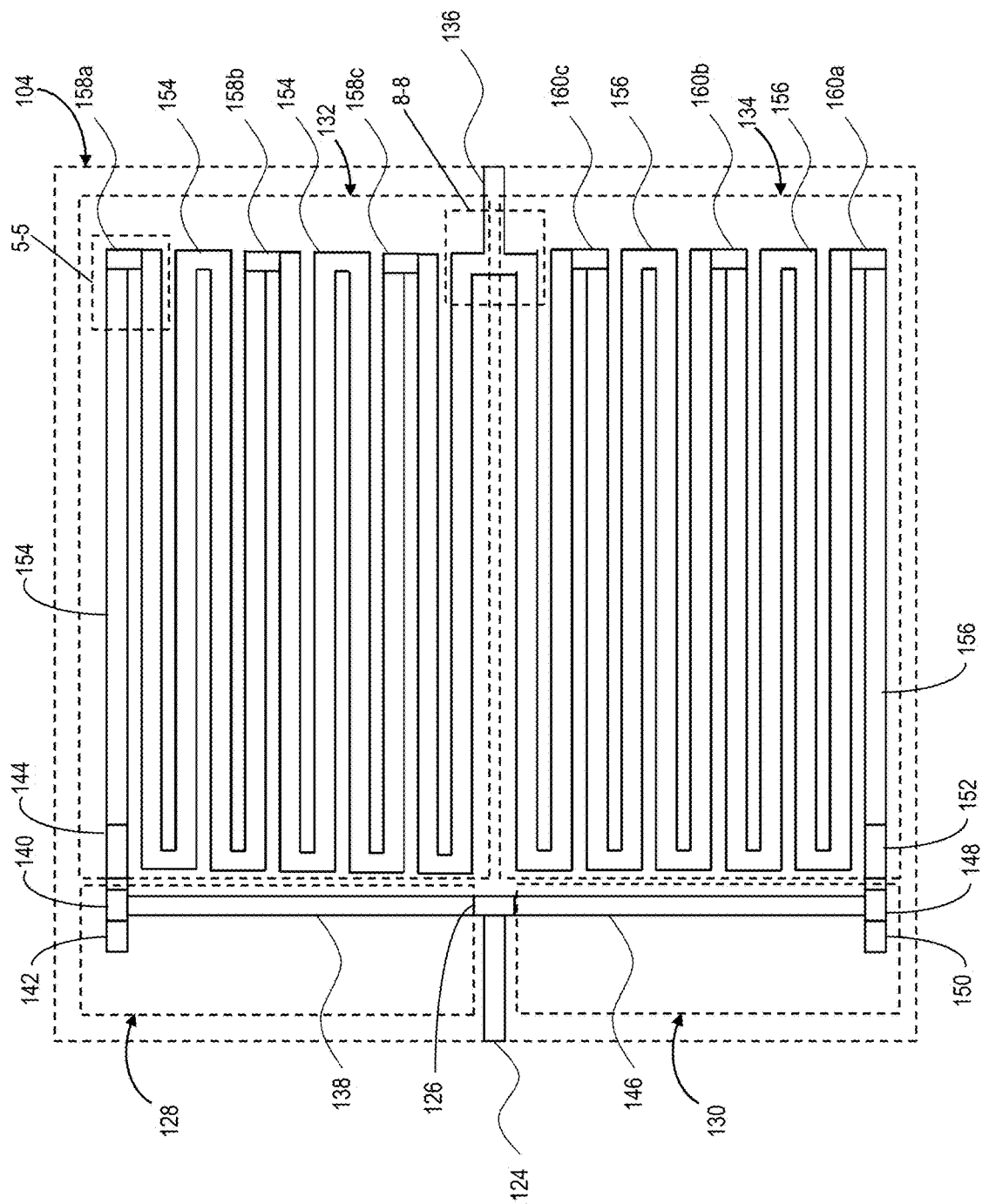
FIG. 4 is a schematic diagram showing exemplary regions of the SLIM filter of FIG. 2.
Figure 5:
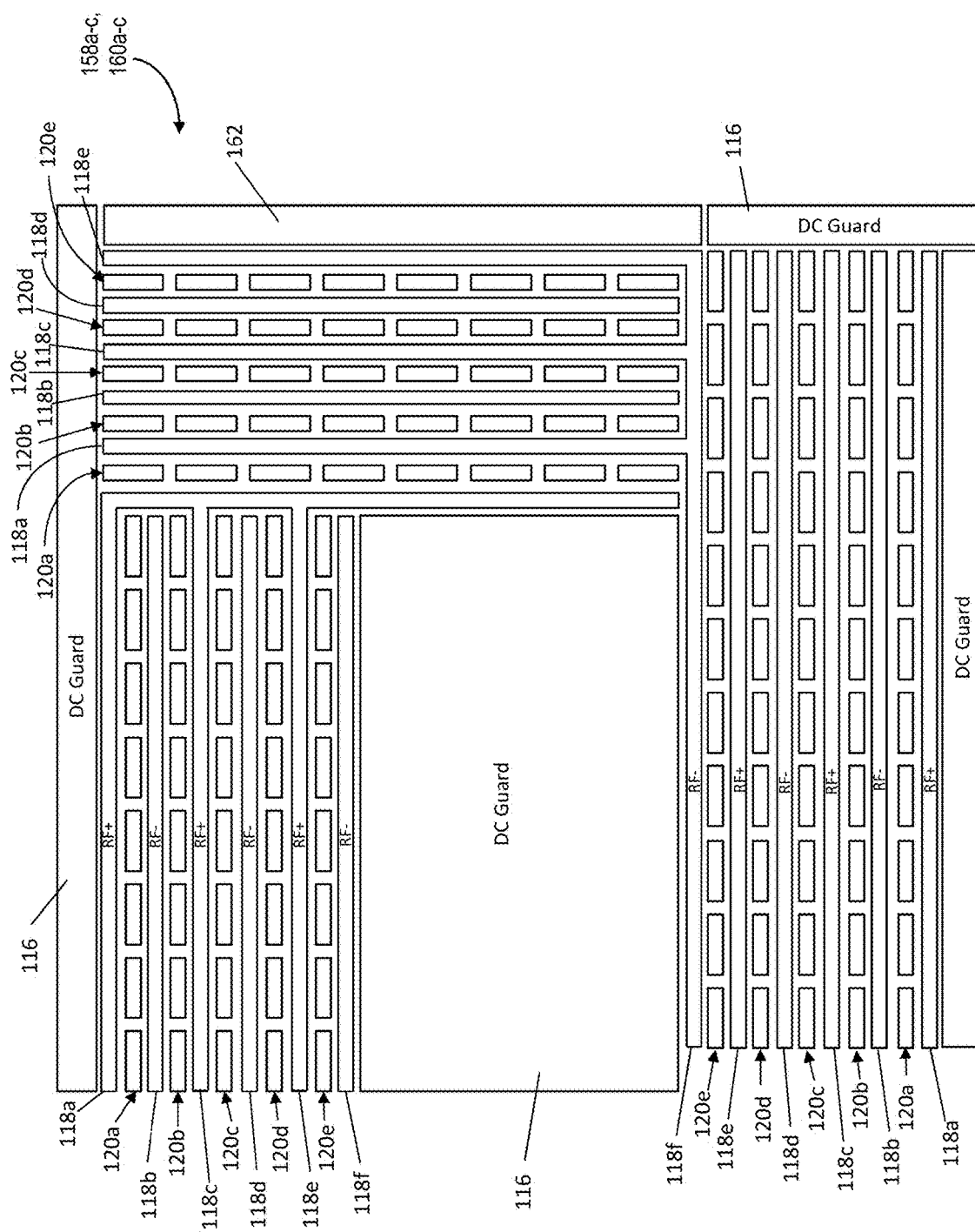
FIG. 5 is an enlarged view of the Area 5-5 of FIG. 4.

Each of the plurality of segmented electrode arrays 120a-e can be placed between two continuous electrodes 118a-f, and includes a plurality of individual electrodes 122a-h, e.g., eight, sixteen, or more electrodes, that are arranged along (parallel to) the direction of propagation, e.g., along the z-axis. It should be understood that each segmented electrode array 120a-e can include more or less than eight electrodes in a grouping, but should include at least three electrodes. Additionally, it should be understood that a plurality of the electrode arrangements shown in FIG. 3 can be arranged sequentially to form a longer track or path as needed, e.g., as shown in FIGS. 4 and 5. The plurality of segmented electrode arrays 120a-e can receive a second voltage signal and generate a drive potential that can drive ions along the propagation axis or a DC voltage signal that can trap ions, which is discussed in greater detail below.

The plurality of continuous electrodes 118a-f and the plurality of segmented electrode arrays 120a-e can be arranged in alternating fashion on the first surface 114a between the DC guard electrodes 116. The segmented electrodes 120a-e can be traveling wave (TW) electrodes such that each of the individual electrodes 122a-h of each segmented electrode array 120a-e receives a voltage signal that is simultaneously applied to all individual electrodes 122a-h, but phase shifted between adjacent electrodes 122a-h along the z-axis. However, the same individual electrodes, e.g., the first individual electrodes 122a, of the segmented electrode arrays 120a-e receive the same voltage signal without phase shifting.

The voltage signal applied to the individual electrodes 122a-h can be a sinusoidal waveform (e.g., an AC voltage waveform), a rectangular waveform, a DC square waveform, a sawtooth waveform, a biased sinusoidal waveform, a pulsed current waveform, etc., and the amplitude of the signal provided to the individual electrodes 122a-h can be determined based on the voltage waveform applied, e.g., in view of the phase shifting referenced above. For example, if a single wavelength of an AC voltage waveform extends over eight electrodes (e.g., the individual electrodes 122a-h), then amplitudes of the voltage signals applied to the individual electrodes 122a-h can be determined by selecting values from the AC waveform for phase shifts corresponding to the total number of electrodes (e.g., eight electrodes) associated with a single wavelength. For example, the phase shift between adjacent electrodes of the individual electrodes 122a-h is 45 degrees (360 degrees of a single wavelength cycle divided by 8). This can be achieved by electrically coupling the individual electrodes 122a-h to different traveling wave control circuits, e.g., AC control circuits, DC (square wave) control circuits, pulsed current control circuits, etc., that generate voltage signals that are phase shifted with respect to each other. Alternatively, the controller 108 could be a single traveling wave control circuit that can generate voltage signals that can be simultaneously applied to the electrodes 122a-h. It should be understood that the voltage or current waveform can take various forms, e.g., square, triangular, rectangular, sawtooth, etc., can be periodic, can be aperiodic, etc. For example, the controller 108 could be a traveling wave control circuit that can include one or more DC (square wave) control circuits that generate DC voltage signals and AC control circuits that generate sinusoidal signals. Where there are a plurality of arrays arranged in a row to form a long path, e.g., as shown in FIGS. 4 and 5, then the waveform applied to the individual electrodes 122a-h can repeat after every eight electrodes, e.g., the $1^{st}$, $9^{th}$, $17^{th}$, $25^{th}$, etc. electrode would receive the same signal.

As noted above, the controller 108 can include one or more pulsed voltage or current control circuits that can generate a pulsed voltage (or current) waveform, e.g., square, triangular, rectangular, sawtooth, etc. The pulsed voltage (or current) waveform can be periodic with no polarity reversal. The pulsed voltage (or current) control circuits can include multiple outputs that are electrically connected to the individual electrodes 122a-h. In some implementations, the controller 108 can be a pulsed voltage (or current) control circuit that can simultaneously apply multiple voltage signals (e.g., that constitute the pulsed waveform) to each of the individual electrodes 122a-h. The various pulse shapes of the voltage (or current) waveform can be generated by a superposition of DC voltage signals and sinusoidal signals. The controller 108 can determine the phase shift between the voltage signals generated by the various traveling wave control circuits. The shape/periodicity of the traveling potential waveform can be based on the phase shift between the voltage signals applied to adjacent electrodes 122a-h. The controller 108 can determine the amplitudes of the DC voltage signals generated by DC control circuits, and can determine the amplitude and/or frequency of the AC signal generated by the traveling wave control circuits.

The frequency of the voltage signals (e.g., AC signal) can determine the speed of the traveling potential waveform. As time progresses, the potential waveform (e.g., generated by AC waveform, sinusoidal voltage waveform, pulsed voltage [or current] waveform applied to the electrodes) can travel along the direction of propagation, e.g., along the z-axis. This can result in a change in the amplitude of the voltage applied to the individual electrodes 122a-h. For example, the voltage applied to the first individual electrode 122a during a first time step is applied to the adjacent individual electrode 122b during the next time step. The controller 108 can include one or more traveling wave control circuits that can generate the pulsed voltage/current waveform, AC waveform, etc. In some implementations, the controller can include one or more RF control circuits that can generate an RF voltage waveform, discussed in greater detail below.

The controller 108 can control the speed of the traveling potential waveform by controlling the frequency and/or phase of the AC/RF/pulsed voltage (or current) waveform applied to the individual electrodes 122a-h. As the potential waveform travels, ions introduced into the SLIM filter 104 can be pushed along the direction of propagation and potentially separated along the direction of propagation based on their mobility, if desired. In this regard, the traveling waveform applied by the controller 108 can be used to transfer the ions without separating them or transfer the ions and separate them during the transfer based on mobility.

As noted above, the plurality of continuous electrodes 118a-f can be connected to one or more voltage control circuits, e.g., voltage control circuits in the controller 108, and receive RF signals therefrom. The RF voltages applied to the continuous electrodes 118a-f can be phase shifted with respect to adjacent continuous electrodes 118a-f. That is, adjacent continuous electrodes 118a-f can receive the same RF signal, but phase shifted by 180 degrees. Accordingly, in a first state, the first, third, and fifth electrodes 118a, 118c, 118e can have a certain phase (indicated as RF+) while the second, fourth, and sixth continuous electrodes 118b, 118d, 118f can have an antiphase (indicated as RF−). As time and the signal advances, the polarity of each of the continuous electrodes 118a-f switches. The foregoing functionality retains the ions between the first and second surfaces 114a, 114b and prevents the ions from contacting the first and second surfaces 114a, 114b.

As noted above, the SLIM filter 104 can have more or less than eight individual electrodes 122a-h in each of the segmented electrode arrays 120a-e, and can include more or less than five segmented electrode arrays 120a-e and six continuous electrodes 118a-f depending on the functionality desired of the SLIM filter 104.

FIG. 4 is a schematic diagram showing exemplary regions of the SLIM filter 104. The SLIM filter 104 can include an entrance region/path 124, a path selection switch 126, a first pre-filter region 128, a second pre-filter region 130, a first separation/filter region 132, a second separation/filter region 134, and an exit region/path 136. The SLIM filter 104 can generally include two parallel surfaces having the arrangement of electrodes 116, 118a-f, 120a-e, 122a-h as discussed in connection with FIG. 3 along the entire length thereof (e.g., across all of the entrance region/path 124, path selection switch 126, first pre-filter region 128, second pre-filter region 130, first separation/filter region 132, second separation/filter region 134, and exit region/path 136) in order to propagate, accumulate, separate, and filter ions from the entrance region/path 124 to the exit region/path 136.

It should also be understood that the different paths and regions of the SLIM filter 104 can receive individual waveforms, e.g., from the controller 108, as discussed in detail above, in order to perform specific functionalities, e.g., to switch paths, to transfer ions, to separate ions, to accumulate ions, to remove ions, to attract and terminate ions, etc. In this regard, the entrance region/path 124, path selection switch 126, first pre-filter region 128, second pre-filter region 130, first separation/filter region 132, second separation/filter region 134, and exit region/path 136 (e.g., the electrodes thereof) can be electrically coupled to the controller 108 and receive voltage (or current) signals or waveforms therefrom.

The entrance region/path 124 can be in communication with and receive ions from the ionization source 102, an ion funnel, or other ion transfer device connected with the ionization source 102. The entrance region/path 124 can have a voltage signal applied thereto and generate a traveling wave which pushes the ions to the path selection switch 126. The entrance region/path 124 can receive a continuous stream of ions, which the entrance region/path 124 in turn continuously transfers to the path selection switch 126. The path selection switch 126 can receive ions from the entrance region/path 124 and trap ions therein as they are received by the path selection switch 126 to accumulate ions. Specifically, the path selection switch 126 can have a trapping waveform applied thereto which prevents ions from exiting the region of the path selection switch 126 until a desired number of ions are accumulated from the entrance region/path 124. In this regard, ion gating and accumulation can be achieved in the path selection switch 126 by applying a repulsive DC potential to one or more individual electrodes 122a-h (e.g., gate electrodes) on opposite lateral sides of the path selection switch 126, e.g., adjacent the first and second pre-filter separation regions/paths 138, 146. The repulsive DC potential can prevent ions from exiting the path selection switch 126 and entering either the first pre-filter separation region/path 138 or the second pre-filter separation region/path 146. Ion accumulation can be performed, and the path selection switch 26 can be designed, in accordance with the disclosure of U.S. patent application Ser. No. 17/327,159, entitled "Methods and Apparatus for Trapping and Accumulation of Ions" and filed on May 21, 2021, which has been incorporated herein by reference in its entirety.

Once a desired number of ions are accumulated at the path selection switch 126, a different voltage signal can be applied thereto causing the path selection switch 126 to generate an electric field that directs the ions to the first pre-filter region 128 or the second pre-filter region 130. For example, the waveform applied to the path selection switch 126 can be changed to a traveling waveform that travels in the direction of either the first pre-filter region 128 or the second pre-filter region 130 in order to push ions into the first or second pre-filter regions 128, 130, as desired. Additionally, the repulsive DC potential is removed from the individual electrodes 122a-h adjacent the pre-filter separation region/path 138, 146 that the accumulated ions are to be transferred into. Notably, the waveform applied to the path selection switch 126 can be periodically switched between an accumulation waveform, a traveling waveform that travels in the direction of the first pre-filter region 128, and a waveform that travels in the direction of the second pre-filter region 130. Thus, a first group of ions can be accumulated at the path selection switch 126 and pushed to the first pre-filter region 128 once accumulated, and thereafter a second group of ions can be accumulated at the path selection switch 126 and pushed to the second pre-filter region 130 once accumulated. Accordingly, ions are pulsed into the first and second pre-filter regions 128, 130. This arrangement ultimately allows for the first and second separation/filter regions 132, 134 to simultaneously separate and/or filter ions, which ultimately increases the duty cycle of the SLIM filter 104, as discussed in greater detail below.

It should also be understood that the path selection switch 126 need not function as an ion accumulator, but instead can continuously receive ions from the entrance region/path 124 and switch between a first state where it receives the first traveling waveform to push ions toward the first pre-filter region 128 and a second state where it receives the second traveling waveform to push ions toward the second pre-filter region 130. For example, the path selection switch 126 can be in the first state for a first time period and subsequently switch to the second state for a second time period. It should be understood that this functionality is not limited to two time periods, but instead the path selection switch 126 can switch between the two states any number of times in order to send a plurality of ion packets through the first and second separation/filter regions 132, 134. The same holds true when the path selection switch 126 is configured to accumulate ions, as discussed above.

The first and second pre-filter regions 128, 130 are substantially similar in construction and functionality, but generally direct ions in opposite directions. In this regard, the first pre-filter region 128 is positioned on a first side of the path selection switch 126 and the second pre-filter region 130 is positioned on a second side of the path selection switch 126, which is generally opposite the first side.

The first pre-filter region 128 includes a first pre-filter separation region/path 138, a first path switch 140, and a first discard region 142. The first pre-filter separation region 138 extends from the path selection switch 126 to the first path switch 140. The first path switch 140 can be arranged perpendicular to the first pre-filter separation region 138, and can extend between the first discard region 142 and a first path on-board accumulation region 144 of the first separation/filter region 132.

The second pre-filter region 130 includes a second pre-filter separation region/path 146, a second path switch 148, and a second discard region 150. The second pre-filter separation region 146 extends from the path selection switch 126 to the second path switch 148. The second path switch 148 can be arranged perpendicular to the second pre-filter separation region 146, and can extend between the second discard region 150 and a second path on-board accumulation region 152 of the second separation/filter region 134.

The first and second pre-filter separation regions 138, 146 alternatingly receive ion packets from the path selection switch 126, and perform a low resolution ion mobility separation on the received ion packets as they push the ions toward the first and second path switches 140, 148, respectively. This low resolution ion mobility separation functions as a pre-filter and allows the first and second path switches 140, 148 to permit mainly targeted ions to enter the first and second path on-board accumulation regions 144, 152, and thus prevent a buildup of many undesired ions within the first and second path on-board accumulation regions 144, 152 that would otherwise count against the space-charge limitations thereof.

Specifically, the first and second pre-filter separation regions 138, 146 can be configured to separate ions based on mobility, e.g., through the implementation of at raveling wave, and the first and second path switches 140, 148 can be configured to select ions having a targeted mobility, such that the first and second path switches 140, 148 are switched between alternating opposite traveling waves based on the amount of time that has passed since the path selection switch 126 released the ions into the first and second pre-filter separation regions 138, 146. For example, the controller 108 can apply a first traveling waveform to the first and second path switches 140, 148 that travels in the direction of the first and second discard regions 142, 150, respectively, and can subsequently switch the first traveling waveform to a second traveling waveform that travels in the direction of the first and second path on-board accumulation regions 144, 152, respectively, when the targeted ions are approaching the first and second path switches 140, 148. When the first traveling waveform is applied, it pushes all ions received by the first and second path switches 140, 148 into the first and second discard regions 142, 150, which neutralize the received ions. Additionally and/or alternatively, the first and second discard regions 142, 150 can be monitored for analytical or diagnostic purposes. However, when the second traveling waveform is applied, it pushes the targeted ions into the first and second path on-board accumulation regions 144, 152 where they are accumulated prior to being released into the first and second separation/filter regions 132, 134.

The first and second path on-board accumulation regions 144, 152, e.g., the electrodes thereof, can be switchable between two different modes of operation. In a first mode, the on-board accumulation regions 144, 152 can accumulate ions provided thereto by the first and second path switches 140, 148. In a second mode, the on-board accumulation regions 144, 152 can release the accumulated ions into first and second long separation/gating paths 154, 156, respectively. Ions can be accumulated in the on-board accumulation regions 144, 152 by applying a repulsive DC potential to one or more individual electrodes 122a-h (e.g., gate electrodes) at the end of the on-board accumulation regions 144, 152, e.g., adjacent the respective separation/gating path 154, 156. The repulsive DC potential can prevent ions from exiting the on-board accumulation regions 144, 152 and entering the separation/gating paths 154, 156. The repulsive DC potential can be removed when the on-board accumulation regions 140, 148 are switched to the second mode, e.g., the release mode, to allow the accumulated ions to be transferred to the first and second long separation/gating paths 154, 156. Ion accumulation can be performed, and the on-board accumulation regions 144, 152 can be designed, in accordance with the disclosure of U.S. patent application Ser. No. 17/327,159, entitled "Methods and Apparatus for Trapping and Accumulation of Ions" and filed on May 21, 2021, which has been incorporated herein by reference in its entirety.

As referenced above, when the on-board accumulation regions 144, 152 are in the first mode of operation, e.g., the accumulation mode, they receive mainly targeted ions from the first and second path switches 140, 148, respectively, and accumulate the targeted ions. By pre-filtering the ions prior to accumulation, the on-board accumulation regions 144, 152 accumulate an enriched packet of ions that contains a larger percentage of ions of interest than ions that are not of interest. In doing so, the amount of time spent accumulating ions in the on-board accumulation regions 144, 152 can be generally increased as it takes longer to reach the space charge limit thereof.

Specifically, the on-board accumulation regions 144, 152 can accumulate ions until the space charge limit thereof has been reached, after which point the enriched ion packet would be released into the respective separation/gating path 154, 156. More specifically, space charge effects limit the maximum number of charges that can be contained within a given volume before ions are discharged. Generally, there is a space charge limit of approximately one million charges per one millimeter of path length in the SLIM filter 104. Accordingly, if a single traveling wave segment, e.g., the electrode segment shown and described in connection with FIG. 3 that includes six RF electrodes 118a-f and five segmented electrode arrays 120a-e having eight individual electrodes 122a-h, is used for accumulating ions and that electrode is, for example, nine millimeters in length, then the space charge limit (e.g., accumulation capacity) is approximately nine million charges. That is, nine million charges can be accumulated before the space charge limit is exceed, at which point ions can be lost from the accumulation region 144, 152. It is noted that the space charge limit is based on the total charge value of all ions accumulated, and not the number of ions. For example, some ions may have a greater charge value, e.g., +40 or +50, and in such circumstances fewer ions would be accumulated than if ions having +10 charge were accumulated. Moreover, the foregoing assumes a single traveling wave segment having six RF electrodes 118a-118f and five segmented electrode arrays 120a-e, however, additional rows can be added to increase the accumulation capacity per unit length if additional capacity is required, e.g., in order to increase the sensitivity of the analysis. For example, a sixth segmented electrode array and an eighth continuous RF electrode could be added to the electrode configuration shown in FIG. 3, which would provide additional space for ion accumulation.

Accordingly, by pre-filtering the ions with the pre-filter regions 128, 130, e.g., with the first and second pre-filter separation regions 138, 146 and the path switches 140, 148, the on-board accumulation regions 144, 152 do not receive the same number of ions per unit time that they would have otherwise received had pre-filtering not been performed. Thus, the on-board accumulation regions 144, 152 are capable of accumulating ions for a longer period of time, which increases the duty cycle of the SLIM filter 104, e.g., it increases the ratio of accumulation time to longest travel time of the ions through the SLIM filter 104. For example, by pre-filtering and enriching the sample, one could increase the amount of time that they can store the ions by 10-100 times, e.g., a standard accumulation time of 150 milliseconds can be increased to 1.5 seconds if the enrichment factor is 10 times. However, it should be understood that the amount of time that can be spent accumulating will also be impacted by the purity of the sample provided to the SLIM filter 140 since a higher purity or more concentrated sample will cause the on-board accumulation regions 144, 152 to accumulate ions more quickly, e.g., because there is a higher concentration of targeted ions.

The first and second separation/filter regions 132, 134 are substantially similar in construction and functionality. In this regard, the first separation/filter region 132 is positioned adjacent the first pre-filter region 128 while the second separation/filter region 134 is positioned adjacent the second pre-filter region 130.

The first separation/filter region 132 includes the first on-board accumulation region 144, the first long separation/gating path 154, and a plurality of first path ion gates 158a-c. The first long separation/gating path 154 can have a substantially nonlinear (e.g., serpentine) configuration with a plurality of turns, and extends from the first on-board accumulation region 144 to the exit region/path 136. For example, the first long separation/gating path 154 can include ten turns, as shown in FIG. 4. However, it should be understood that the first long separation/gating path 154 can include more or less than ten turns. The plurality of ion gates 158a-c are located at predetermined spaced positions along the first long separation/gating path 154, and can be utilized to filter out targeted ions. For example, the ion gates 158a-c can be located at the first turn, and every fourth turn thereafter, e.g., the fifth turn, and the ninth turn. Of course, additional gates can be included as needed for increased filtering.

The second separation/filter region 134 includes the second on-board accumulation region 152, the second long separation/gating path 156, and a plurality of second path ion gates 160a-c. The second long separation/gating path 156 can be generally nonlinear in shape with a plurality of turns, and extends from the second on-board accumulation region 152 to the exit region/path 136. For example, the second long separation/gating path 156 can include ten turns, as shown in FIG. 4. However, it should be understood that the second long separation/gating path 156 can include more or less than ten turns. The plurality of ion gates 160a-c are located at predetermined positions along the second long separation/gating path 156, and can be utilized to filter out targeted ions. For example, the ion gates 160a-c can be located at the first turn, and every fourth turn thereafter, e.g., the fifth turn, and the ninth turn. Of course, additional gates can be included as needed for increased filtering, e.g., an ion gate can be located at every other turn or every turn if needed. The first and second separation/filter regions 132, 134 connect at the exit region/path 136, which is shown in greater detail in FIGS. 8A-F.

The first and second long separation/gating paths 154, 156 include the electrode configuration shown in FIG. 3 along the entire length thereof, and can receive a traveling waveform that transfers and separates ions in order to perform high resolution ion mobility separation across the entire length of the first and second long separation/gating paths 154, 156. Accordingly, once a sufficient number of ions are accumulated by the first and second on-board accumulation regions 144, 152, the on-board accumulation regions 144, 152 release their ion packets into the first and second long separation/gating paths 154, 156, respectively. The traveling waveform applied to the first and second long separation/gating paths 154, 156 pushes the ions along the first and second long separation/gating paths 154, 156 causing the ions to separate based on mobility, as discussed in detail above. As the ions traverse the first and second long separation/gating paths 154, 156 and undergo ion mobility separation, the ion gates 158a-c, 160a-c can be utilized to filter out targeted ions since the ions are spatially and temporally separated, and therefore arrive at the ion gates 158a-c, 160a-c at different times. In this regard, the ion gates 158a-c, 160a-c can be normally in an active state, e.g., in a state where the gates attract ions, and deactivated when a targeted ion is approaching or in the region of the first and second long separation/gating paths 154, 156 adjacent the ion gates 158a-c, 160a-c.

FIG. 5 is an enlarged view of the Area 5-5 of FIG. 4 showing an exemplary ion gate 158a-c, 160a-c in greater detail. The ion gates 158a-c, 160a-c can each include a switchable DC guard electrode 162, which can be controlled by the controller 108. As referenced above, the switchable DC guard electrode 162 can be normally in an active state, e.g., in a state where the gates attract ions, and deactivated when a targeted ion is approaching or in the region of the first and second long separation/gating paths 154, 156 adjacent the ion gates 158a-c, 160a-c. When in the active state, the switchable DC guard electrode 162 can have a voltage signal applied thereto, e.g., by the controller 108, that attracts the ions to the switchable DC guard electrode 162 and neutralizes the ions. When in the deactivated state, the switchable DC guard electrode 162 can receive the same voltage signal as the DC guard electrodes 116, e.g., by the controller 108, and generate a repulsive electric field that maintains the ions within the traveling wave path.

Figure 6A:
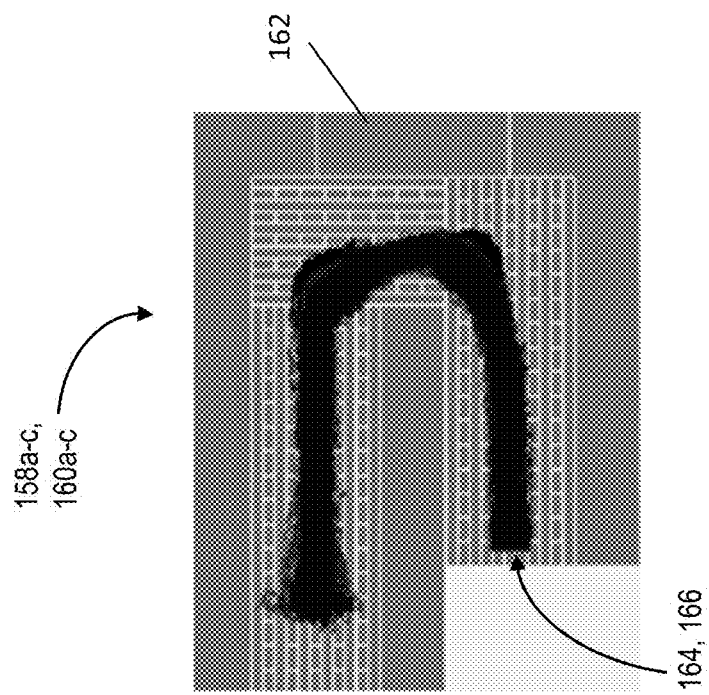
FIG. 6A is an enlarged view of the Area 5-5 of FIG. 4 showing the SLIM filter in a multi-gate mode of operation with a first ion gate in an activated state.
Figure 6B:
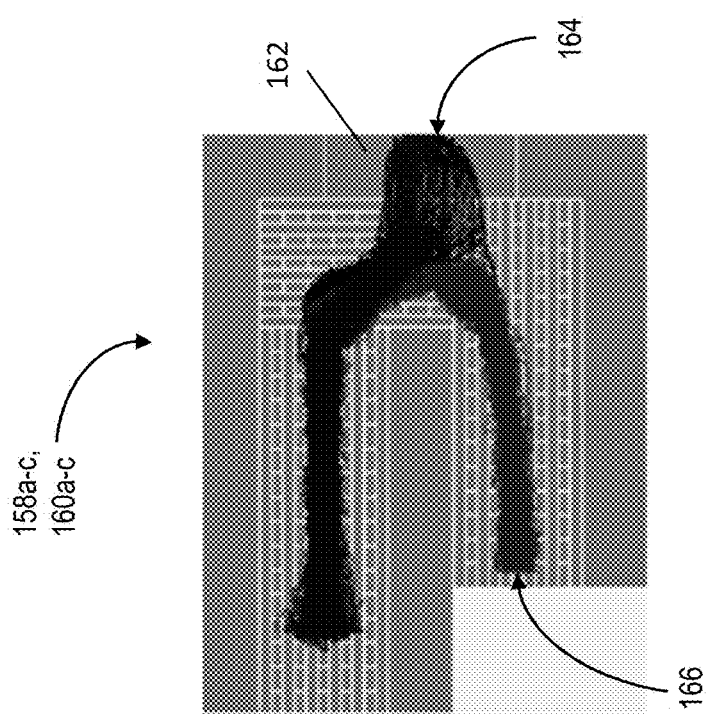
FIG. 6B is an enlarged view of the Area 5-5 of FIG. 4 showing the SLIM filter in a long path (parallel) separation mode of operation with a first ion gate being maintained in a deactivated state.

For example, FIG. 6A illustrates the flow of ions across one of the ion gates 158a-c, 160a-c where the switchable DC guard electrode 162 has been periodically switched from the active state to the deactivated state. As can be seen in FIG. 6A, a first portion 164 of ions are attracted to the switchable DC guard electrode 162, which occurs when it is in the active state, and a second portion 166 of ions travel along the path between the DC guard electrodes 116 without being attracted to the switchable DC guard electrode 162, which occurs when the switchable DC guard electrode 162 is in the deactivated state. Notably, the second portion 166 of the ions can be targeted ions that are allowed to traverse the ion gate 158a-c, 160a-c by periodically deactivating the switchable DC guard electrode 162. Additionally, it should be understood that the ions attracted to the switchable DC guard electrode 162 can have different mobilities, such that the DC guard electrode 162 is utilized to eliminate undesired ions having different mobilities that arrive at the DC guard electrode 162 at different times. FIG. 6B illustrates the flow of ions across one of the ion gates 158a-c, 160a-c where the switchable DC guard electrode is maintained in the deactivated state allowing all ions 164, 166 to traverse the ion gate 158a-c, 160a-c, for example, if the SLIM filter 104 were used in a long path (parallel) separation mode without implementation of ion gates.

The effect of the ion gates 158a-c, 160a-c is also shown in FIGS. 7A and 7B, which shows a comparison between a first plot of intensity as a function of time illustrating an arrival time distribution for exemplary ions 161a-i having certain distinct mobilities moving through the SLIM filter 104 under the influence of an AC traveling waveform when the ion gates 158a-c, 160a-c are deactivated and thus allowing all ions to pass through the SLIM filter 104, and a second plot of intensity as a function of time illustrating an arrival time distribution for the exemplary ions 161a-i moving through the SLIM filter 104 under the influence of an AC traveling waveform when the ion gates 158a-c, 160a-c are periodically activated to filter targeted ions and thus allow only ions having the appropriate mobility to pass through the SLIM filer 104. As can be seen in FIG. 7, ions of a targeted mobility, e.g., the third ions 161c, can be allowed to travel through the SLIM filter 104 by deactivating the ion gates 158a-c, 160a-c during a predetermined period of time. In doing so, the third ions 161c are permitted to cross the ion gates 158a-c, 160a-c, while the first, second, and fourth through ninth ions 161a, 161b, 161d-i are eliminated by the ion gates 158a-c, 160a-c.

FIGS. 8A-F are enlarged views of the Area 8-8 of FIG. 4 showing the first and second long separation/gating paths 154, 156 connecting at the exit region/path 136 of the SLIM filter 104, and the flow paths of ions having a mass to charge ratio (m/z) of 118, 322, 1222, 1522, 2422, and 2722. As shown in FIGS. 8A-F, the exit region/path 136 can be positioned orthogonal to the first and second long separation/gating paths 154, 156, and can have a traveling wave applied thereto that travels in a direction perpendicular to the traveling wave applied to the portions of the first and second long separation/gating paths 154, 156 that connect with the exit region/path 136. Accordingly, the ions that pass though the SLIM filter 104 are transferred to the exit region/path 136 and directed to the mass spectrometer 106 by the exit region/path 136.

Figure 9:
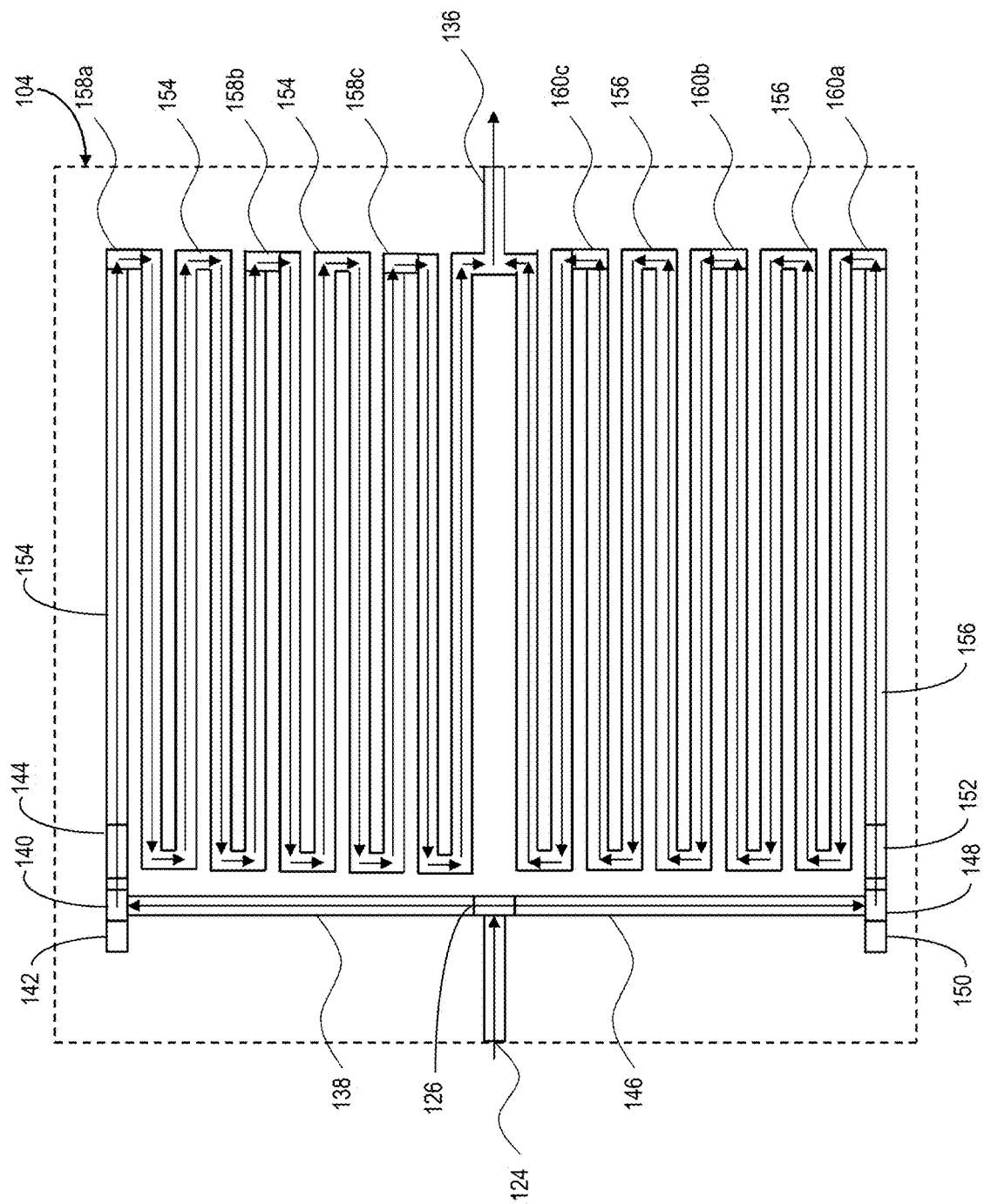
FIG. 9 is a schematic diagram of the SLIM filter of FIG. 4 showing exemplary ion paths when the SLIM filter is in a long path (parallel) separation mode of operation.

FIG. 9 is a schematic diagram of the SLIM filter 104 showing exemplary ion paths through the SLIM filter 104 when the SLIM filter 104 is used in a long path (parallel) separation mode of operation. When in the long path (parallel) separation mode of operation, ions are first introduced into the SLIM filer 104 at the entrance region/path 124, and transferred to the path selection switch 126 by a traveling wave applied to the entrance region/path 124. The path selection switch 126 receives the ions from the entrance region/path 124 and traps the received ions for a designated period of time, e.g., a fill time, thus accumulating ions. Once the path selection switch 126 has accumulated ions for the designated period of time, the signal applied thereto is switched to release the accumulated ions into either the first or second pre-filter separation regions 138, 146, which initiates the ion mobility scan. Ions that are released into the first pre-filter separation region 138 proceed to traverse the first pre-filter separation region 138, the first path switch 140, the first path on-board accumulation region 144, the first long separation/gating paths 154, the plurality of ion gates 158a-c, and the exit region/path 136, along which the ions undergo ion mobility separation due to the waveform applied thereto, e.g., a traveling wave. Ions that are released into the second pre-filter separation region 146 proceed to traverse the second pre-filter separation region 146, the second path switch 148, the second path on-board accumulation region 152, the second long separation/gating paths 156, the plurality of ion gates 160a-c, and the exit region/path 136, along which the ions undergo ion mobility separation due to the waveform applied thereto, e.g., a traveling wave. Thus, the SLIM filter 104 includes two separate, but parallel separation paths.

However, when in the long path (parallel) separation mode of operation, the first and second path switches 140, 148, first and second path on-board accumulation regions 144, 152, and the ion gates 158a-c, 160a-c do not function to filter or accumulate ions, but instead permit all ions to pass, e.g., through the implementation of a continuous traveling wave. That is, the first and second path switches 140, 148, first and second path on-board accumulation regions 144, 152, and the ion gates 158a-c, 160a-c can be sections of the first and second long separation/gating paths 154, 156, respectively, and receive the same waveform. Accordingly, the ions undergo long path ion mobility separation as they are pushed through the SLIM filter 104, which provides a high ion mobility resolution due to the increased path length.

Moreover, once the ions that have been accumulated in the path selection switch 126 are released into one of the first and second pre-filter separation regions 138, 146, additional ions can then be accumulated in the path selection switch 126 and subsequently released into the other one of the first and second pre-filter separation region 138, 146. Thus, both of the separate but parallel first and second long separation/gating paths 154, 156 can be simultaneously used to perform ion mobility separation, which allows for a higher throughput of mobility separated ions since multiple ion packets are being simultaneously separated, and thus an increase in the analysis duty cycle. That is, the path selection switch 126 allows for multiple packets to be pulsed into the device for simultaneous separation, and thus provides twice as much accumulation time. It is additionally noted that the separate paths can have different traveling waveforms applied thereto in order to perform different ion mobility separations.

It should also be understood that the long path (parallel) separation mode of operation is not limited to the two separate parallel paths shown in FIG. 9 and described in connection therewith. Instead, the SLIM filter 104 can have more than two multiple long paths that connect at the exit region/path 136. In this regard, the SLIM filter 104 can have more than two paths, e.g., three, four, ten, etc., as needed to provide the desired throughput of targeted ions and accumulation time. The SLIM filter 104 is able to increase the analysis duty cycle by dividing the received ions between multiple parallel separation paths, and separating the ions within each path nearly simultaneously though temporally shifted based on the accumulation time of the path selection switch 126. Thus, the SLIM filter 104 overcomes space charge limitations by separating the ions into a plurality of packets that are separated in parallel.

Figure 10:
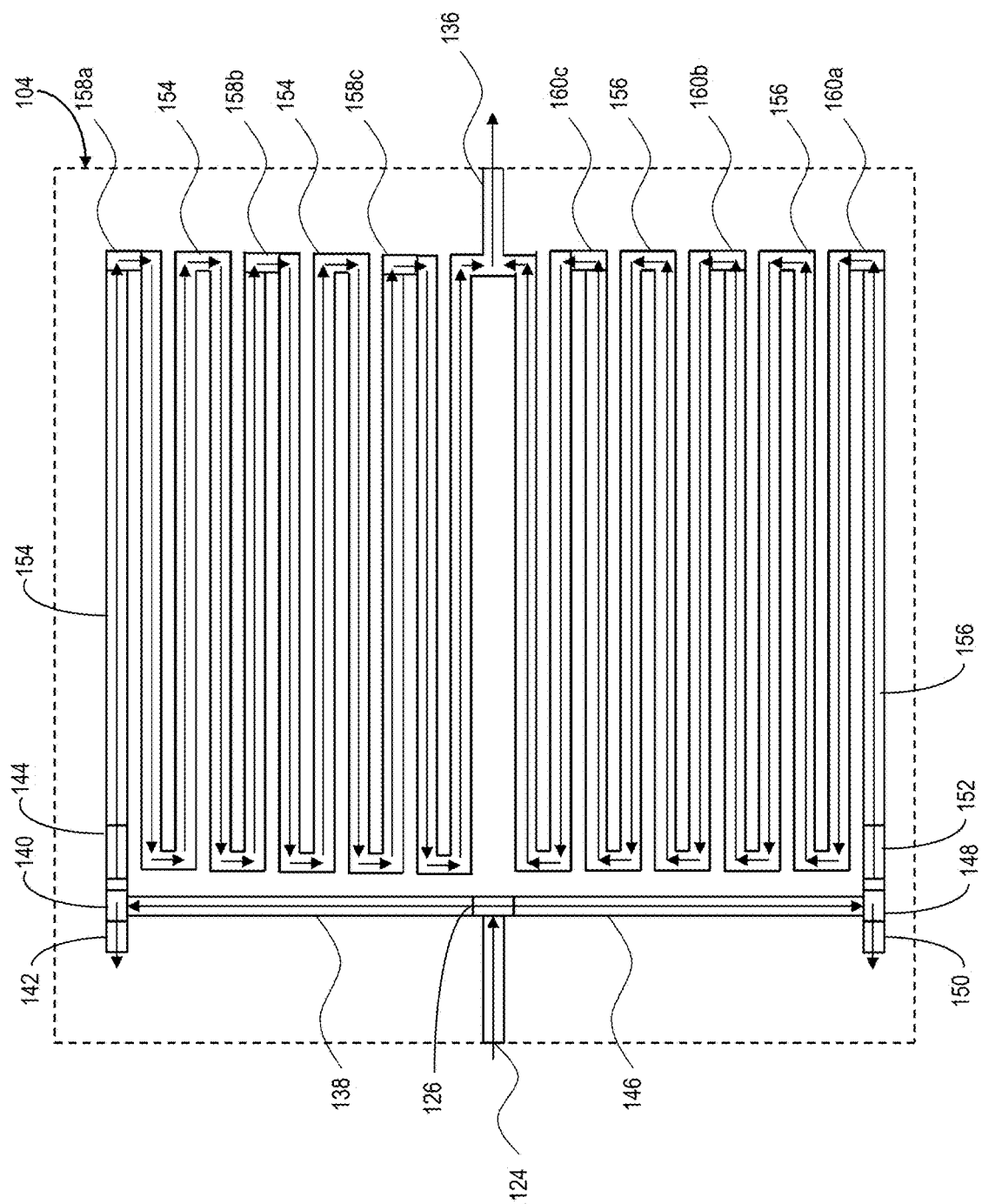
FIG. 10 is a schematic diagram of the SLIM filter of FIG. 4 showing exemplary ion paths when the SLIM filter is in a pre-filter mode of operation and a multi-gate mode of operation.

FIG. 10 is a schematic diagram of the SLIM filter 104 showing exemplary ion paths through the SLIM filter 104 when in a pre-filter (serial) mode of operation and a multi-gate (multiplex) mode of operation.

When in the pre-filter (serial) mode of operation, the SLIM filter 104 functions by performing a first short/quick low resolution ion mobility separation, which removes high abundance ions having an undesired mobility prior to target ion accumulation, followed by an accumulation of target ions and subsequent long path high resolution ion mobility separation. That is, the pre-filter (serial) mode of operation couples two ion mobility separations in sequence to improve the duty cycle, and thereby sensitivity, of detection.

When in the pre-filter (serial) mode of operation, ions are first introduced into the SLIM filter 104 at the entrance region/path 124, and transferred to the path selection switch 126 by a traveling wave applied to the entrance region/path 124. The path selection switch 126 receives the ions from the entrance region/path 124 and traps the received ions for a designated period of time, e.g., a fill time, thus accumulating ions. Once the path selection switch 126 has accumulated ions for the designated period of time, the signal applied thereto is switched to release the accumulated ions into either the first or second pre-filter separation regions 138, 146. Once it has released the first packet of ions, the path selection switch 126 then begins to accumulate additional ions into a second packet. Once the path selection switch 126 has again accumulated ions for the designated period of time, the signal applied thereto is switched to release the accumulated ions into the other of the first or second pre-filter separation regions 138, 146. This procedure continues for as many ion packets are desired or necessary to fully saturate the detector, e.g., the mass spectrometer 106. Accordingly, the first and second pre-filter separation regions 138, 146 alternatingly receive ion packets from the path selection switch 126.

The first and second pre-filter separation regions 138, 146 each have a voltage signal applied thereto and generate a traveling wave that pushes the released ions toward the first and second path switches 140, 148, respectively, and separates the ions based on mobility. The ion mobility separation performed by the first and second pre-filter separation regions 138, 146 can be a low resolution ion mobility separation that is configured to remove as many undesired ions as possible in the shortened length of the first and second pre-filter separation region 138, 146. The first and second path switches 140, 148 then filter the ions based on mobility by directing ions of the targeted mobility to the first and second path on-board accumulation regions 144, 152, while directing ions of non-targeted mobilities to the first and second discard regions 142, 150. This can be done by, for example, by switching the direction of travel of a traveling wave applied to the first and second path switches 140, 148 based on which ions are approaching the switches 140, 148, e.g., a first traveling wave can travel toward the first and second discard regions 142, 150 and a second traveling wave can travel toward the on-board accumulation regions 144, 152. Alternatively, first and second traveling waves can be simultaneously applied to the first and second path switches 140, 148, and the magnitude of the traveling waves can be adjusted based on which direction the ions are to be pushed, e.g., as discussed in greater detail in connection with FIGS. 19A and 19B. The ions directed into the first and second discard regions 142, 150 are eliminated, while the ions directed into the first and second path on-board accumulation regions 144, 152 are accumulated for a predetermined period of time or until the space-charge limit has been reached.

The first and second discard regions 142, 150 can also be utilized for other purposes, such as for performance optimization and diagnostics. For example, the first and second discard regions 142, 150 could be ion detection regions and can each include an ion current detector that is utilized to detect the ions that are diverted into the ion detection regions 142, 150.

Once the space-charge limit has been reached, the first and second path on-board accumulate regions 144, 152 can switch from an accumulation mode of operation into a release mode of operation in which a release signal, e.g., a traveling wave, is applied thereto that releases the accumulated ions, e.g., an ion packet that is enriched with ions of a targeted mobility, into the respective separation/gating path 154, 156. The enriched ion packets released into the respective separation/gating paths 154, 156 are pushed along the entire length of the first and second separation/gating paths 154, 156 where they undergo a second ion mobility separation due to the waveform applied thereto, e.g., a traveling wave. The second ion mobility separation can be a high resolution ion mobility separation due to the longer length of the first and second separation/gating paths 154, 156. The first and second separation/gating paths 154, 156 connect at the exit region/path 136 where the ions exit the SLIM filter 104 and are directed to the mass spectrometer 106 for detection.

Accordingly, the pre-filter (serial) mode of operation results in an increased duty cycle since the time period in which ions are accumulated in the on-board accumulation regions 144, 152 is greatly increased. More specifically, by pre-filtering the ions with the pre-filter regions 128, 130 and the path switches 140, 148, the on-board accumulation regions 144, 152 do not receive the same number of ions per unit time that they would have otherwise received had pre-filtering not been performed. Thus, the on-board accumulation regions 144, 152 are capable of accumulating ions for a longer period of time before reaching the space-charge limitations thereof, which increases the duty cycle for the SLIM filter 104, e.g., it increases the ratio of accumulation time to longest travel time of the ions through the SLIM filter 104. For example, by pre-filtering and enriching the sample, one could increase the amount of time that ions can be accumulated for by 10-100 times, e.g., a standard accumulation time of 150 milliseconds can be increased to 1.5 seconds if the enrichment factor is 10 times.

Additionally, the pre-filter (serial) mode of operation reduces the required dwell time of the mass spectrometer 106, such as for a triple quadrupole mass spectrometer, and therefore increases the sensitivity. More specifically, by operating the SLIM filter 104 in the pre-filter (serial) mode of operation, the connected mass spectrometer 106 does not analyze a continuous beam of ions, but instead analyzes the packetized target ions, which generally arrive at the mass spectrometer over a shorter period of time because they are compressed into a smaller window, e.g., they are not spread across a continuous beam. Thus, the mass spectrometer 106 does not need to detect over the entire period of a continuous beam, but instead only needs to detect for the period of the packet.

For example, if the mass spectrometer 106 is looking for one hundred ions of a target mobility, those one hundred ions may be spread throughout a continuous beam that takes one second to traverse the separation/gating path 154, 156. However, when in the pre-filter (serial) mode of operation, the SLIM filter 104 can potentially accumulate those one hundred ions and condense them into an enriched ion packet at the on-board accumulation region 144, 152 and release the ions as a packet into the respective separation/gating path 154, 156. Because the ions are released as a packet, the mass spectrometer 106 does not need to dwell while the ions are traversing the separation/gating path 154, 156, as it has to with a continuous beam, but instead can monitor for only the period of that packet, for example, ten milliseconds, because the packet compresses the ions into a shorter period. If the ions cannot be compressed into a single packet, then the SLIM device 106, as described above, can be configured to include multiple parallel paths, and the targeted ions can be packetized into multiple packets that are each sent through a different one of the parallel separation/gating paths 154, 156 and separated simultaneously. For example, five parallel paths could be implemented where each packet can only contain twenty of the targeted ions prior to exceeding the space-charge limitations.

FIG. 10 additionally illustrates the SLIM filter 104 in the multi-gate (multiplex) mode of operation, which can be used in combination with or separate from the pre-filter operation previously described. When in the multi-gate (multiplex) mode of operation, the ion gates 158a-c, 160a-c can be utilized to filter ions as the ions traverse and are separated along the separation/gating paths 154, 156, which can enhance ion mobility filtering and increase accumulation time. Specifically, as discussed above in connection with FIGS. 4, 5, 6A, and 6B, the ion gates 158a-c, 160a-c can be normally in an active or attractive state, e.g., in a state where the gates 158a-c, 160a-c attract ions, and deactivated or switched to a repulsion state when a targeted ion is approaching or in the portion of the first and second long separation/gating paths 154, 156 adjacent the ion gates 158a-c, 160a-c, to generate an electric field that repels ions and thus maintains the ions on the separation/gating path 154, 156 allowing the ions to pass. More specifically, the switchable DC guard electrode 162 of each ion gate 158a-c, 160a-c can be switched between different states, e.g., have a different voltage signal applied thereto and generate different electrical fields, depending on whether the approaching/adjacent ions should be filtered out and eliminated, or permitted to pass across the gate 158a-c, 160a-c. The first state can be an attractive state that attracts ions to the DC guard electrode 162 and eliminates the attracted ions, and the second state can be a repulsion state that repels the ions away from the DC guard electrode 162 and maintains the ions within the separation/gating path 154, 156. Thus, the gates 158a-c, 160a-c eliminate undesired ions.

By utilizing a plurality of gates 158a-c, 160a-c, the SLIM filter 104 is capable of increased resolution, as well as processing multiple ion packets simultaneously as they are pulsed into the separation/gating paths 154, 156 by the on-board accumulation regions 144, 152. As described above in connection with the pre-filter (serial) mode of operation, ions are accumulated in the on-board accumulation regions 144, 152 and pulsed into the respective separation/gating paths 154, 156 once the space-charge limit or fill time is reached. Those ions are then separated based on mobility as they are urged through the on-board accumulation regions 144, 152, e.g., by the traveling wave applied thereto, and can be temporally or spatially filtered by the gates 158a-c, 160a-c. However, in some instances the gates 158a-c, 160a-c may allow non-targeted ions to pass through along with targeted ions, e.g., if a portion of non-targeted ions are in the area of a gate 158a-c, 160a-c while it is generating an electrical field that repels ions allowing the targeted ions to pass. This can occur, for example, if the ions have not traveled enough distance to sufficiently separate ions having similar mobilities, or if ions from a second ion packet "catch-up" to ions of an earlier released first ion packet. Nonetheless, as the ions continue to traverse the separation/gating paths 154, 156 they will continue to be separated, based on mobility and can be filtered by the subsequent gates, e.g., the second or third gates 158b-c, 160b-c.

Still further, the plurality of gates 158a-c, 160a-c allow for multiple ion packets to be simultaneously separated by the separation/gating paths 154, 156 as they are pulsed therein by the on-board accumulation regions 144, 152, while maintaining a high resolution. Specifically, by accumulating ions in the on-board accumulation regions 144, 152, multiple packets of ions can be pulsed into the separation/gating paths 154, 156 and simultaneously separated, though time shifted based on the accumulation time of the on-board accumulation regions 144, 152. That is, multiple ion mobility separations can occur on each of the separation/gating paths 154, 156 at the same time, but the ion mobility separation start time for each packet is slightly delayed in view of the time it takes to accumulate an enriched ion packet.

For example, if it takes one second for a first packet of ions to traverse the separation/gating paths 154, 156, but only takes 10 milliseconds to accumulate ions (e.g., into a second ion packet) in the on-board accumulation regions 144, 152, then the on-board accumulation regions 144, 152 can accumulate and release nine additional ion packets while the first ion packet is still being separated by the respective separation/gating path 154, 156. Thus, the SLIM filter 104 can accumulate ions while also separating ions, and additionally separate multiple packets of ions simultaneously. This increases the number of ions that can undergo ion mobility separation, and thus increases the throughput of the SLIM filter 104. However, in some instances non-targeted ions of a subsequent (e.g., second, third, etc.) pulsed ion packet may catch-up to targeted ions of an earlier (e.g., first) pulsed ion packet. In such instances, one of the gates 158a-c, 160a-c may permit the non-targeted ions to pass along with the targeted ions. Nonetheless, as the ions continue to traverse the separation/gating paths 154, 156 they will continue to be separated based on mobility, and can be filtered by the subsequent gates 158b-c, 160b-c, which can be timed appropriately. Accordingly, only the ions having the correct mobility will be able to traverse all of the gates 158a-c, 160a-c, while all other ions will be eliminated. This is shown and described in additional detail in connection with FIGS. 12A-14B.

The multi-gate (multiplex) mode of operation increases the duty cycle of the SLIM filter 104 by allowing the on-board accumulation regions 144, 152 to accumulate ions for more time, e.g., because multiple packets can be separated at the same time in the separation/gating paths the on-board accumulation regions 144, 152 can continue to accumulate ions while the prior packets are being separated. Accordingly, the space charge limitations are overcome by separating multiple packets at the same time.

Additionally, it should be understood that more or less than three gates 158a-c, 160a-c can be used in each separation/gating path 154, 156, and more than two separation/gating paths 154, 156 can utilized as needed. Moreover, the construction of the SLIM filter 104 can be modified depending on which mode of operation it is being used in. For example, where the SLIM filter 104 is intended to be used in only the long path mode, then the switches 140, 148, the on-board accumulation regions 144, 152, and the gates 158a-c, 160a-c need not be included, but instead the pre-filter separation regions 138, 146 and the respective separation/gating path 154, 156 could each be configured as one long separation path that operate in parallel. For the pre-filter (serial) mode of operation, the gates 158a-c, 160a-c need not be included, but instead the SLIM filter 104 can be operated with the pre-filter separation regions 138, 146 and the respective separation/gating paths 154, 156 arranged in series. For the multi-gate (multiplex) mode of operation, the switches 140, 148 and the on-board accumulation regions 144, 152 need not be included, but instead the pre-filter separation regions 138, 146 and the respective separation/gating path 154, 156 could each be configured as one long separation path that includes a series of gates 158a-c, 160a-c. Nonetheless, the SLIM filter 104 can also be configured in any combination of components and modes of operation. For example, the SLIM filter 104 can combine all three of the long path (parallel), pre-filter (serial), and multi-gate (multiplex) modes of operation, as shown in FIG. 4, for example.

Figure 11:
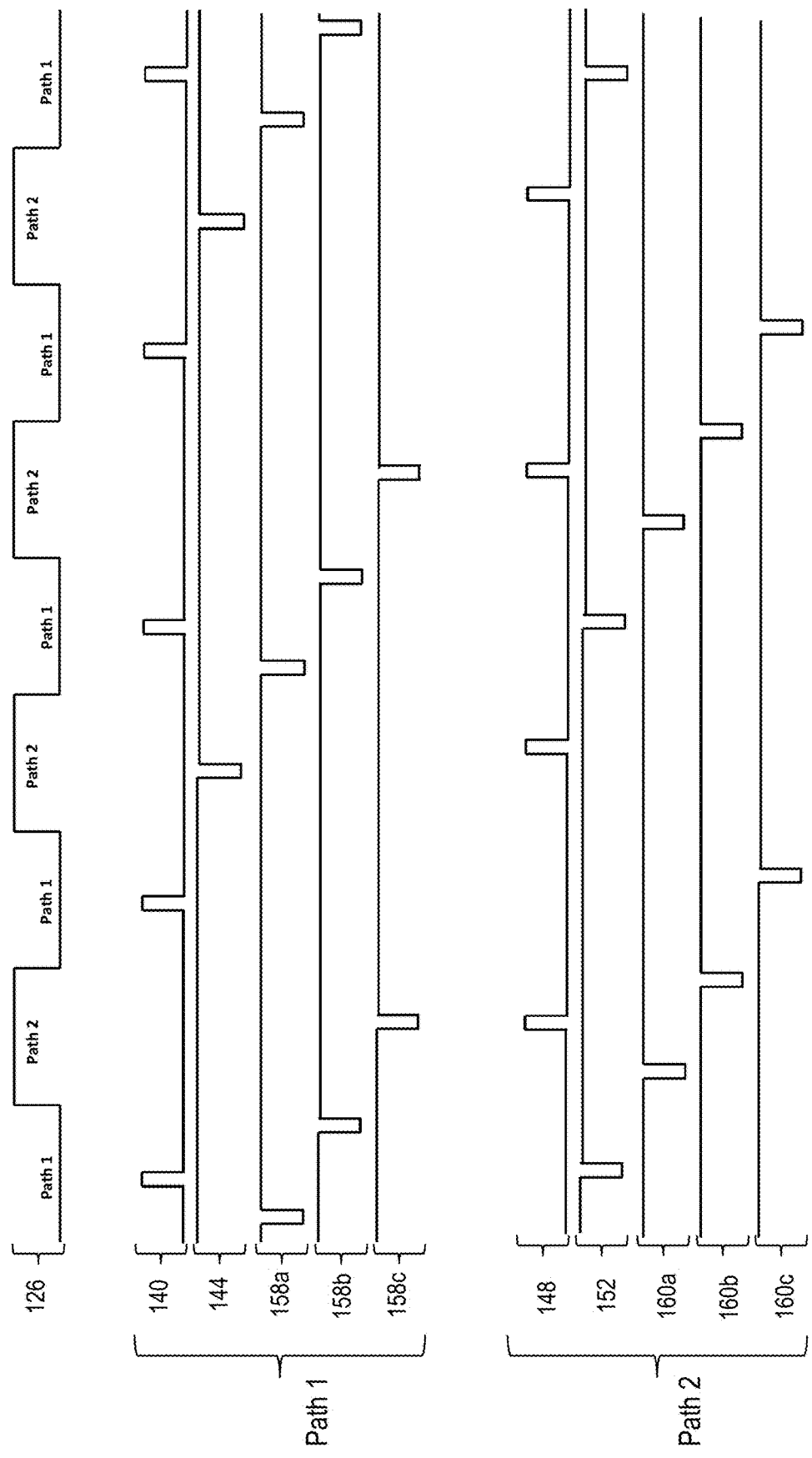
FIG. 11 shows graphs of exemplary timing control for signals applied to components of first and second paths of the SLIM filter.

FIG. 11 shows graphs of exemplary timing control of signals applied to components of the first and second paths of the SLIM filter 104, e.g., to the path selection switch 126, the first path switch 140, the first on-board accumulation region 144, the first path ion gates 158a-c, the second path switch 148, the second on-board accumulation region 152, and the second path ion gates 160a-c. As shown in FIG. 11, the path selection switch 126 alternates between providing ions to the first pre-filter separation region 138, e.g., the first path, represented by the low signal in FIG. 11, and the second pre-filter separation region 146, e.g., the second path, represented by the high signal in FIG. 11. The first and second path switches 140, 148 alternate between a first signal, represented by the low signal in FIG. 11, that directs ions to the respective first and second discard regions 142, 150 for elimination, and a second signal, represented by the high signal in FIG. 11, that directs ions to the respective first and second on-board accumulation regions 144, 152. These signals repeat and continue to alternate over time in order to continuously pre-filter ions. The first and second on-board accumulation regions 144, 152 also alternate between a first signal, represented by the high signal in FIG. 11, that accumulates ions, and a second signal, represented by the low signal in FIG. 11, that releases the accumulated ions, which form an enriched ion packet, into the respective first and second separation/gating paths 154, 156. As can be seen in FIG. 11, the on-board accumulation regions 144, 152 pulse the ions packets into the first and second separation/gating paths 154, 156 for separation and filtering, and the pulses of the second on-board accumulation region 152 are slightly delayed compared to the pulses of the first on-board accumulation region 144. Additionally, the first and second on-board accumulation regions 144, 152 can accumulate ions for multiple periods of time in which ions are directed thereto by the path selection switch 126.

As the ions traverse the first and second separation/gating paths 154, 156 and are separated by the traveling wave generated thereby, the first and second path ion gates 158a-c, 160a-c are periodically switched between a first signal and a second signal in order to eliminate ions having non-targeted mobilities. Specifically, the ion gates 158a-c, 160a-c can be normally in an active state where the ion gates 158a-c, 160a-c receive and generate a signal that attracts ions, represented by the high signal in FIG. 11, and switched to a deactivated state, represented by the low signal in FIG. 11, where the ion gates 158a-c, 160a-c receive and generate a signal that repels ions and maintains the ions within the separation/gating paths 154, 156. The ion gates 158a-c, 160a-c can be switched from the active state to the deactivated state when targeted ion are approaching or in the portion of the first and second long separation/gating paths 154, 156 adjacent the ion gates 158a-c, 160a-c. As shown in FIG. 11, the ion gates 158a-c, 160a-c can be sequentially pulsed to allow the targeted ions to pass through the SLIM filter 104.

Figure 12A:
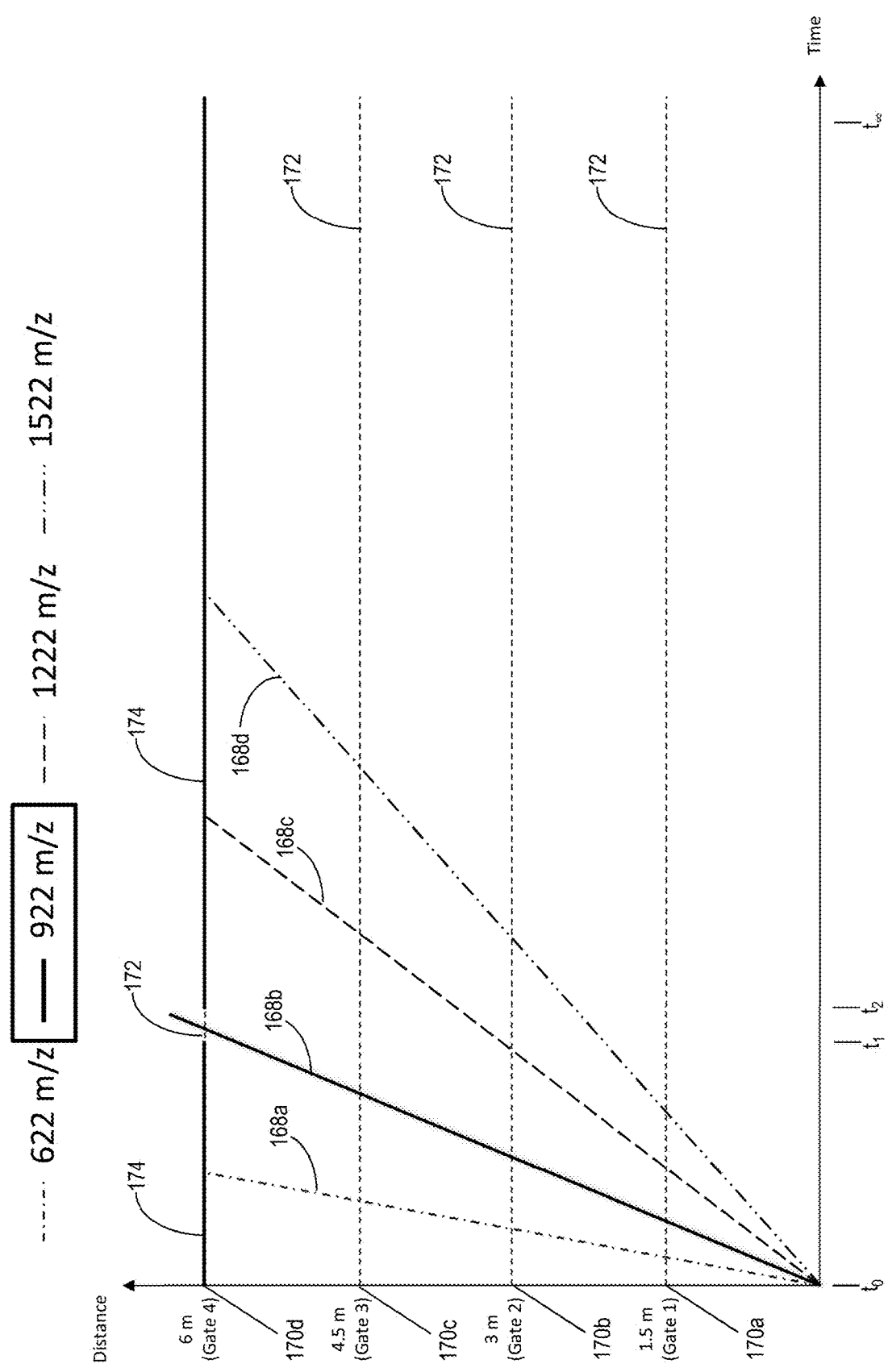
FIG. 12A is a plot of distance as a function of time for a single ion packet containing ions having a mass to charge ratio (m/z) of 622, 922, 1222, and 1522 showing the arrival time for each of the ions at four gates and the time of activation for the fourth gate.

FIG. 12A is a plot of distance as a function of time for individual ions 168a-d of a single ion packet that have different mobilities (denoted by their respective mass to charge ratios—622 m/z, 922 m/z, 1222 m/z, and 1522 m/z) showing each individual ion's 168a-d position as it traverses a separation/gating path 154, 156 that has four ion gates 170a-d. The first ion gate 170a can be placed at 1.5 meters of the separation/gating path 154, 156, the second ion gate 170b can be placed at 3.0 meters of the separation/gating path 154, 156, the third ion gate 170c can be placed at 4.5 meters of the separation/gating path 154, 156, and the fourth ion gate 170d can be placed 6.0 meters of the separation/gating path 154, 156. As shown in FIG. 12A, the ions 168a-d each have different mobilities and therefore traverse the separation/gating path 154, 156 at different speeds, represented by the respective slopes. As such, each of the ions 168a-d will arrive at the four ion gates 170a-d at different times. Accordingly, the ion gates 170a-d can be used to filter undesired ions.

For example, as shown in FIG. 12A, the first, second, and third ion gates 170a-c can be deactivated from $t_0$ until $t_\infty$, represented by a dashed line 172 which allows all ions to pass through and continue along the separation/gating path 154, 156. However, the fourth ion gate 170d can be used to eliminate non-targeted ions and allow the targeted ion to pass. For example, if the second ion 168a (922 m/z) is targeted, then the fourth ion gate 170d can be activated from to until $t_1$, shown as a solid line 174, to attract and eliminate the first ion 168a which is known to arrive at the fourth ion gate 170d during that time period, deactivated from $t_1$ until $t_2$, shown as the dashed line 172 to allow the second ion 168b to pass, and reactivated from $t_2$ until $t_\infty$, shown in the solid line 174, to attract and eliminate the third and fourth ions 168c-d which will be known to arrive at the fourth ion gate 170d during that time period.

Figure 12B:
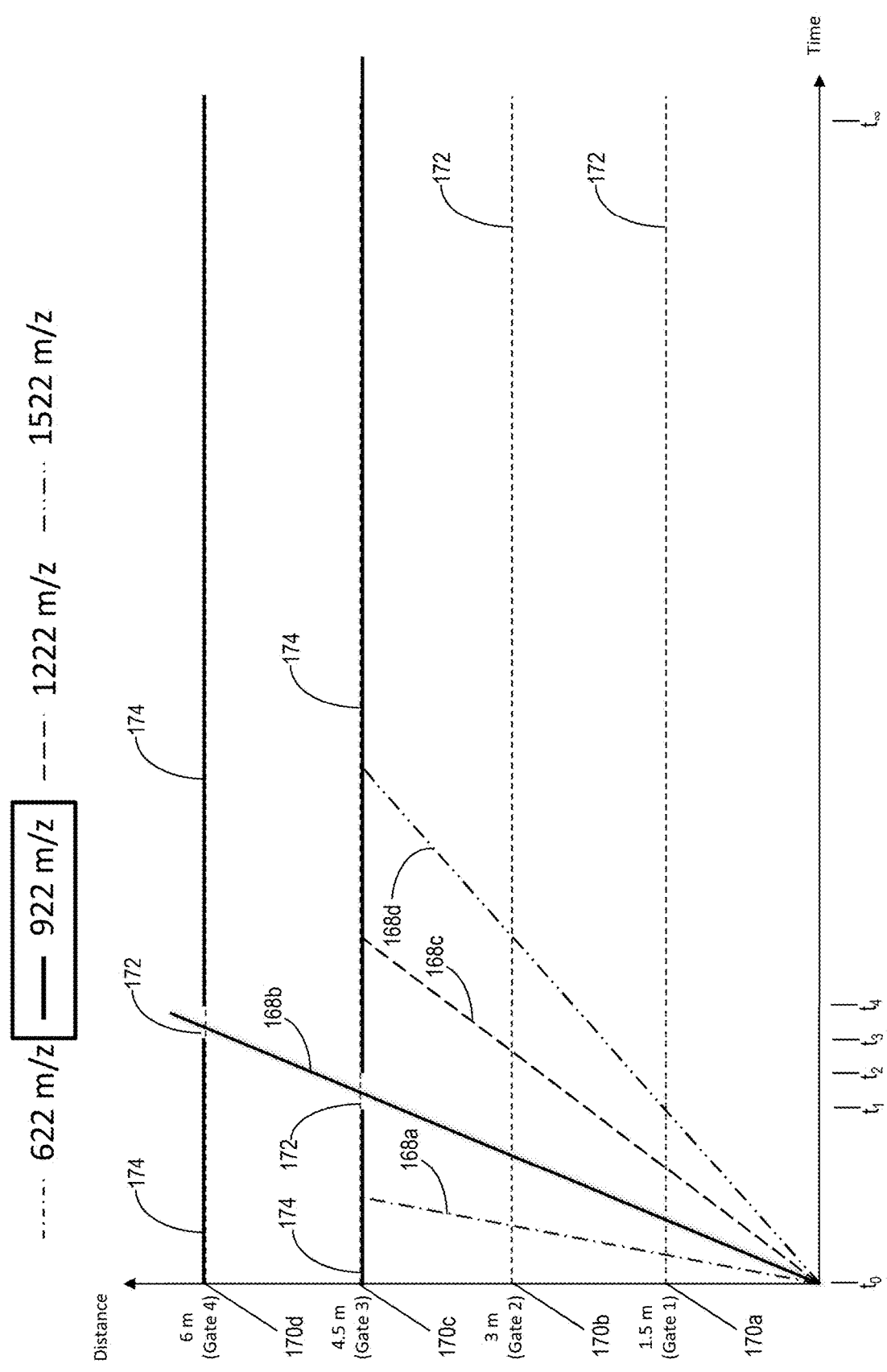
FIG. 12B is a plot of distance as a function of time for a single ion packet containing ions having a mass to charge ratio (m/z) of 622, 922, 1222, and 1522 showing the arrival time for each of the ions at the four gates and the time of activation for the third and fourth gates.

FIG. 12B shows the plot of FIG. 12A, but with both the third and fourth gates 170c-d activated for a period of time to allow passage of the targeted second ion 168b. As shown in FIG. 12B, multiple gates can be used along the separation/gating paths 154, 156 to further increase the accuracy of the filtering and ensure that only the desired ions are allowed to pass through the entire separation/gating path 154, 156. For example, if the second ion 168b is targeted, the third gate 170c can be activated from $t_0$ until $t_1$, shown in the solid line 174, to attract and eliminate the first ion 168a which will be known to arrive at the third ion gate 170c during that time period, deactivated from $t_1$ until $t_2$, shown as the dashed line 172 to allow the second ion 168b to pass, and reactivated from $t_2$ until $t_\infty$ to attract and eliminate the third and fourth ions 168c-d which will be known to arrive at the third ion gate 170c during that time period. Additionally, the fourth ion gate 170d can be activated from to until $t_3$ to attract and eliminate any non-targeted ions that may have passed through the third ion gate 170c, deactivated from $t_3$ until $t_4$ to allow the second ion 168b to pass, and reactivated from $t_4$ until $t_\infty$ to attract and eliminate any other non-targeted ions that may have passed through the third ion gate 170c.

Figure 13A:
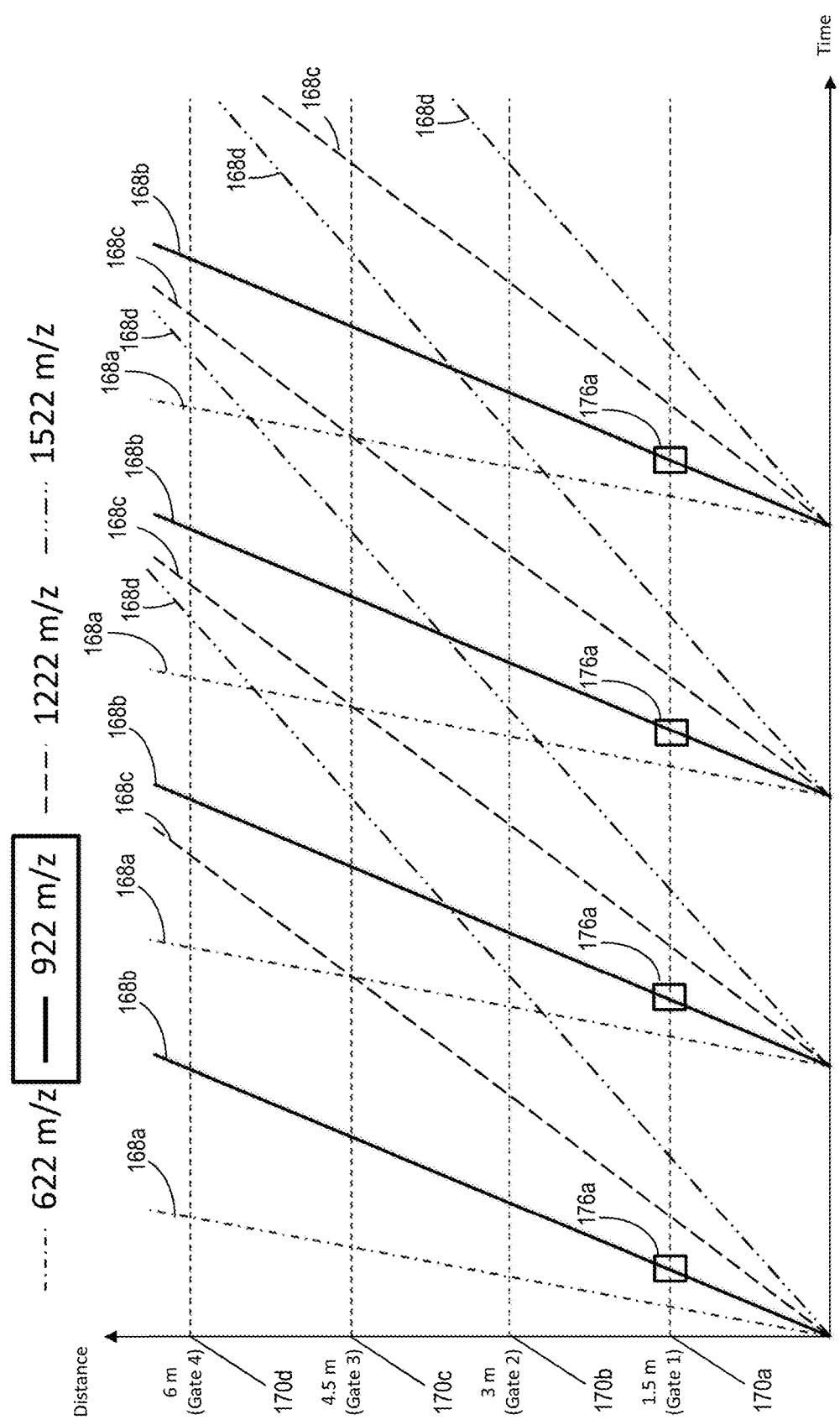
FIG. 13A is a plot of distance as a function of time for a plurality of ion packets containing ions having a mass to charge ratio (m/z) of 622, 922, 1222, and 1522 showing the arrival time for each of the ions of each of the ion packets at the four gates and highlighting the time of arrival at the first gate for a targeted ion.
Figure 13B:
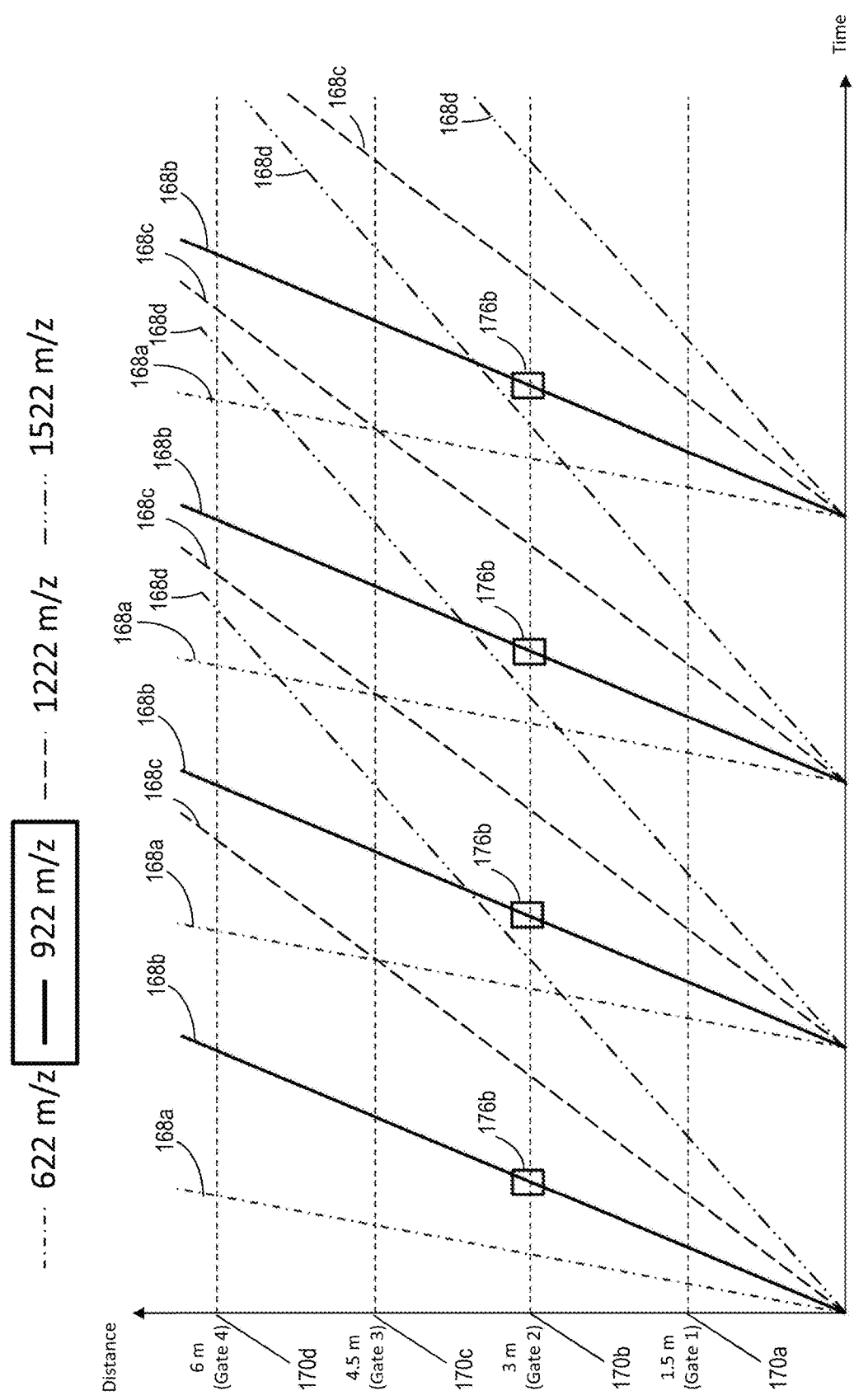
FIG. 13B is the plot of FIG. 14A and highlighting the targeted ion's time of arrival at the second gate.
Figure 13C:
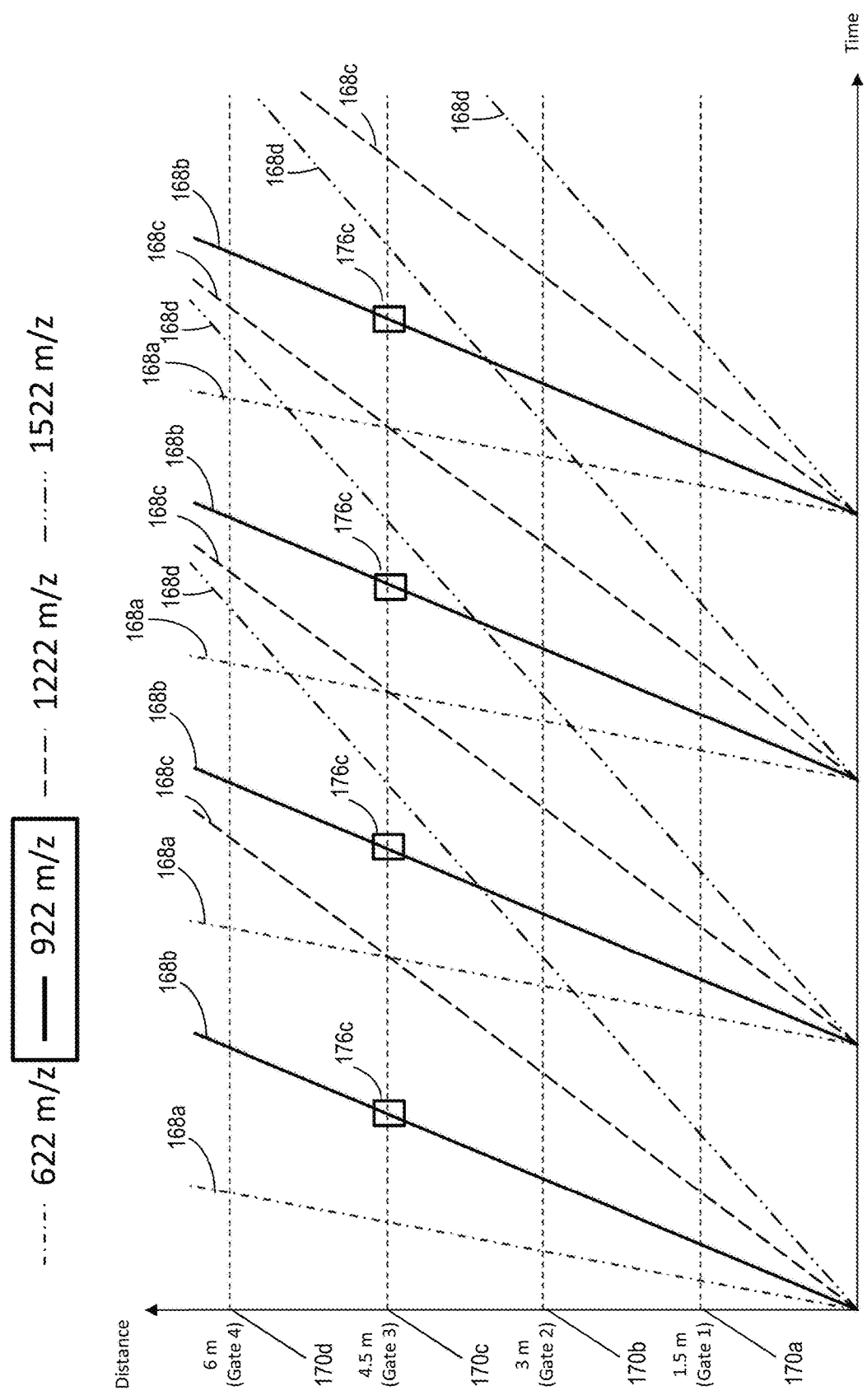
FIG. 13C is the plot of FIG. 14A and highlighting the targeted ion's time of arrival at the third gate.
Figure 13D:
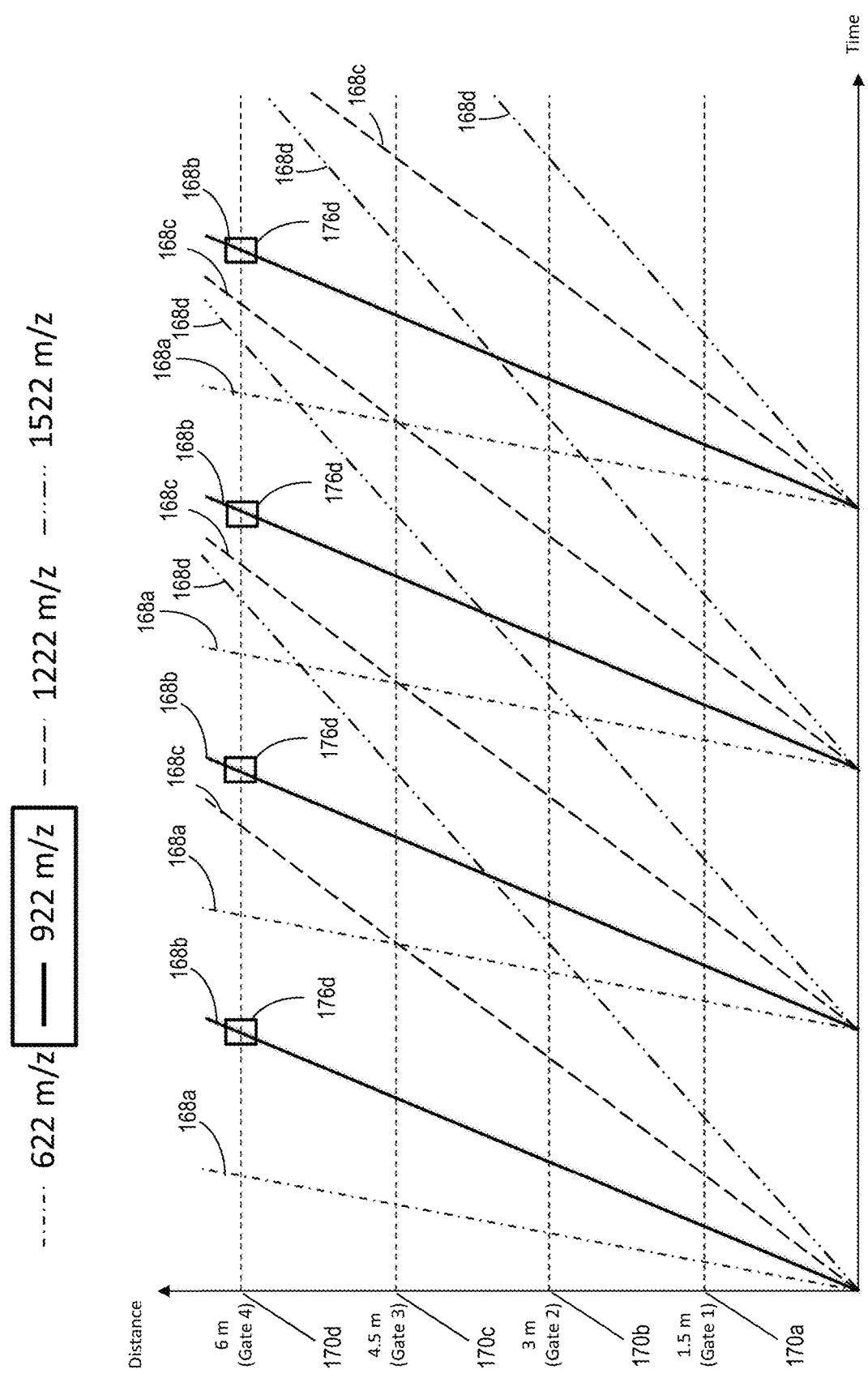
FIG. 13D is the plot of FIG. 14A and highlighting the targeted ion's time of arrival at the fourth gate.

FIG. 13A is a plot of distance as a function of time for a plurality of ion packets each containing the same individual ions 168a-d showing the arrival time for each of the ions 168a-d of the ion packets at the four gates 170a-d of the separation/gating path 154, 156, and showing first gate passage windows 176a at the first gate 170a for the targeted ion, e.g., the second ion 168b. FIG. 13B is the plot of FIG. 13A showing second gate passage windows 176b at the second gate 170b for the targeted ions, e.g., the second ion 168b. FIG. 13C is the plot of FIG. 13A showing third gate passage windows 176c at the third gate 170c for the targeted ions, e.g., the second ion 168b. FIG. 13D is the plot of FIG. 13A showing fourth gate passage windows 176d at the fourth gate 170d for the targeted ions, e.g., the second ion 168b.

The passage windows 176a-d shown in FIGS. 13A-D represent the time for which the respective ion gates 170a-d must be deactivated, e.g., receive and generate a signal that repels ions, and the spatial distance that the second ion 168b must traverse while the ion gates 170a-d are deactivated in order to successfully pass through each of the gates 170a-d. More specifically, the passage windows 176a-d each span a time period, which is the time for which the gate 170a-d is deactivated and repelling ions, as well as a distance, which is the length of the respective gate 170a-d. This is because for an ion to avoid being eliminated, it must traverse the entire length of the gate 170a-d while that gate 170a-d is deactivated, or else it will be drawn to the gate electrode and eliminated. Accordingly, for an ion to fully pass through each gate 170a-d, it must not only enter the gate 170a-d while the gate 170a-d is deactivated, but it must also exit the gate 170a-d before the gate 170a-d is reactivated. As such, the windows 176a-d shown in FIGS. 13A-D illustrate the full time periods in which the gates 170a-d must be deactivated in order to ensure that the second ions 168b successfully pass through the gates 170a-d.

Figure 14A:
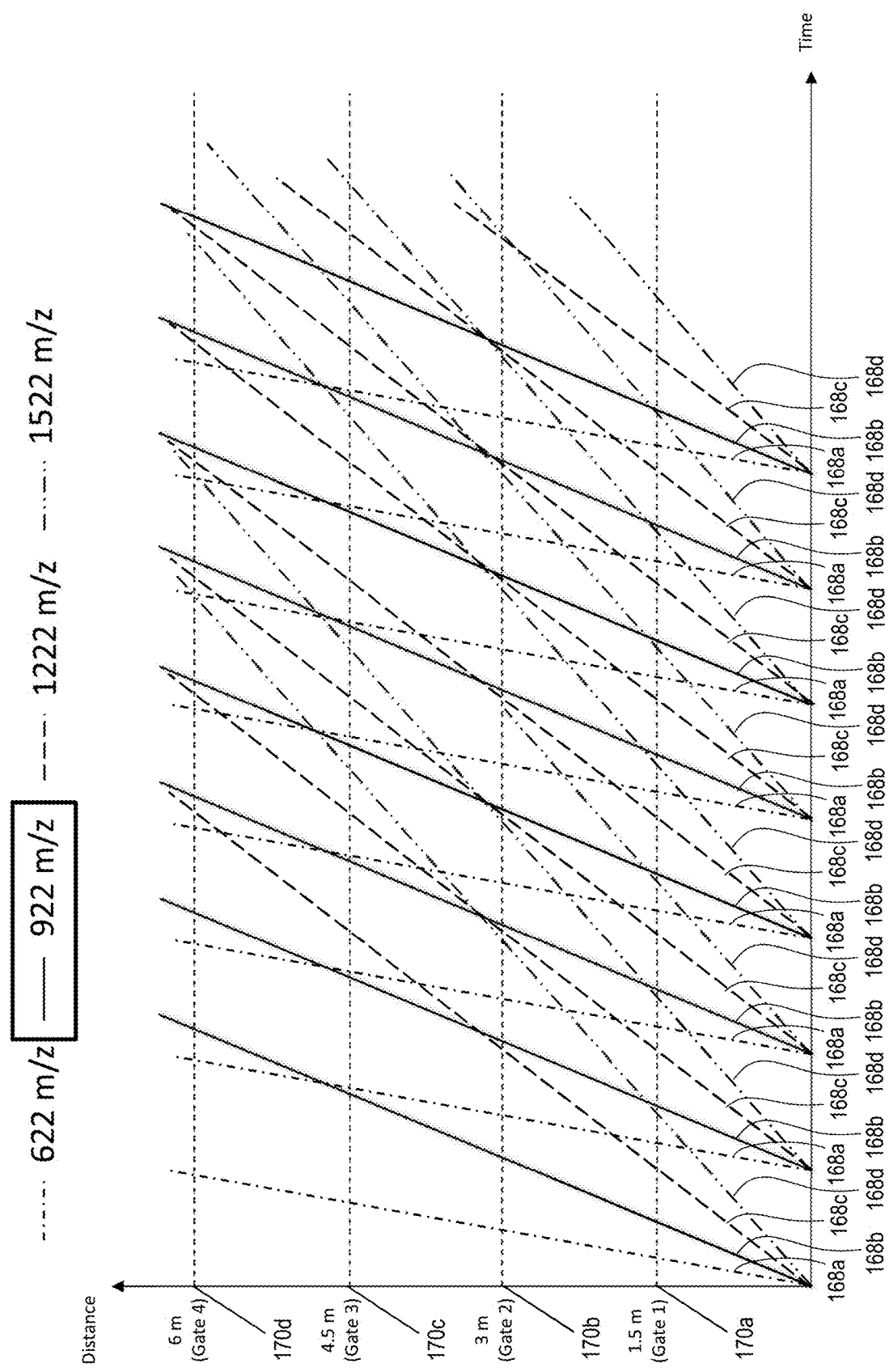
FIG. 14A is another plot of distance as a function of time for a plurality of ion packets each containing ions having a mass to charge ratio (m/z) of 622, 922, 1222, and 1522 showing the arrival time for each of the ions of each of the ion packets at the four gates.

FIG. 14A is another plot of distance as a function of time for a plurality of ion packets, e.g., eight, each containing all of the individual ions 168a-d showing the arrival time for each of the ions 168a-d of the ion packets at the four gates 170a-d of the separation/gating path 154, 156. In particular, FIG. 14A illustrates the flow of ions 168a-d through a separation/gating path 154, 156 of a SLIM filter 104 when operated in the multi-gate (multiplex) mode of operation with the multiple ion packets being released into the separation/gating path 154, 156 for simultaneous separation and filtering. As can be seen in FIG. 14A, the travel paths of ions of different mobilities from different ion packets can intersect along the separation/gating path 154. In particular, ions having a higher mobility, e.g., the second ions 168b having a mass to charge ratio of 922 m/z, from a later released ion packet can eventually catch-up to ions having a lower mobility, e.g., the fourth ions 168d having a mass to charge ratio of 1522 m/z, from a previously released ion packet. This can result in ions that are not targeted passing through one of the ion gates 170a-d with a targeted ion, e.g., if the ions are passing an ion gate 170a-d at the same time. The possibility of this occurring increases when more ion packets are simultaneously separated, and when the time between releasing ion packets into the separation/gating paths 154, 156 is decreased, as shown in FIG. 14A. However, as described above, by utilizing multiple sequential gates 170a-d the ions that are not targeted, but nonetheless managed to pass through one of the gates 170a-d, can be filtered and eliminated by a subsequent gate 170a-d.

Figure 14B:
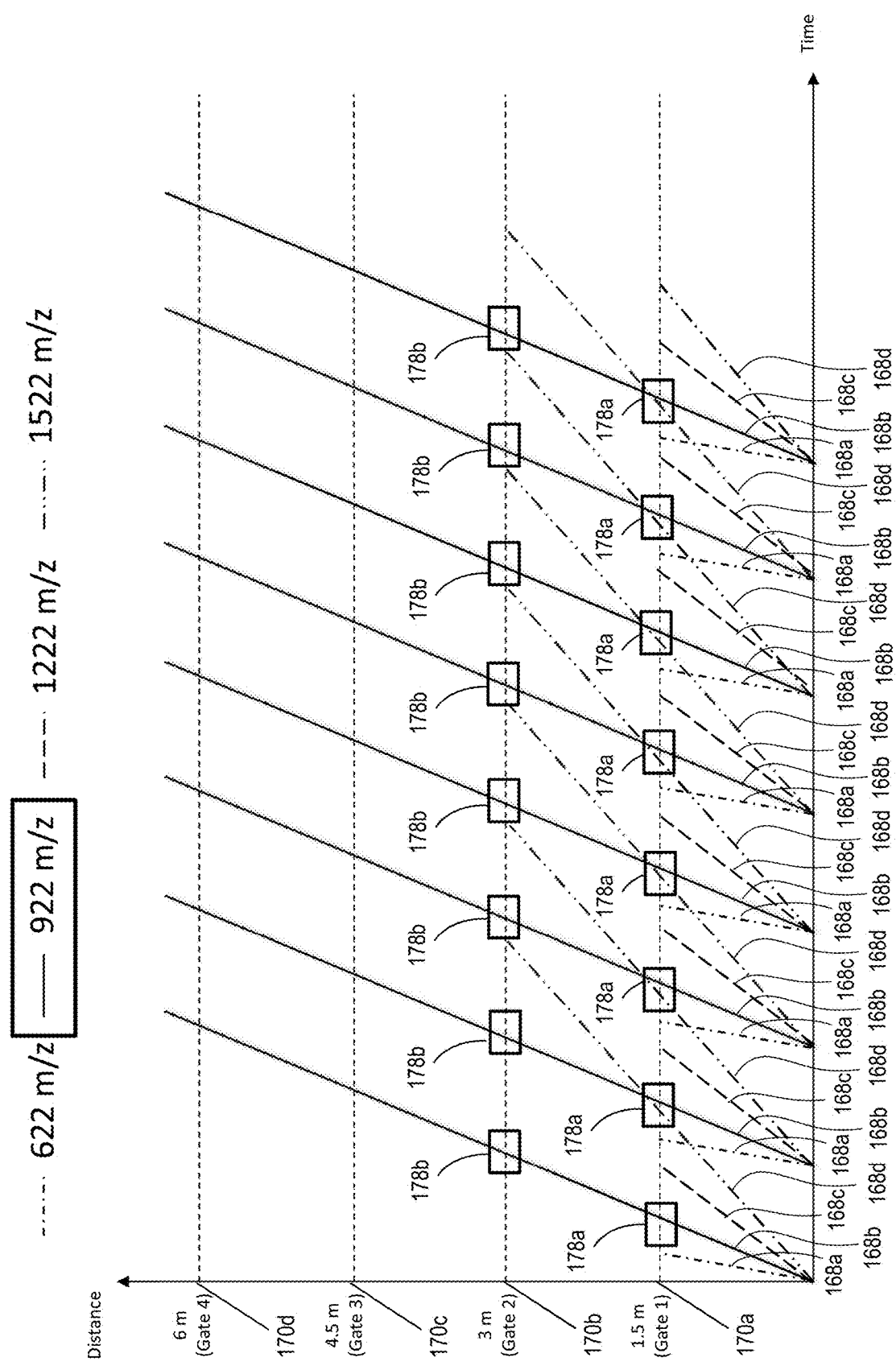
FIG. 14B is the plot of FIG. 15A showing time of activation of the first and second gates and showing the effect on each of the ions of each of the ion packets.

The foregoing is illustrated, for example, in FIG. 14B, which shows the plot of FIG. 14A, but with first gate passage windows 178a shown for the first gate 170a targeting the second ions 168b and second gate passage windows 178b shown for the second gate 170b targeting the second ions 168b. The first gate passage windows 178a represent the period of time and distance in which the first gate 170a is deactivated and thus allowing ions to pass. The second gate passage windows 178b represent the period of time and distance in which the second gate 170b is deactivated and thus allowing ions to pass. As can be seen in FIG. 14B, not only do the targeted second ions 168b pass through the first gate 170a, but the fourth ions 168d also pass through the first gate 170a due to their lower mobility, which allows second ions 168b from subsequent ion packets to "catch up" to the fourth ions 168d of the previous ion packets. However, activation of the second gate 170b is timed such that the fourth ions 168d that passed through the first gate 170a are eliminated by the second gate 170b, but the second ions 168b are permitted to pass through. Accordingly, the multi-gate (multiplex) mode of operation allows for multiple ion packets to be simultaneously separated and filtered, thus increasing the accumulation time of the SLIM filter 104.

Figure 15A:
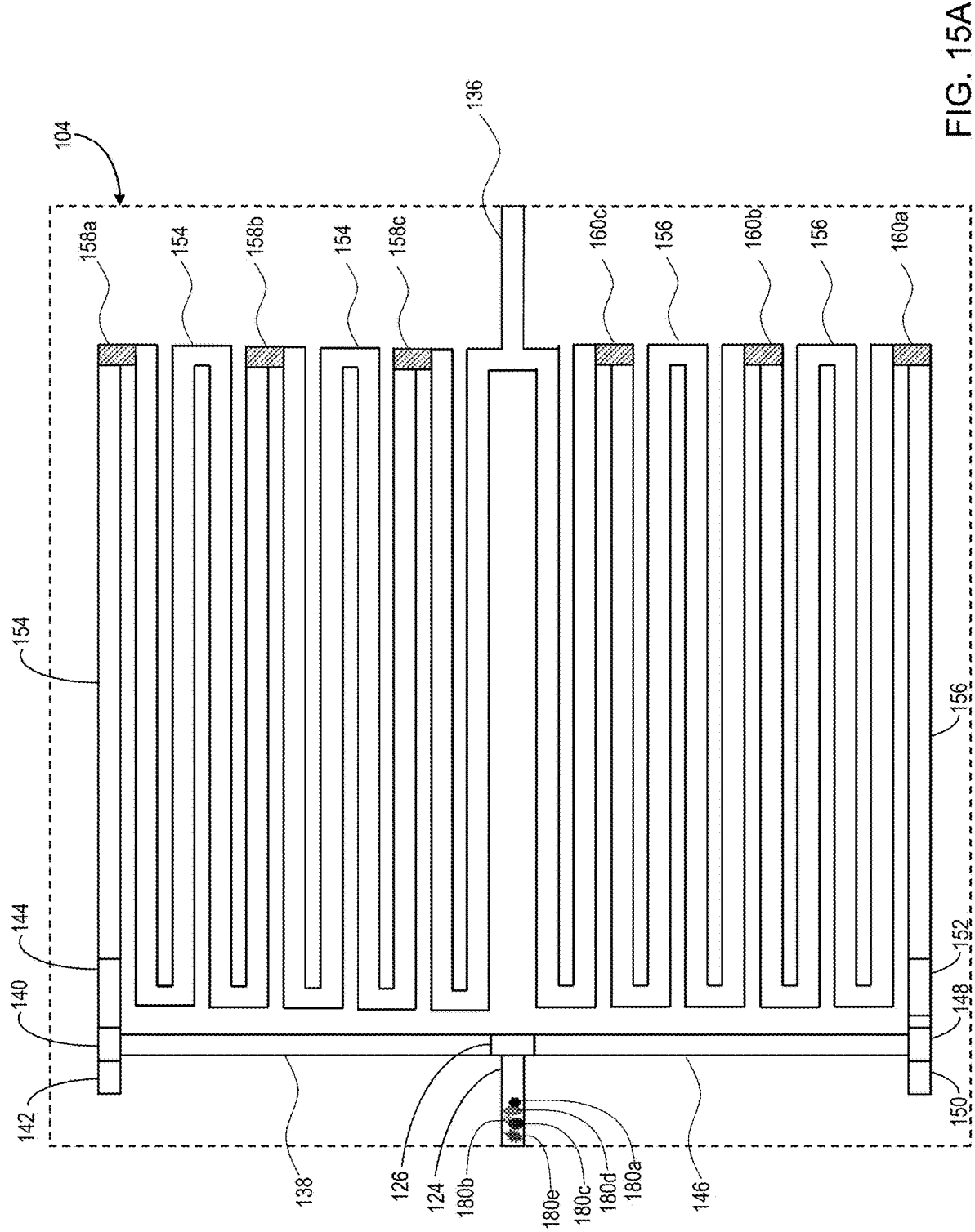
FIGS. 15A-P are schematic diagrams of the SLIM filter of FIG. 4 showing the positions of ions in the SLIM filter at different sequential points in time.
Figure 15B:
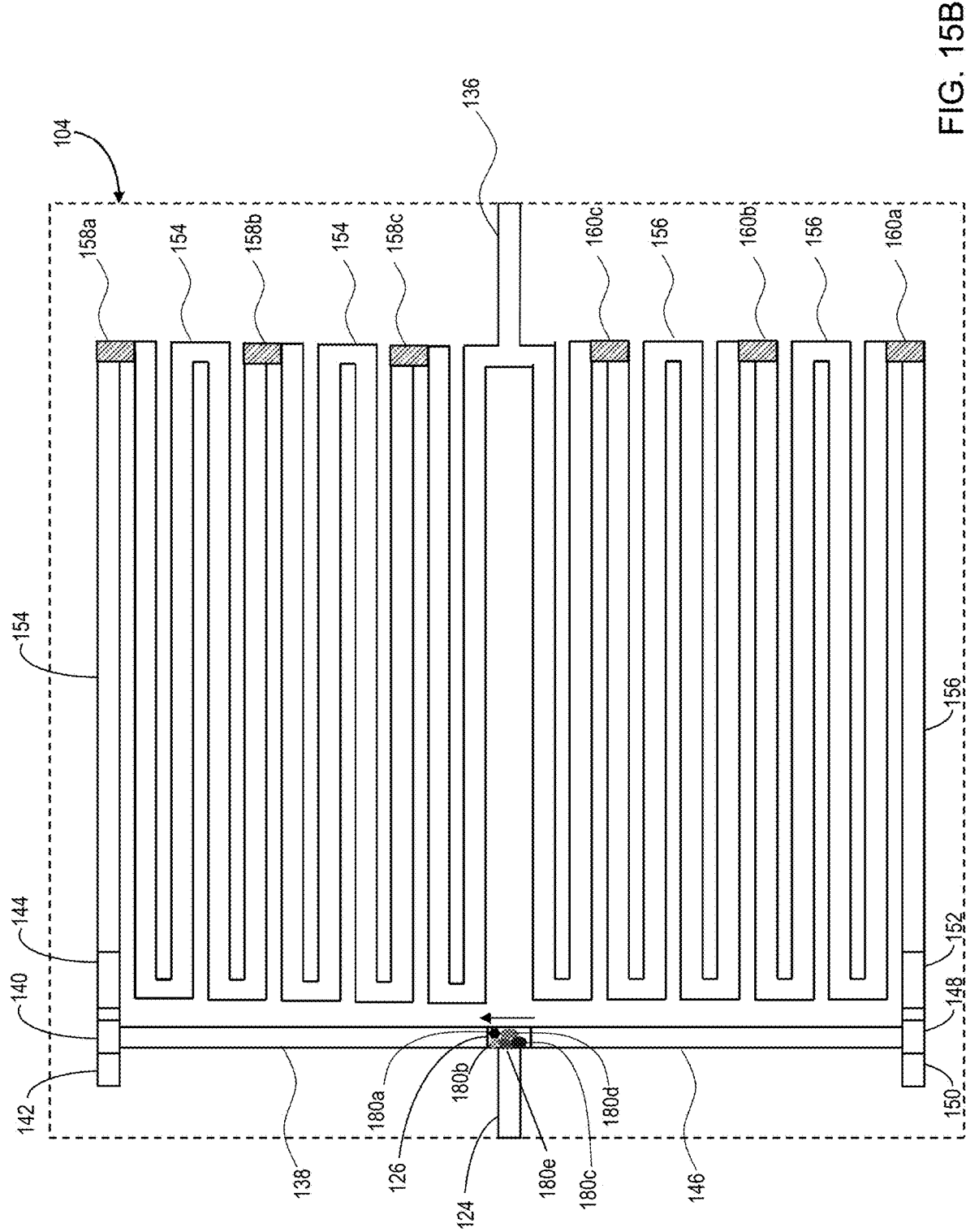
Figure 15C:
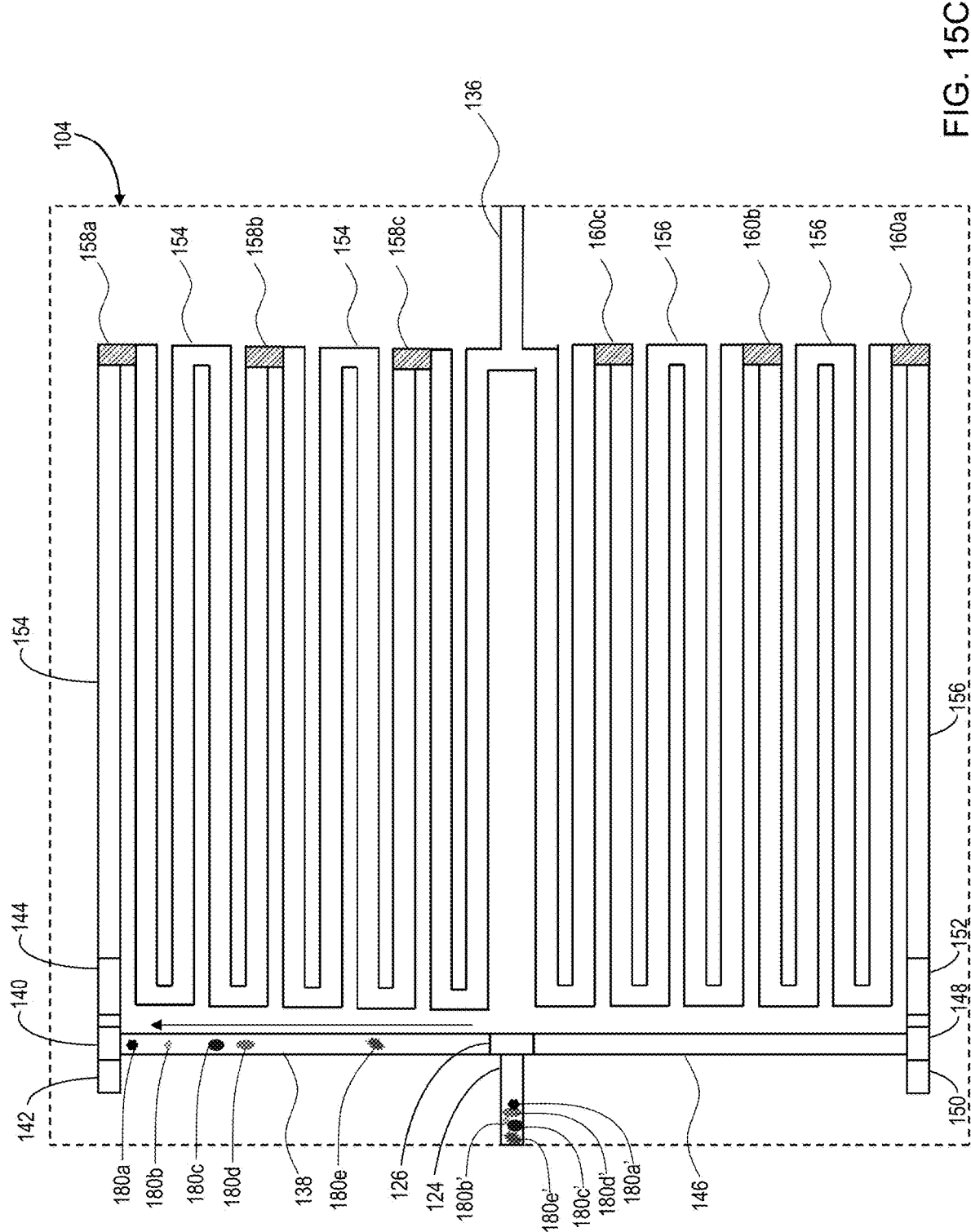
Figure 15D:
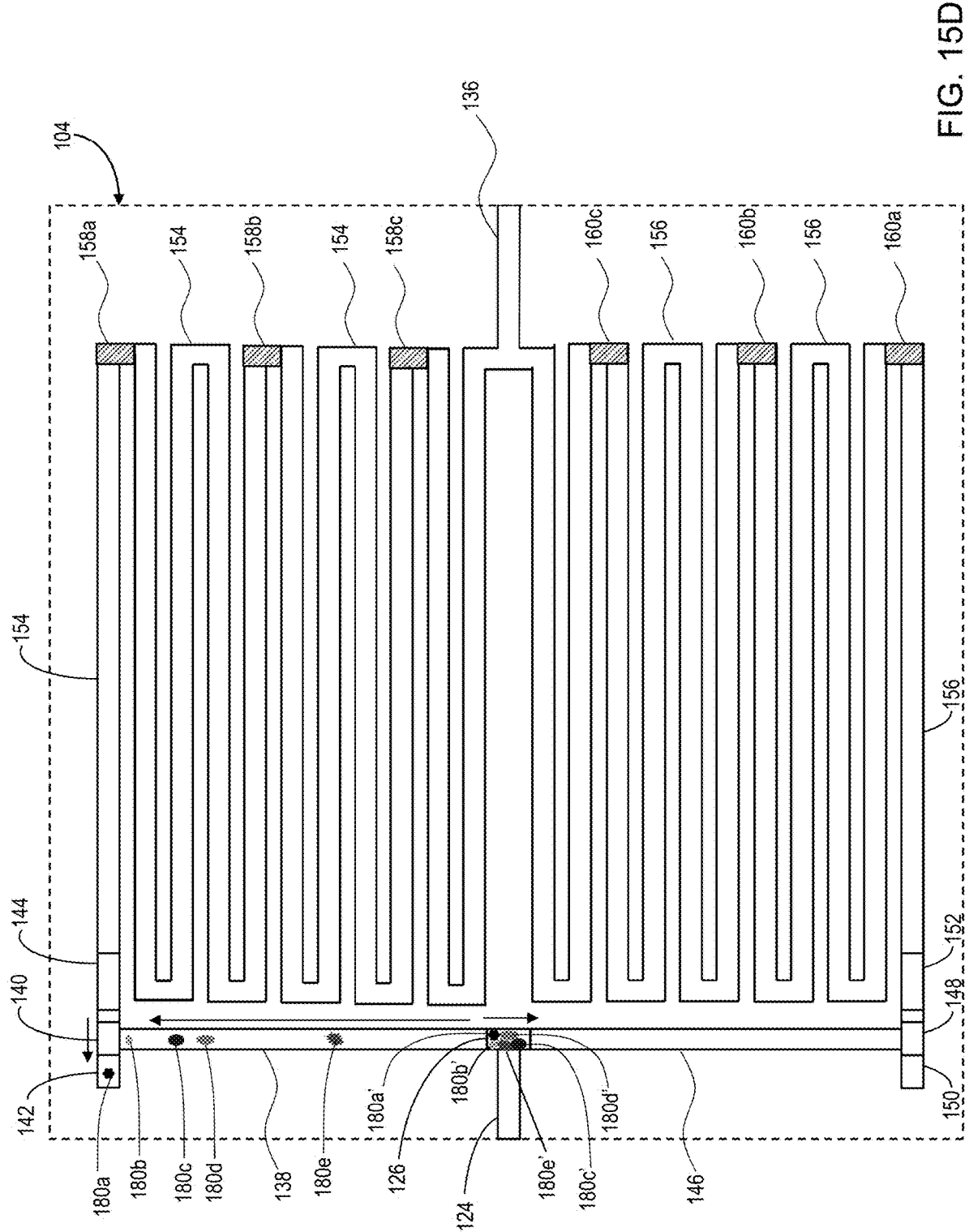
Figure 15E:
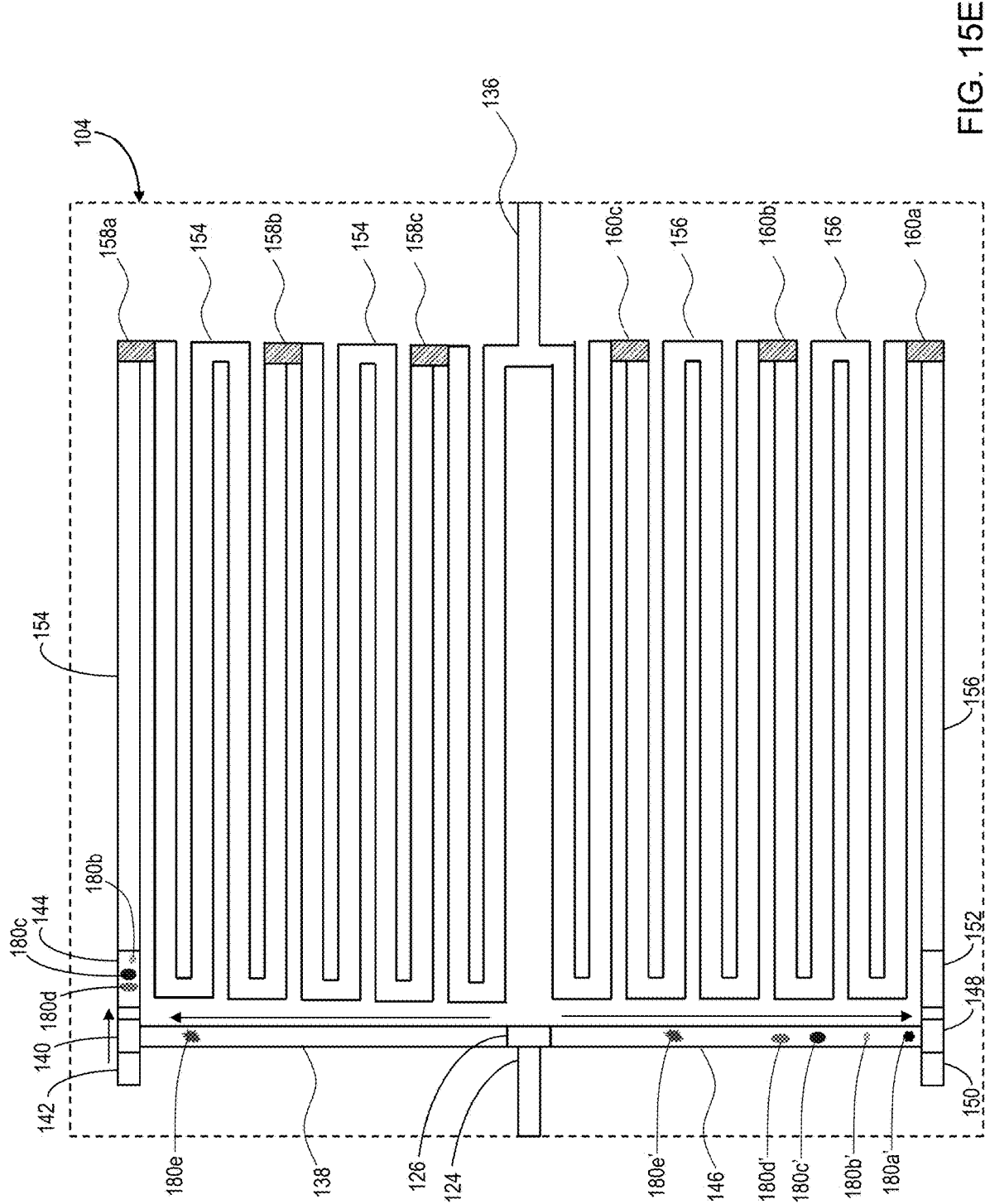
Figure 15F:
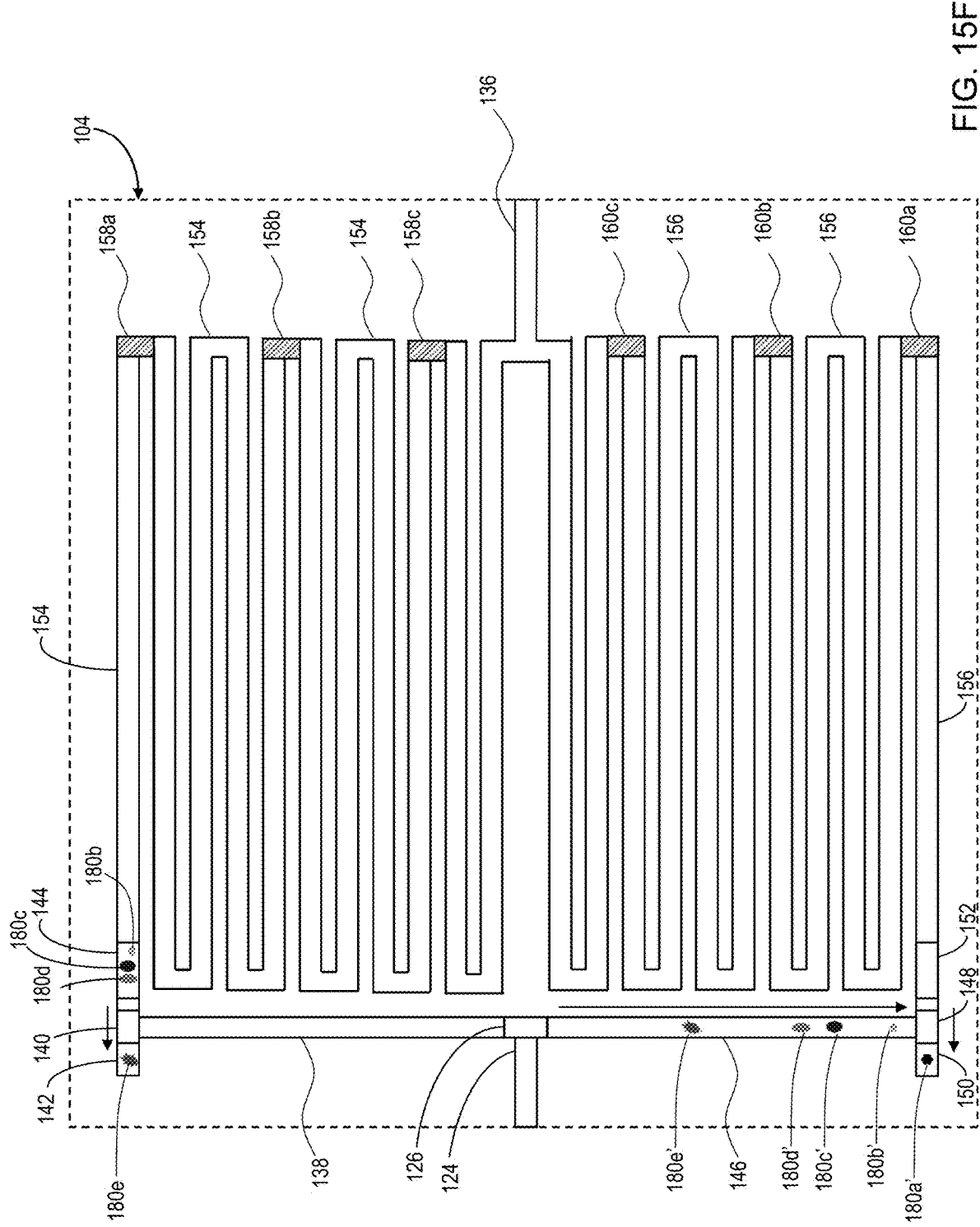
Figure 15G:
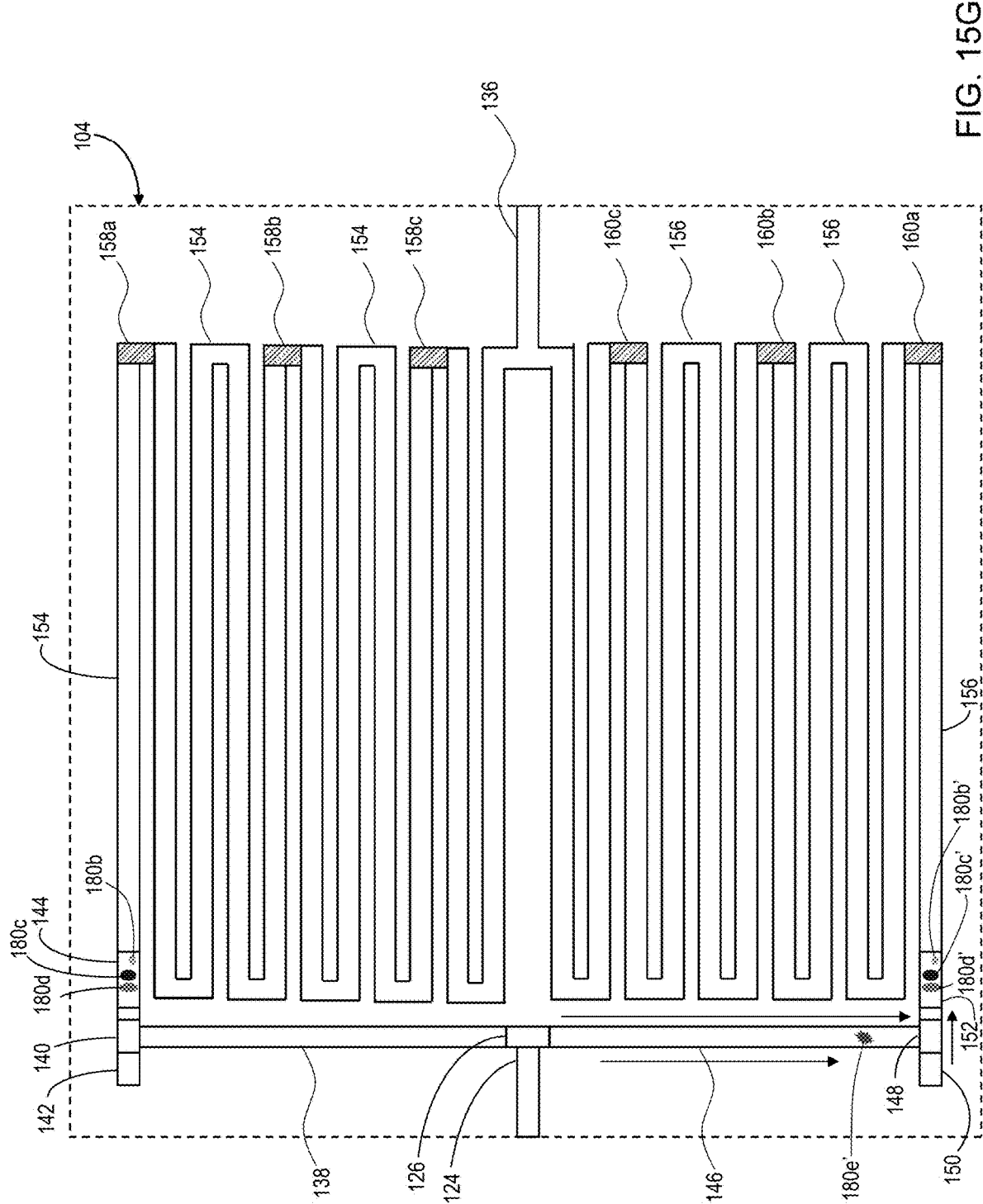
Figure 15H:
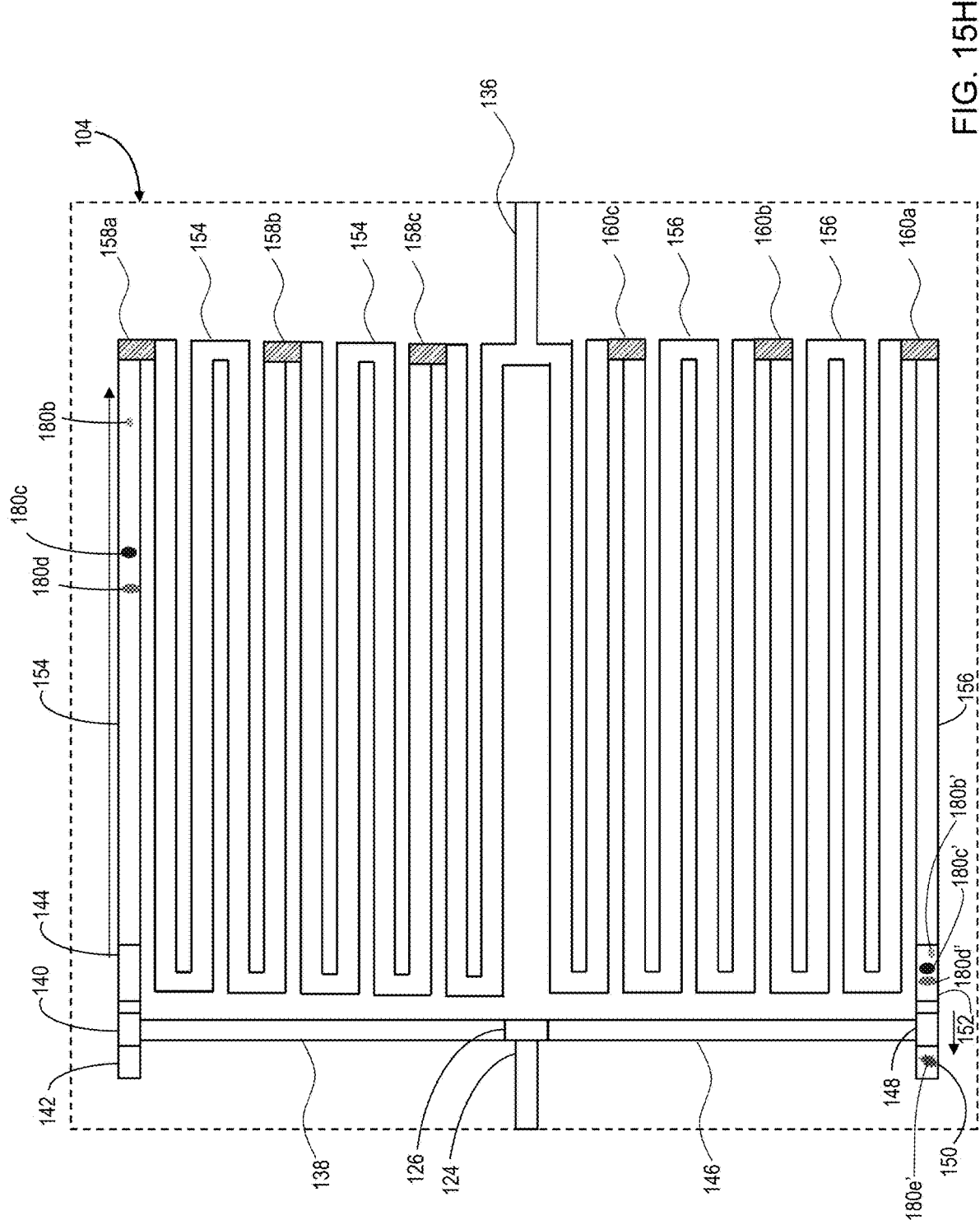
Figure 15I:
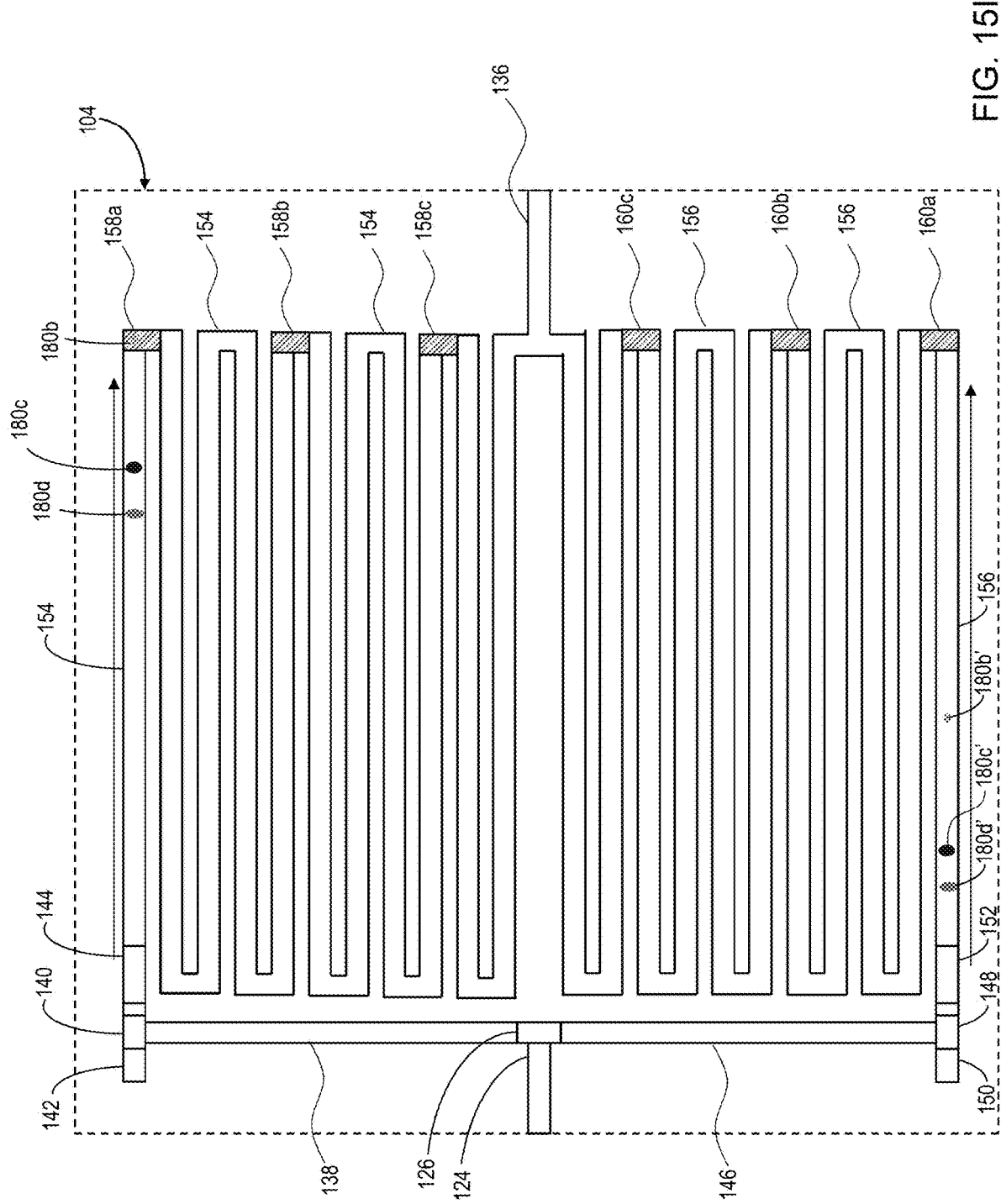
Figure 15J:
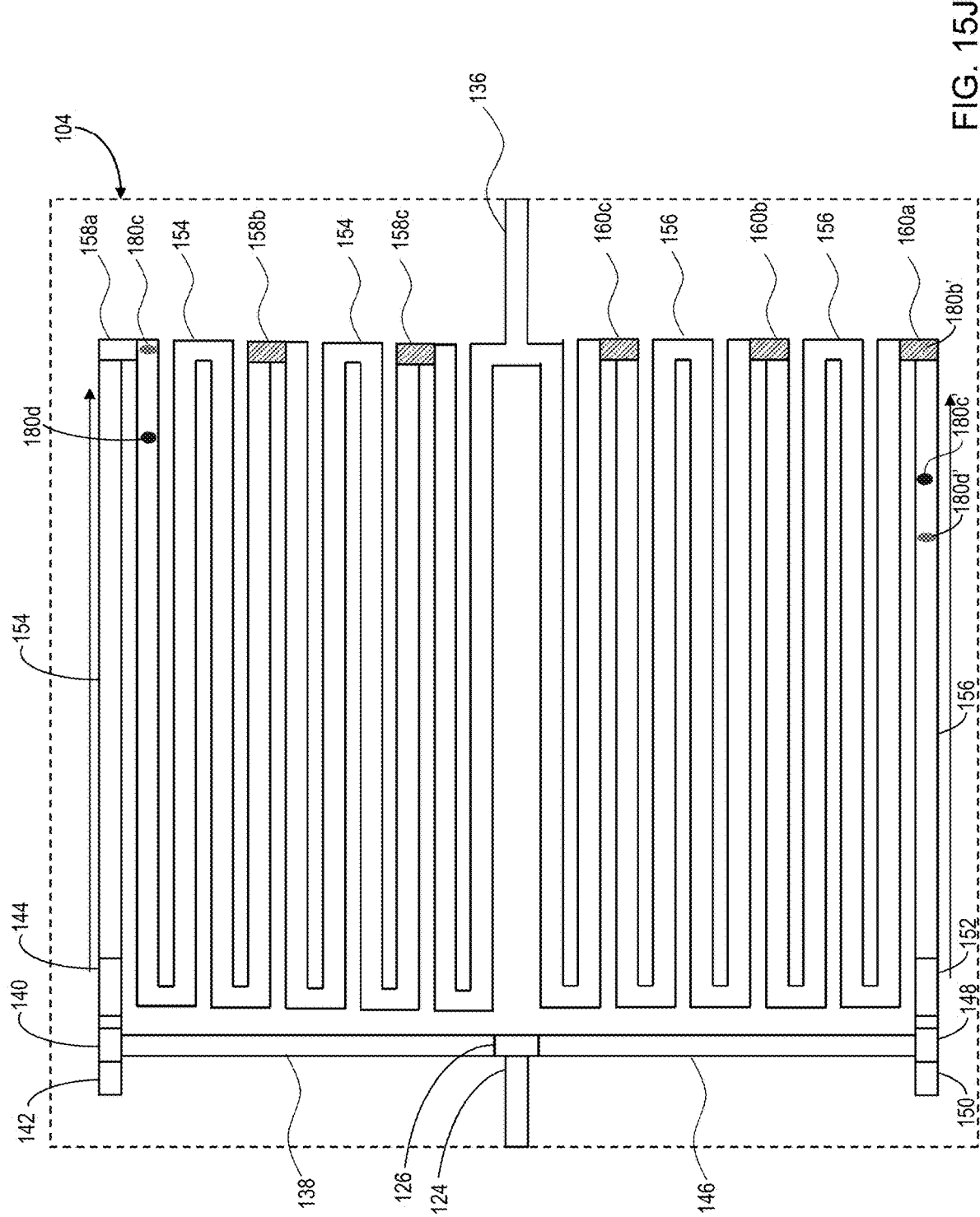
Figure 15K:
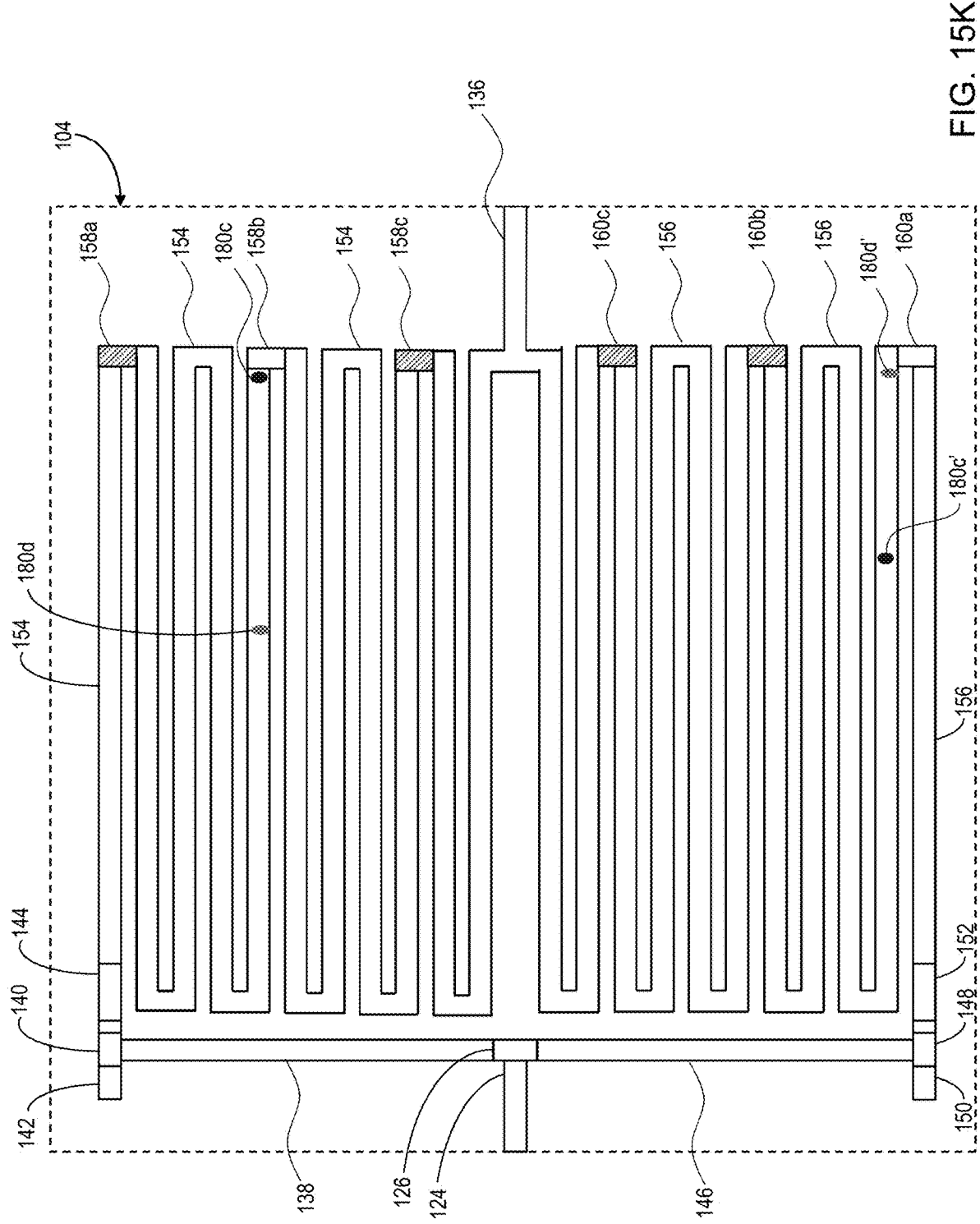
Figure 15L:
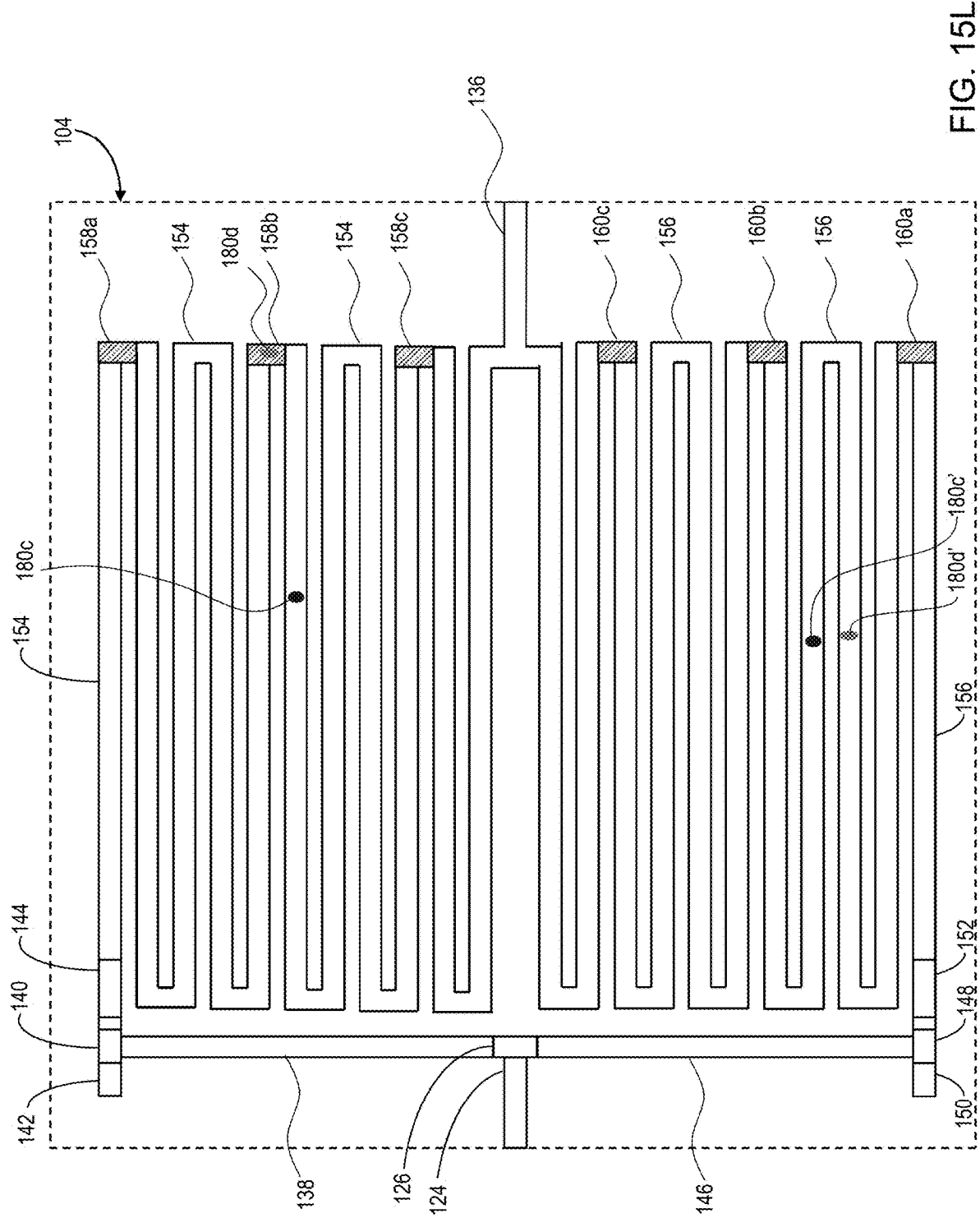
Figure 15M:
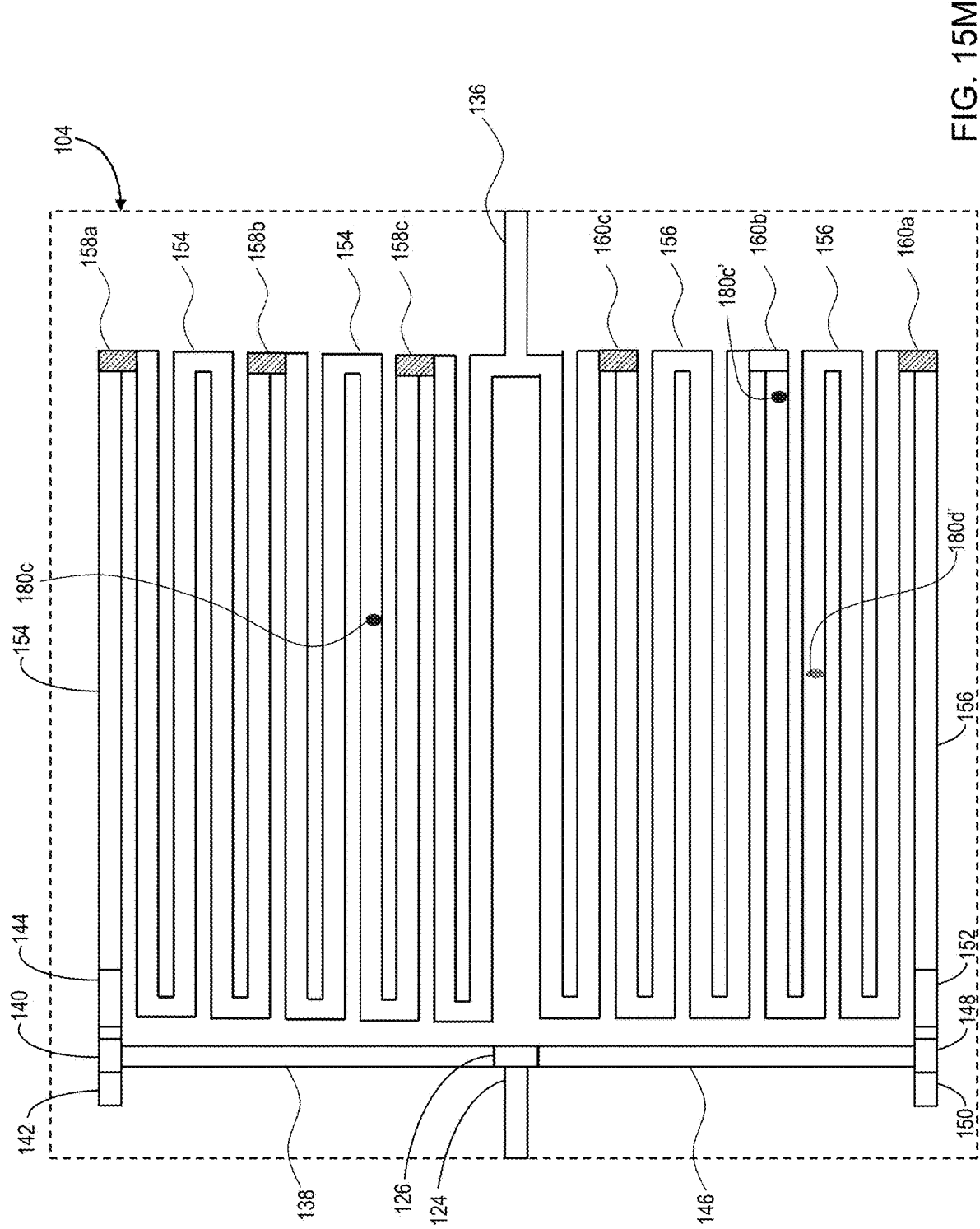
Figure 15N:
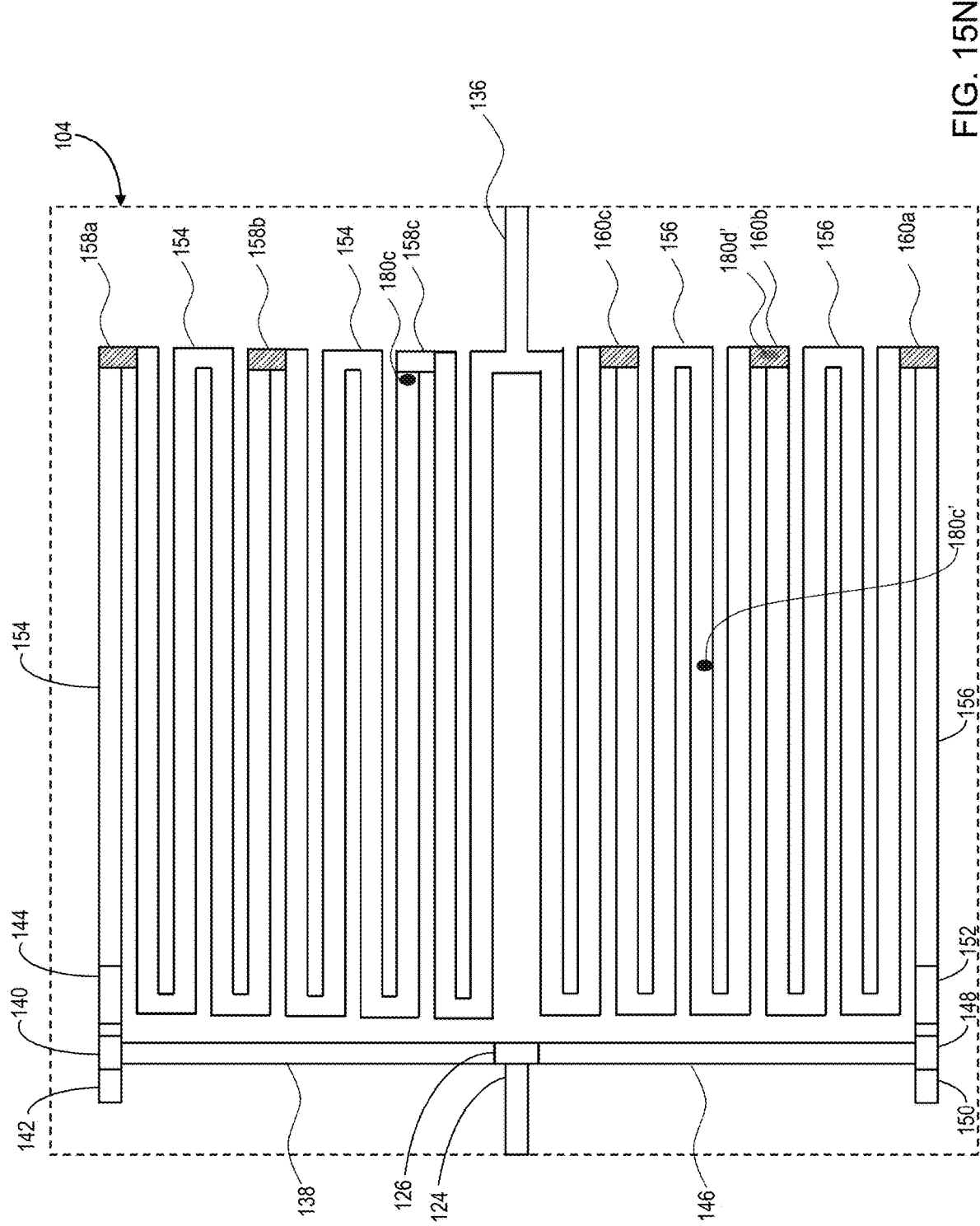
Figure 15O:
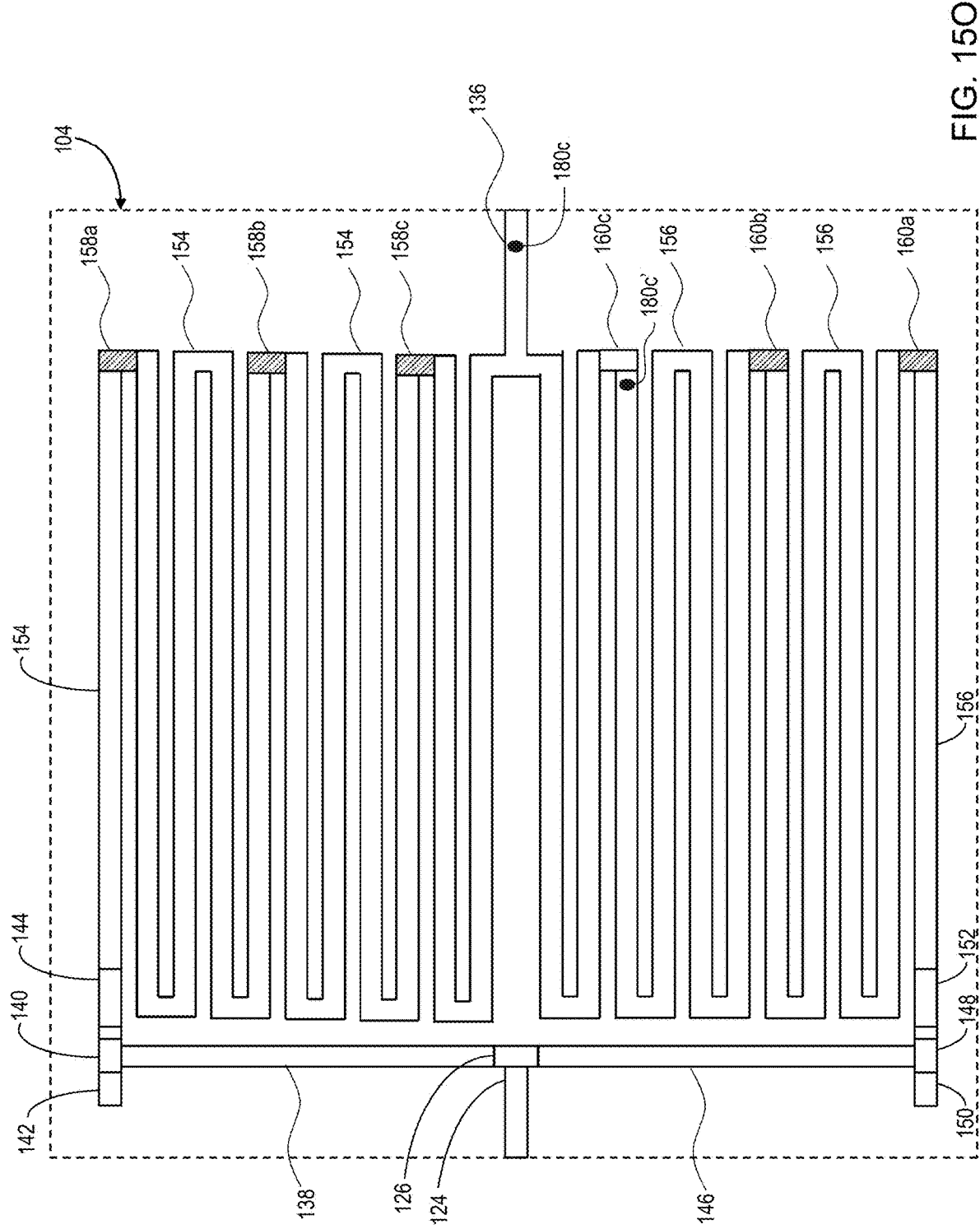
Figure 15P:
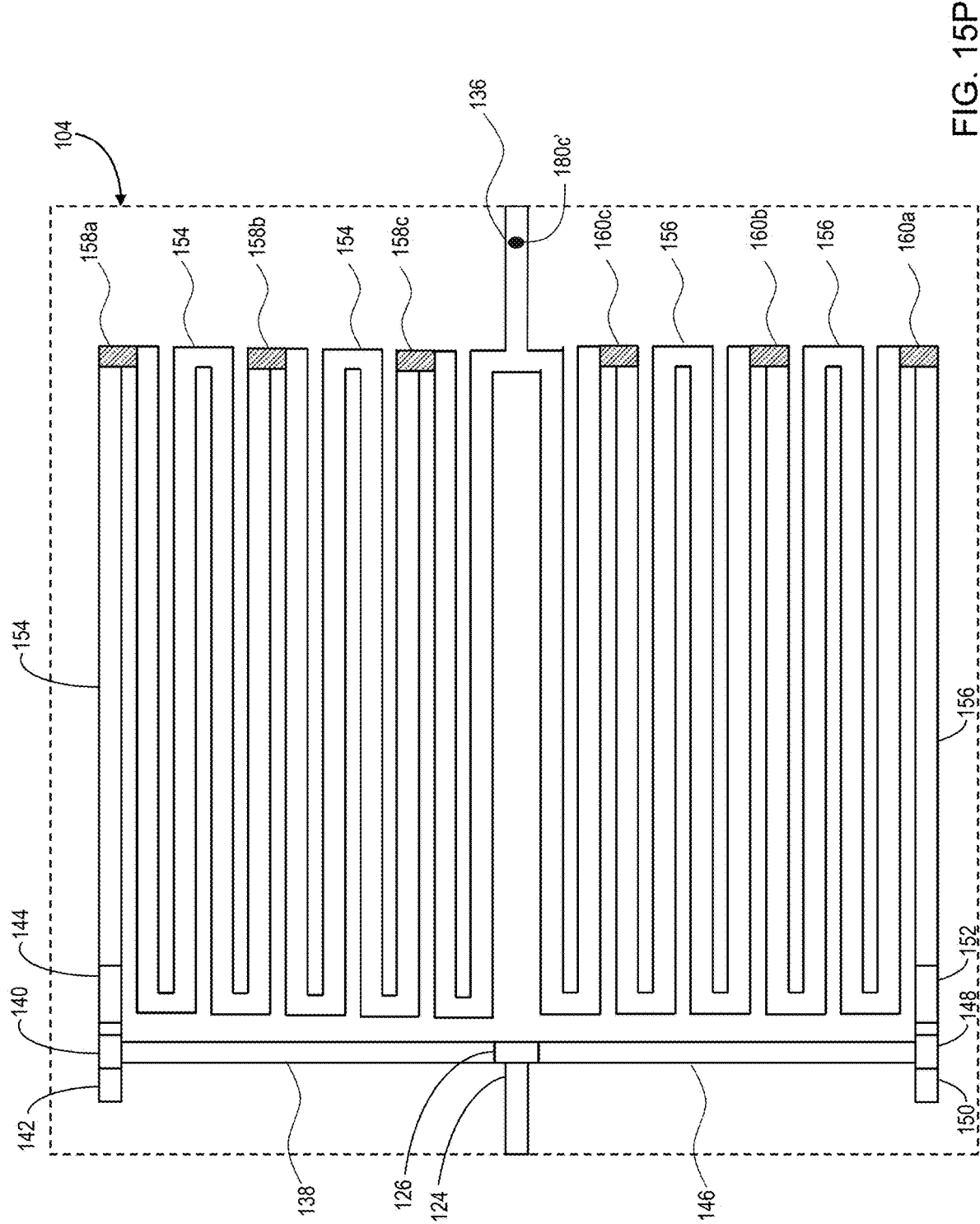

FIGS. 15A-P are schematic diagrams of the SLIM filter 104 of FIG. 4 showing exemplary positions of ions 180a-e, 180a'-e' within the SLIM filter 104 at different sequential points in time with the SLIM filter 104 utilizing long path (parallel), pre-filter (serial), and multi-gate (multiplex) modes of operation.

As shown in FIG. 15A, first group ions 180a-e are first introduced to the entrance region/path 124, e.g., by an ionization source 102. The entrance region/path 124 transfers the ions 180a-e to the path selection switch 126, where the first group ions 180a-e are accumulated, as shown in FIG. 15B. Once the first group ions 180a-e have been accumulated for a sufficient amount of time at the path selection switch 126, the path selection switch 126 releases the first group ions 180a-e into the first pre-filter separation region 138, as shown in FIG. 15B. As shown in FIG. 15C, the first pre-filter separation region 138 separates the first group ions 180a-e as they are pushed toward the first path switch 140, e.g., by generating a traveling wave. Additionally, as the first pre-filter separation region 138 separates the first group ions 180a-e provided thereto, a second group ions 180a'-e' are introduced into the entrance region/path 124, e.g., by the ionization source 102, as shown in FIG. 15C. Next, the second group ions 180a'-e' are transferred to the path selection switch 126 by the entrance region/path 124, where they are accumulated, as shown in FIG. 15D. Additionally, as shown in FIG. 15D, the first path switch 140 generates a first signal that is configured to push ions into the first discard region 142, e.g., by generating a traveling wave, and transfers the first ion 180a of the first group ions 180a-e into the first discard region 142 where it is eliminated. Additionally, at this time, the path selection switch 126 releases the second group ions 180a'-e' into the second pre-filter separation region 146, as shown in FIG. 15D. Thereafter, as shown in FIG. 15E, the first path switch 140 is switched to generate a second signal that transfers the second, third, and fourth ions 180b-d of the first group ions 180a-e into the first on-board accumulation region 144, which is configured to accumulate ions. While this is occurring, the second pre-filter separation region 146 separates the second group ions 180a'-e' as they are pushed toward the second path switch 148, e.g., by generating a traveling wave, as shown in FIG. 15E.

Next, as shown in FIG. 15F, the first path switch 140 is switched back to the first signal, which is configured to push ions into the first discard region 142, and transfers the fifth ion 180e of the first group ions 180a-e into the first discard region 142 where it is eliminated. Also, the second path switch 148 generates a first signal that is configured to push ions into the second discard region 150, e.g., by generating a traveling wave, and transfers the first ion 180a' of the second group ions 180a'-e' into the second discard region 150 where it is eliminated.

Next, as shown in FIG. 15G, the second path switch 148 is switched to generate a second signal that transfers the second, third, and fourth ions 180b'-d' of the second group ions 180a'-e' into the second on-board accumulation region 152, which is configured to accumulate ions. Thereafter, as shown in FIG. 15H, the first on-board accumulation region 144 releases the accumulated ions 180b-d into the first long separation/gating path 154, which generates a traveling wave that pushes the ions 180b-d along toward the first first path ion gate 158a and separates the ions 180b-d based on mobility. While this separation is occurring, the second path switch 148 is switched back to the first signal, which is configured to push ions into the second discard region 150, and transfers the fifth ion 180e' of the second group ions 180a'-e' into the second discard region 150 where it is eliminated.

Next, as shown in FIG. 15I, the second ion 180b of the first group ions 180a-e arrives at the first first path ion gate 158a, which can be in an active state where it is configured to eliminate ions, as discussed in connection with FIG. 5. Accordingly, the first first path ion gate 158a eliminates the second ion 180b of the first group ions 180a-e. Simultaneously, the second on-board accumulation region 152 releases the accumulated ions 180b'-d' into the second long separation/gating path 156, which generates a traveling wave that pushes the ions 180b'-d' along toward the first second path ion gate 160a and separates the ions 180b'-d' based on mobility. Accordingly, both of the first and second group ions 180a-e, 180a'-e' are being simultaneously separated and filtered by the SLIM filter 104.

As shown in FIG. 15J, the first first path ion gate 158a can switch to an inactive state where it generates an electric field that repels ions and maintains ions on the first long separation/gating path 154 prior to the third ion 180c, which can be the targeted ion, arriving at the first first path ion gate 158a and until after the third ion 180c has passed. However, due to the similar mobilities of the third and fourth ions 180c, 180d, both ions 180c, 180d pass through the first first path ion gate 158a and continue along the first long separation/gating path 154 where they are further separated.

Simultaneously, the second ion 180b' of the second group ions 180a'-e' arrives at the first second path ion gate 160a, which can be in an active state where it is configured to eliminate ions, as discussed in connection with FIG. 5. Accordingly, the first second path ion gate 160a eliminates the second ion 180b' of the second group ions 180a'-e'.

Next, as shown in FIG. 15K, the first second path ion gate 160a can switch to an inactive state where it generates an electric field that repels ions and maintains ions on the second long separation/gating path 156 prior to the third ion 180c', which can be the targeted ion, arriving at the first second path ion gate 160a and until after the third ion 180c' has passed. However, due to the similar mobilities of the third and fourth ions 180c', 180d', both ions 180c', 180d' pass through the first second path ion gate 160a and continue along the second long separation/gating path 156 where they are further separated. Additionally, the third and fourth ions 180c, 180d of the first group ions 180a-e continue along the first long separation/gating path 156 and continue to undergo ion mobility separation. As the third and fourth ions 180c, 180d approach the second first path ion gate 158b, the second first path ion gate 158b can be switched to an inactive state where it maintains ions on the first long separation/gating path 154 prior to arrival of the third ion 180c, and stays in an inactive state until the third ion 180c has passed. Once the third ion 180c has passed the second first path ion gate 158b, the ion gate 158b switches back to an active state where it is configured to attract and eliminate ions, as shown in FIG. 15L. This switch can occur prior to the fourth ion 180d passing the second first path ion gate 158b such that the fourth ion 180d is eliminated, and only the targeted third ion 180c remains on the first long separation/gating path 154. Simultaneously, the third and fourth ions 180c', 180d' of the second group ions 180a'-e' continue along the second long separation/gating path 156.

Next, as the third and fourth ions 180c', 180d' approach the second second path ion gate 160b, the second second path ion gate 160b can be switched to an inactive state where it maintains ions on the second long separation/gating path 156 prior to arrival of the third ion 180c', and stays in an inactive state until the third ion 180c' has passed. Once the third ion 180c' has passed the second second path ion gate 160b, the ion gate 160b switches back to an active state where it is configured to attract and eliminate ions, as shown in FIG. 15N. This switch can occur prior to the fourth ion 180d' passing the second second path ion gate 160b such that the fourth ion 180d' is eliminated, and only the targeted third ion 180c' remains on the second long separation/gating path 156. Simultaneously, the third ion 180c of the first group ions 180a-e continues along the first long separation/gating path 154. The third ions 180c, 180c' can continue along their respective long separation/paths 154, 156, as shown in FIGS. 15N-P, with the third ion gates 158c, 160c deactivating at the appropriate times to allow the third ions 180c, 180c' to pass, as shown in FIGS. 15N and 15O. The third ions 180c, 180c' then in turn proceed to the exit region/path 136 where they exit the SLIM filter 104 and enter the mass spectrometer 106 for detection.

The foregoing example illustrates a simplified implementation of the long path (parallel), pre-filter (serial), and multi-gate (multiplex) modes of operation. However, it should be understood, consistent with the above-description, that a plurality of ion packets can be pulsed into each of the paths for simultaneous separation and filtering in order to increase the duty cycle of the SLIM filter 104. In such an implementation, the ion gates 158a-c, 160a-c are implemented in the same fashion as described above in order to eliminate undesired ions, and allow ions of the targeted mobility to pass, as discussed in connection with FIGS. 10, 13A-D, and 14A-B. Additionally, the foregoing timing described in connection with FIGS. 15A-P and the components of the SLIM filter 104 should be understood to be merely exemplary.

Figure 16:
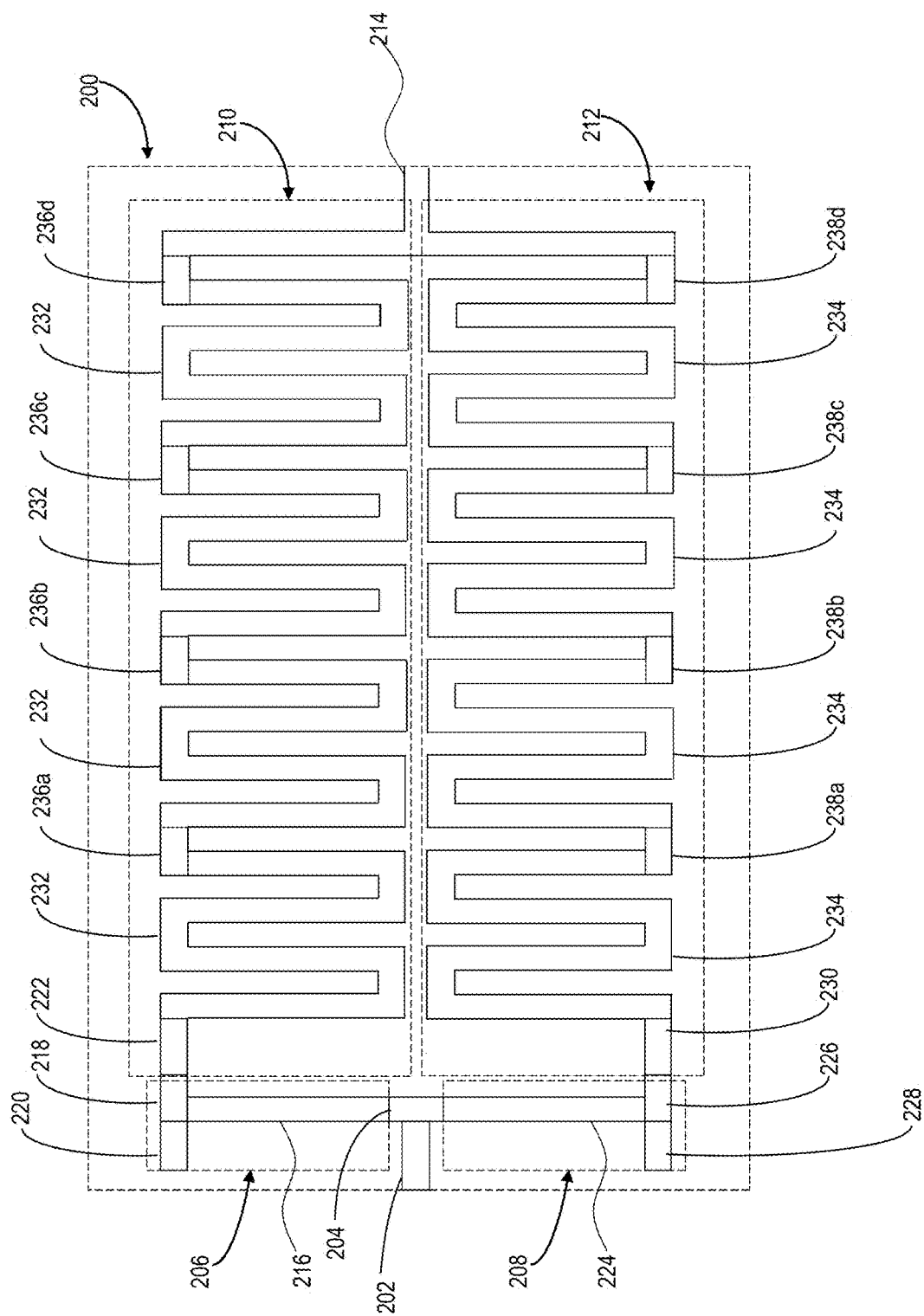
FIG. 16 is a schematic diagram of another exemplary embodiment of a SLIM filter of the present disclosure utilizing a plurality of guard gates.

FIG. 16 is a schematic diagram showing the regions of another exemplary SLIM filter 200 of the present disclosure utilizing a plurality of guard gates. The second SLIM filter 200 can be similar to the SLIM filter 104 shown and described in connection with FIGS. 4, 9, 10, and 15A-P, for example, and function in a similar manner. More specifically, the second SLIM filter 200 includes an entrance region/path 202, a path selection switch 204, a first pre-filter region 206, a second pre-filter region 208, a first separation/filter region 210, a second separation/filter region 212, and an exit region/path 214. The first pre-filter region 206 includes a first pre-filter separation region 216, a first path switch 218, and a first discard region 220. The first pre-filter separation region 216 extends from the path selection switch 204 to the first path switch 218. The first path switch 218 can be arranged perpendicular to the first pre-filter separation region 218, and can extend between the first discard region 220 and a first path on-board accumulation region 222 of the first separation/filter region 210. The second pre-filter region 208 includes a second pre-filter separation region 224, a second path switch 226, and a second discard region 228. The second pre-filter separation region 224 extends from the path selection switch 204 to the second path switch 226. The second path switch 226 can be arranged perpendicular to the second pre-filter separation region 224, and can extend between the second discard region 228 and a second path on-board accumulation region 230 of the second separation/filter region 212.

The entrance region/path 202 can function substantially in accordance with the entrance region/path 124 shown and described in connection with FIG. 4, such that it receives ions and transfers the ions to the path selection switch 204. The path selection switch 204 functions substantially in accordance with the path selection switch 126 shown and described in connection with FIG. 4, and can thus switch between accumulating ions, and providing accumulated ions to the first pre-filter separation region 216 or the second pre-filter separation region 224.

The first pre-filter separation region 216, first path switch 218, and first discard region 220 can function substantially in accordance with the first pre-filter separation region 138, first path switch 140, and first discard region 142 shown and described in connection with the SLIM filter 104 of FIG. 4. That is, the first pre-filter separation region 216 can transfer and separate ions based on mobility, the first path switch 218 can switch between directing ions having a targeted mobility to the first on-board accumulation region 222 and directing undesired ions to the first discard region 220, which eliminates the ions transferred thereto. Thus, the first pre-filter region 206 performs low resolution ion mobility separation and filtering, which increases the duty cycle of the SLIM filter 200.

The second pre-filter separation region 224, second path switch 226, and second discard region 228 can function substantially in accordance with the second pre-filter separation region 146, second path switch 148, and second discard region 150 shown and described in connection with the SLIM filter 104 of FIG. 4. That is, the second pre-filter separation region 224 can transfer and separate ions based on mobility, the second path switch 226 can switch between directing ions having a targeted mobility to the second on-board accumulation region 230 and directing undesired ions to the second discard region 228, which eliminates the ions transferred thereto. Thus, the second pre-filter region 208 performs low resolution ion mobility separation and filtering, which increases the duty cycle of the SLIM filter 200.

The first and second on-board accumulation regions 222, 230 can function in accordance with the first and second on-board accumulation regions 144, 152 shown and described in connection with the SLIM filter 104 FIG. 4. In particular, the first and second on-board accumulation regions 222, 230 accumulate ions and periodically release/pulse the accumulated ions into the corresponding first and second long separation/gating paths 232, 234 for high resolution ion mobility separation and filtering.

The first separation/filter region 210 includes the first on-board accumulation region 222, the first long separation/gating path 232, and a plurality of first path ion gates 236a-d. The first long separation/gating path 232 can be substantially similar to the first long separation/gating path 154 shown and described in connection with the SLIM filter 104 of FIG. 4, however, the first long separation/gating path 232 of the second SLIM filter 200 illustrated in FIG. 16 can be arranged with longer vertical paths, in contrast to the longer horizontal paths of the first long separation/gating path 154 of the SLIM filter 104 illustrated in FIG. 4. This different configuration can allow for the second SLIM filter 200 to have different dimensions than the SLIM filter 104 illustrated in FIG. 4. The first path ion gates 236a-d can be substantially similar to the first path ion gates 158a-c shown and described in connection with FIGS. 4 and 5. In particular, each of the first path ion gate 236a-d can include a switchable DC guard electrode 162, as shown in FIG. 5, that can be switched between an attractive state where it generates an electric field that attracts and eliminates ions, e.g., undesired ions, and a repulsive state where it generates an electric field that repels ions and maintains the ions on the first long separation/gating path 232. Accordingly, the first long separation/gating path 232 can separate ions based on mobility, and the first path ion gates 236a-d can sequentially eliminate ions having undesired mobilities. The plurality of first path ion gates 236a-d allow for a plurality of ion packets to be pulsed into the first long separation/gating path 232, e.g., by the first on-board accumulation region 222, and simultaneously filtered, as discussed in connection with FIGS. 12A-14B, which increases the duty cycle of the second SLIM filter 200.

The second separation/filter region 212 includes the second on-board accumulation region 230, the second long separation/gating path 234, and a plurality of second path ion gates 238a-d. The second long separation/gating path 234 can be substantially similar to the second long separation/gating path 156 shown and described in connection with FIG. 4, however, the second long separation/gating path 234 of the second SLIM filter 200 illustrated in FIG. 16 can be arranged with longer vertical paths, in contrast to the longer horizontal paths of the second long separation/gating path 156 of the SLIM filter 104 illustrated in FIG. 4. This different configuration can allow for the second SLIM filter 200 to have different dimensions than the SLIM filter 104 illustrated in FIG. 4. The second path ion gates 238a-d can be substantially similar to the second path ion gates 160a-c shown and described in connection with FIG. 4. In particular, each of the second path ion gate 238a-d can include a switchable DC guard electrode 162, as shown in FIG. 5, that can be switched between an attractive state where it generates an electric field that attracts and eliminates ions, e.g., undesired ions, and a repulsive state where it generates an electric field that repels ions and maintains the ions on the second long separation/gating path 234. Accordingly, the second long separation/gating path 234 can separate ions based on mobility, and the second path ion gates 238a-d can sequentially eliminate ions having undesired mobilities. The plurality of second path ion gates 238a-d allow for a plurality of ion packets to be pulsed into the second long separation/gating path 234, e.g., by the second on-board accumulation region 230, and simultaneously filtered, as discussed in connection with FIGS. 12A-14B, which increases the duty cycle of the second SLIM filter 200.

The first and second long separation/gating paths 232, 234 extend to and connect at the exit region/path 136, which transfers the filtered ions from the SLIM filter 200 to the mass spectrometer 106, or other detection device. The first and second pre-filter separation regions 216, 224, and the first and second separation/filter region 210, 212 operate in parallel, which increases the duty cycle of the second SLIM filter 200. Furthermore, additional pre-filter separation regions and separation/filter regions can be implemented in parallel to the first and second pre-filter separation regions 216,224, and the first and second separation/filter region 210, 212 as needed to further increase the duty cycle of the second SLIM filter 200.

Figure 17:
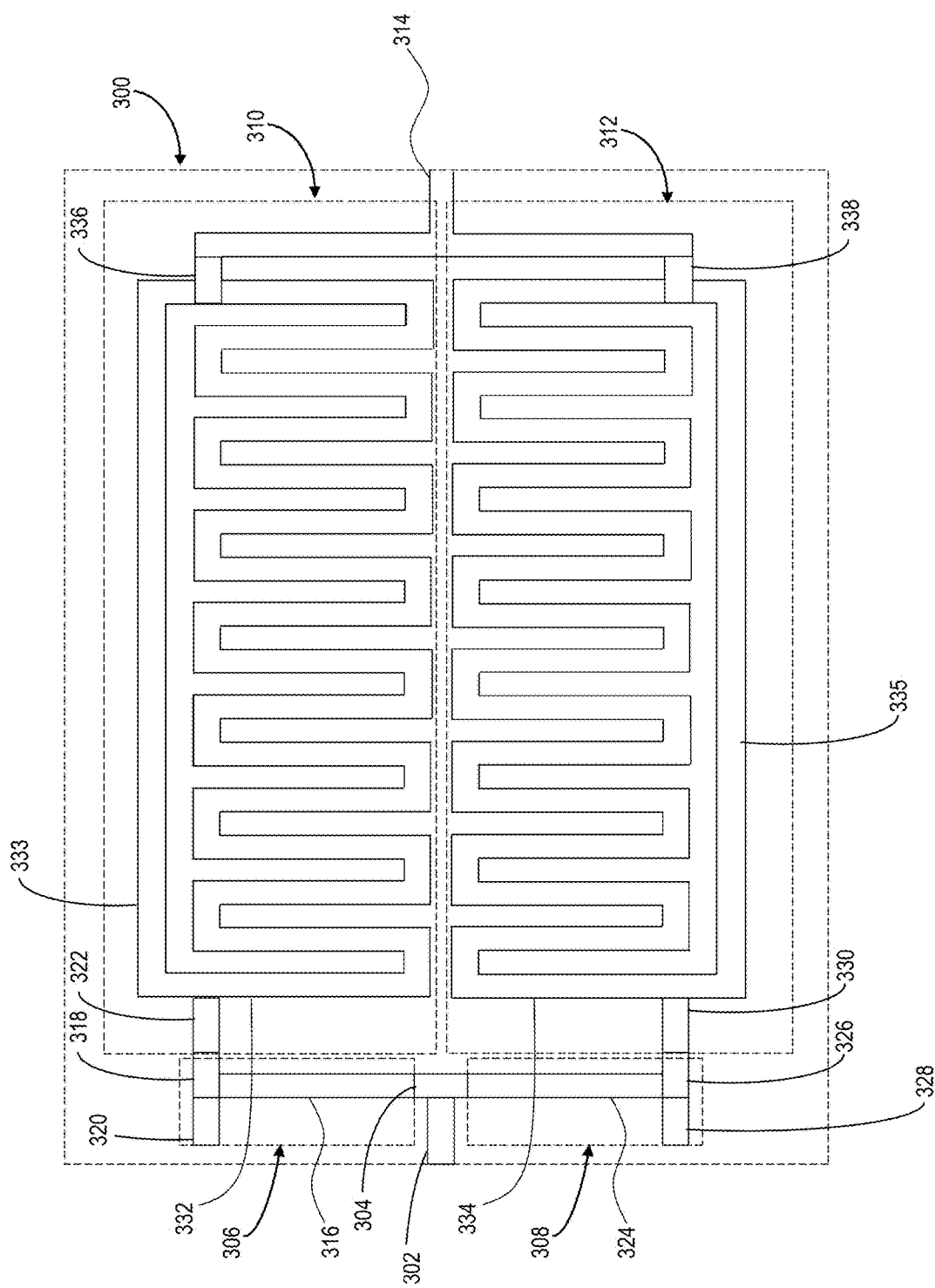
FIG. 17 is a schematic diagram of another exemplary embodiment of a SLIM filter of the present disclosure utilizing a multi-pass arrangement with a single gate.

FIG. 17 is a schematic diagram showing the regions of another exemplary SLIM filter 300 of the present disclosure utilizing a multi-pass arrangement with a single gate. The third SLIM filter 300 can be similar to the second SLIM filter 200 shown and described in connection with FIG. 16, for example, and function in a similar manner. However, the third SLIM filter 300 can have a single ion gate that the ions pass through multiple times, as opposed to a plurality of ion gates. For ease of comparing the third SLIM filter 300 and the second SLIM filter 200, components of the third SLIM filter 300 similar to those of the second SLIM filter 200 are provided with the same reference numeral incremented by one-hundred. Accordingly, the functionality of the similar components need not be described in detail, instead, reference can be made to the corresponding description provided in connection with the second SLIM filter 200, and any differences are detailed below.

Similar to the second SLIM filter 200, the third SLIM filter 300 includes an entrance region/path 302, a path selection switch 304, a first pre-filter region 306, a second pre-filter region 308, a first separation/filter region 310, a second separation/filter region 312, and an exit region/path 314. The first pre-filter region 306 includes a first pre-filter separation region 316, a first path switch 318, and a first discard region 320. The first pre-filter separation region 316 extends from the path selection switch 304 to the first path switch 318, which extends between the first discard region 320 and a first path on-board accumulation region 322 of the first separation/filter region 310. The second pre-filter region 308 includes a second pre-filter separation region 324, a second path switch 326, and a second discard region 328. The second pre-filter separation region 324 extends from the path selection switch 304 to the second path switch 326, which extends between the second discard region 328 and a second path on-board accumulation region 330 of the second separation/filter region 312.

The first separation/filter region 310 includes the first on-board accumulation region 322, a first long separation/gating path 332, a first separation/gating return path 333, and a first path ion gate 336. The first long separation/gating path 332 can be similar to the first long separation/gating path 232 of the second SLIM filter 200 in that it can have a substantially nonlinear (e.g., serpentine) configuration, however, the first long separation/gating path 332 of the third SLIM filter 300 can be arranged in a continuous loop, e.g., with the first separation/gating return path 333, that the first path ion gate 336 is positioned within. In this configuration, ions are pulsed into the first long separation/gating path 332, e.g., as packets, by the first on-board accumulation region 322, where they are continuously cycled and undergo high resolution ion mobility separation. The ions first traverse the nonlinear portion of the first long separation/gating path 332 until they reach the first path ion gate 336, which can include a switchable DC guard electrode 162, as shown in FIG. 5, that can be switched between an attractive state where it generates an electric field that attracts and eliminates ions, e.g., undesired ions, and a repulsive state where it generates an electric field that repels ions and maintains the ions on the first long separation/gating path 332 and the first separation/gating return path 333, thus causing the ions to traverse the first long separation/gating path 332 and the first path ion gate 336 multiple times.

Accordingly, the first long separation/gating path 332 can separate ions based on mobility, and the first path ion gate 336 can sequentially eliminate ions having undesired mobilities. The first path ion gate 336 can also be switchable between a first state where it generates a first voltage signal, e.g., a first traveling wave, that pushes the ions along the first long separation/gating path 332, and a second state where it generates a second voltage signal, e.g., a second traveling wave, that pushes the desired ions into the exit region/path 314, e.g., after the ions have been sufficiently filtered. Accordingly, the first long separation/gating path 332 (e.g., loop) and the first path ion gate 336 can be implemented in place of a plurality of ion gates, such as the ion gates 236a-d implemented in connection with the second SLIM filter 200, in order to perform multiplex SLIM filtering, e.g., in order to simultaneously filter a plurality of ion packets, which increases the duty cycle of the third SLIM filter 300.

Similarly, the second separation/filter region 312 includes the second on-board accumulation region 330, a second long separation/gating path 334, a second separation/gating return path 335, and a second path ion gate 338, which can be configured and function in the same fashion as the first on-board accumulation region 322, first long separation/gating path 332, and first path ion gate 336. Accordingly, the first and second separation/filter regions 310, 312 can simultaneously filter one or a plurality of ion packets, which increases the duty cycle of the third SLIM filter 300.

Figure 18:
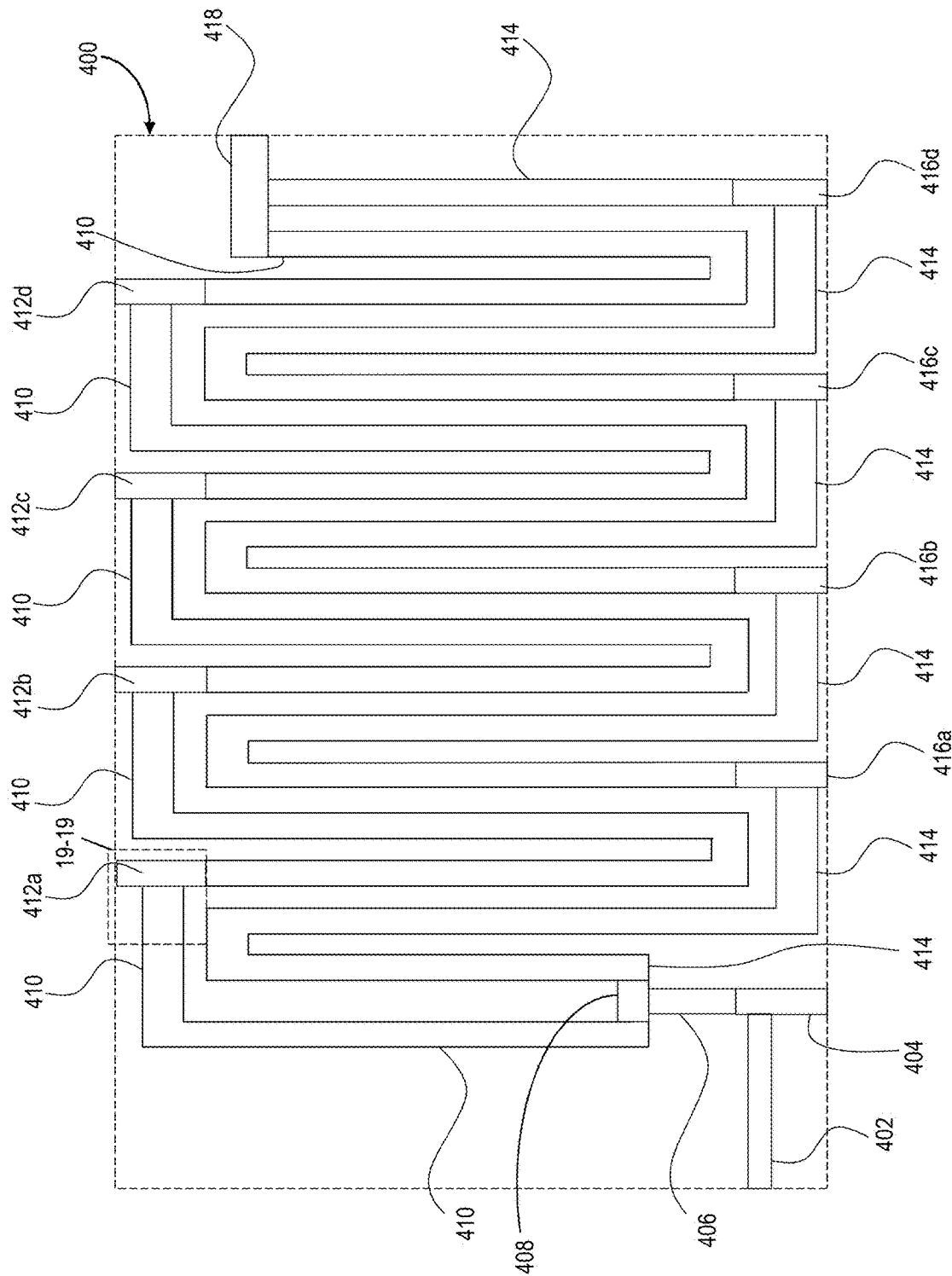
FIG. 18 is a schematic diagram of another exemplary embodiment of a SLIM filter of the present disclosure utilizing traveling wave gates.

FIG. 18 is a schematic diagram showing the regions of another exemplary SLIM filter 400 of the present disclosure utilizing traveling wave gates. The fourth SLIM filter 400 includes a pre-filter separation region 402, a pre-filter gate 404, an on-board accumulation region 406, a path selection switch 408, a first long separation/gating path 410 that includes a plurality of first path traveling wave ion gates 412a-d, a second long separation/gating path 414 that includes a plurality of second path traveling wave ion gates 416a-d, and an exit region/path 418.

The pre-filter separation region 402 can receive ions from the ionization source 102 such that it functions similar to an entrance region/path, but can also be similar in construction and functionality to the first and second pre-filter separation regions 138, 146 of the first SLIM filter 104 shown and described in connection with FIG. 4. That is, the pre-filter separation region 402 can transfer and separate ions based on mobility, and provide the separated ions to the pre-filter gate 404. The pre-filter gate 404 can function substantially in accordance with the first and second path switches 140,

148 shown and discussed in connection with FIG. 4. Specifically, the pre-filter gate 404 can be switchable between two different states wherein it receives and generates alternating opposite traveling waves. When in the first state, the pre-filter gate 404 can receive and generate a first waveform, e.g., a first traveling wave, that directs ions having an undesired mobility away from the on-board accumulation region 406 for elimination. When in the second state, the pre-filter gate 404 can receive and generate a second waveform, e.g., a second traveling wave, that directs ions having a targeted mobility toward the on-board accumulation region 406 where they are accumulated. Alternatively, the pre-filter gate 404 can receive two opposing traveling waveforms simultaneously, and the magnitude of the two waveforms can dictate in which direction the ions flow, which is discussed in greater detail in connection with FIGS. 19A and 19B. Accordingly, the pre-filter gate 404 can switch between directing ions having a targeted mobility to the on-board accumulation region 406 and directing undesired ions to be eliminated. Thus, the pre-filter separation region 402 and the pre-filter gate 404 perform low resolution ion mobility separation and filtering, which increases the duty cycle of the fourth SLIM filter 400.

The on-board accumulation region 406 can function in accordance with the first and second on-board accumulation regions 144, 152 shown and described in connection with FIG. 4. In particular, the on-board accumulation region 406 accumulates ions and periodically releases/pulses the accumulated ions into the path selection switch 408, which alternatingly directs the ions received from the on-board accumulation region 406 into the first and second long separation/gating paths 410, 414 for high resolution ion mobility separation and filtering. The path selection switch 408 functions substantially in accordance with the path selection switch 126 shown and described in connection with FIG. 4, and can thus switch between providing ions to the first long separation/gating path 410 and the second long separation/gating path 414, e.g., by switching between oppositely directed traveling waves.

The first and second long separation/gating paths 410, 414 are parallel paths that can have similar nonlinear configurations, and which can be nested within the turns of one another in alternating fashion. That is, the first turn of the second long separation/gating path 410 can be nested within the first turn of the first long separation/gating path 414, the second turn of the first long separation/gating path 410 can be nested within the second turn of the second long separation/gating path 414, etc., as shown in FIG. 18. Moreover, the first and second long separation/gating paths 410, 414 extend from the path selection switch 408 to the exit region/path 418, and include the first path traveling wave ion gates 412*a-d* and the second path traveling wave ion gates 416*a-d* positioned periodically within the respective path 410, 414. Accordingly, ions traversing the first long separation/gating path 410 must pass through all of the first path traveling wave ion gates 412*a-d* in order to reach the exit region/path 418, and ions traversing the second long separation/gating path 414 must pass through all of the second path traveling wave ion gates 416*a-d* in order to reach the exit region/path 418. The first and second long separation/gating paths 410, 414 can receive and generate a traveling wave that is configured to separate ions based on mobility, and the first and second path traveling wave ion gates 412*a-d*, 416*a-d* are configured to filter ions based on mobility.

Specifically, the first and second path traveling wave ion gates 412*a-d*, 416*a-d* can be switchable between two different states wherein they receive and generate alternating opposite traveling waves. When in the first state, the first and second path traveling wave ion gates 412*a-d*, 416*a-d* can receive and generate a first waveform, e.g., a first traveling wave, that directs ions having an undesired mobility away from or off of the respective long separation/gating path 410, 414 for elimination, e.g., to a discard region. When in the second state, the first and second path traveling wave ion gates 412*a-d*, 416*a-d* can receive and generate a second waveform, e.g., a second traveling wave, that directs ions having a targeted mobility toward the respective long separation/gating path 410, 414 to cause the targeted ions to stay on the respective long separation/gating path 410, 414 for further filtering. Alternatively, the first and second path traveling wave ion gates 412*a-d*, 416*a-d* can receive two opposing traveling waveforms simultaneously, and the magnitude of the two waveforms can dictate in which direction the ions flow, which is discussed in greater detail in connection with FIGS. 19A and 19B.

Accordingly, the first and second path traveling wave ion gates 412*a-d*, 416*a-d* can switch between directing undesired ions to be eliminated and directing ions having a targeted mobility to the respective long separation/gating path 410, 414. Thus, the first and second long separation/gating paths 410, 414 can separate ions based on mobility, and the first and second path traveling wave ion gates 412*a-d*, 416*a-d* can sequentially eliminate ions having undesired mobilities. The first and second path traveling wave ion gates 412*a-d*, 416*a-d* allow for a plurality of ion packets to be pulsed into the first and second long separation/gating paths 410, 414, e.g., by the path selection switch 408, and simultaneously filtered, as discussed in connection with FIGS. 12A-14B, which increases the duty cycle of the fourth SLIM filter 400. The ions that fully traverse the first or the second long separation/gating paths 410, 414 enter the exit region/path 418, which transfers the ions to the mass spectrometer 106, or other detection device, for analysis. The first and second long separation/gating paths 410, 414 operate in parallel, which increases the duty cycle of the fourth SLIM filter 400. Furthermore, additional long separation/gating paths can be implemented in parallel to the first and second long separation/gating paths 410, 414 as needed to further increase the duty cycle of the fourth SLIM filter 400.

Figure 19B:
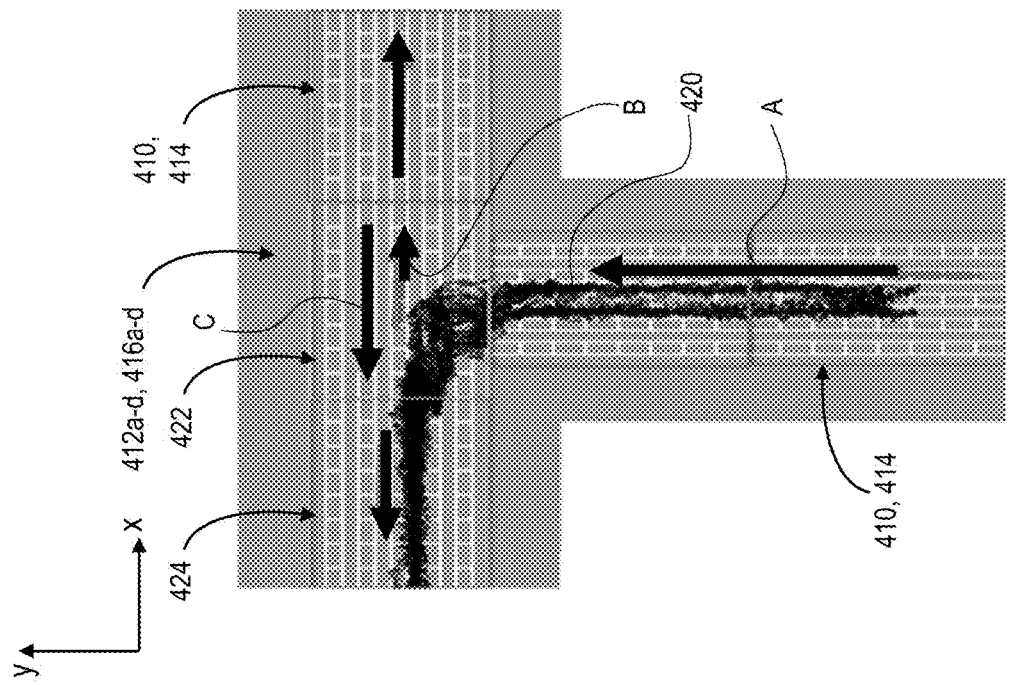
FIGS. 19A and 19B are enlarged views of Area 19-19 of FIG. 18 showing details and operation of a traveling wave gate and influence on ion travel path.
Figure 19A:
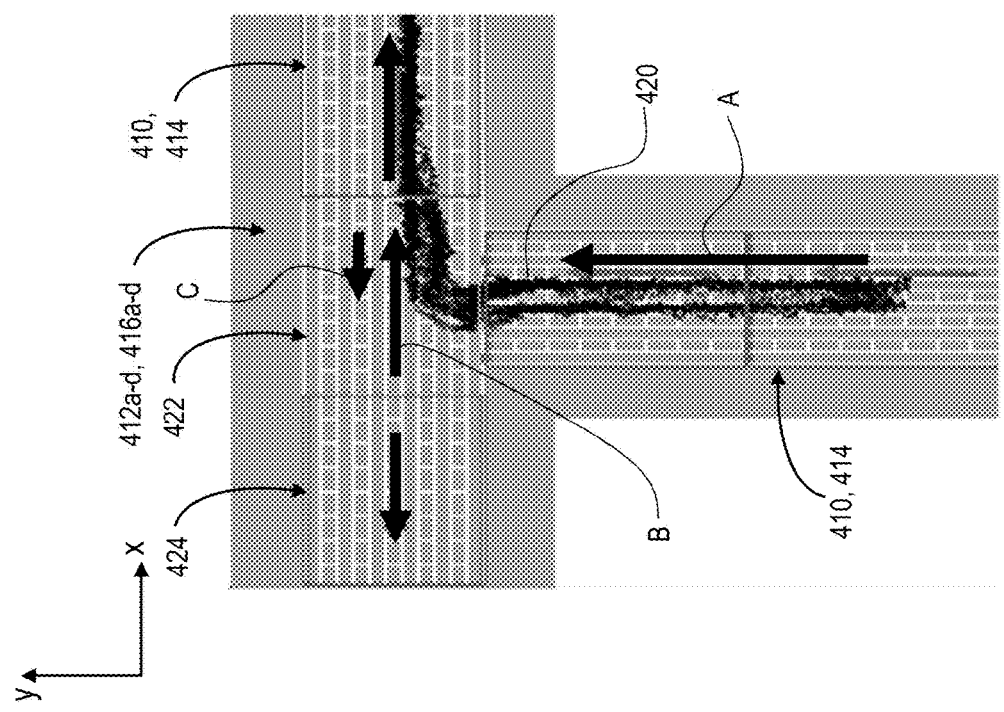

FIGS. 19A and 19B are enlarged views of Area 19-19 of FIG. 18 showing details and operation of a traveling wave ion gate 412*a-d*, 416*a-d*, and influence on ion travel path. As discussed in connection with FIG. 18, the traveling wave ion gates 412*a-d*, 416*a-d* are connected with the respective first and second long separation/gating paths 410, 414, which transfer ions 420 to the connected traveling wave ion gate 412*a-d*, 416*a-d* and separates the ions 420 based on mobility utilizing a first traveling waveform, represented schematically by Arrow A. The traveling wave ion gates 412*a-d*, 416*a-d* each include a switchable region 422 that receives the ions 420 from the first or second long separation/gating paths 410, 414. The switchable region 422 can include the electrode layout shown and described in connection with FIG. 3, and can have two traveling waveforms, e.g., second and third traveling waveforms represented schematically by Arrows B and C, applied thereto by the controller 108, e.g., to the traveling wave electrodes 120*a-e* (see FIG. 3) of the switchable region 422. The second and third traveling waveforms B and C can have different magnitudes and can be superimposed, such that the switchable region 422 generates a single superimposed traveling waveform based on the second and third traveling waveforms B and C. In this regard, the propagation direction of the single superimposed traveling waveform generated by the switchable region 422 can be determined by the magnitudes of the second and third traveling waveforms B and C applied to the switchable region 422.

Specifically, as shown in FIG. 19A, if the second traveling waveform B applied to the switchable region 422 has a greater magnitude than the third traveling waveform C applied to the switchable region 422, then the superimposed traveling waveform generated by the switchable region 422 will travel along the x-axis of FIG. 19A in the positive direction and toward the continuation of the first or second long separation/gating path 410, 414, thus forcing the ions 420 to continue onto the first or second long separation/gating path 410, 414. Alternatively, as shown in FIG. 19B, if the third traveling waveform C applied to the switchable region 422 has a greater magnitude than the second traveling waveform B applied to the switchable region 422, then the superimposed traveling waveform generated by the switchable region 422 will travel along the x-axis of FIG. 19 in the negative direction and toward a discard region 424, which can receive the ions and transfer the ions for elimination. Additionally, the switchable region 422 can be configured such that only one of the second and third traveling waveforms B and C needs to be adjusted, as shown in the foregoing examples in which the third traveling waveform C was switched between 1 V and 19 V, but the second traveling waveform C was maintained at 10 V The traveling wave ion gates 412a-d, 416a-d allow for ions to be eliminated without having the eliminated ions accumulate on a surface of the SLIM filter 400, such as on the switchable DC guard electrode 162, which would otherwise require replacement or cleaning. It should also be noted that the traveling wave ion gates 412a-d, 416a-d, and the corresponding switchable region 422, can be implemented in place of the gates or switchable regions discussed herein, including, but not limited to, the path selection switches 126, 204, 304, the first and second path switches 140, 148, 218, 226, 318, 326 the first and second path ion gates 158a-c, 160a-c, 236a-d, 238a-d, 336, 338, etc.

Figure 20:
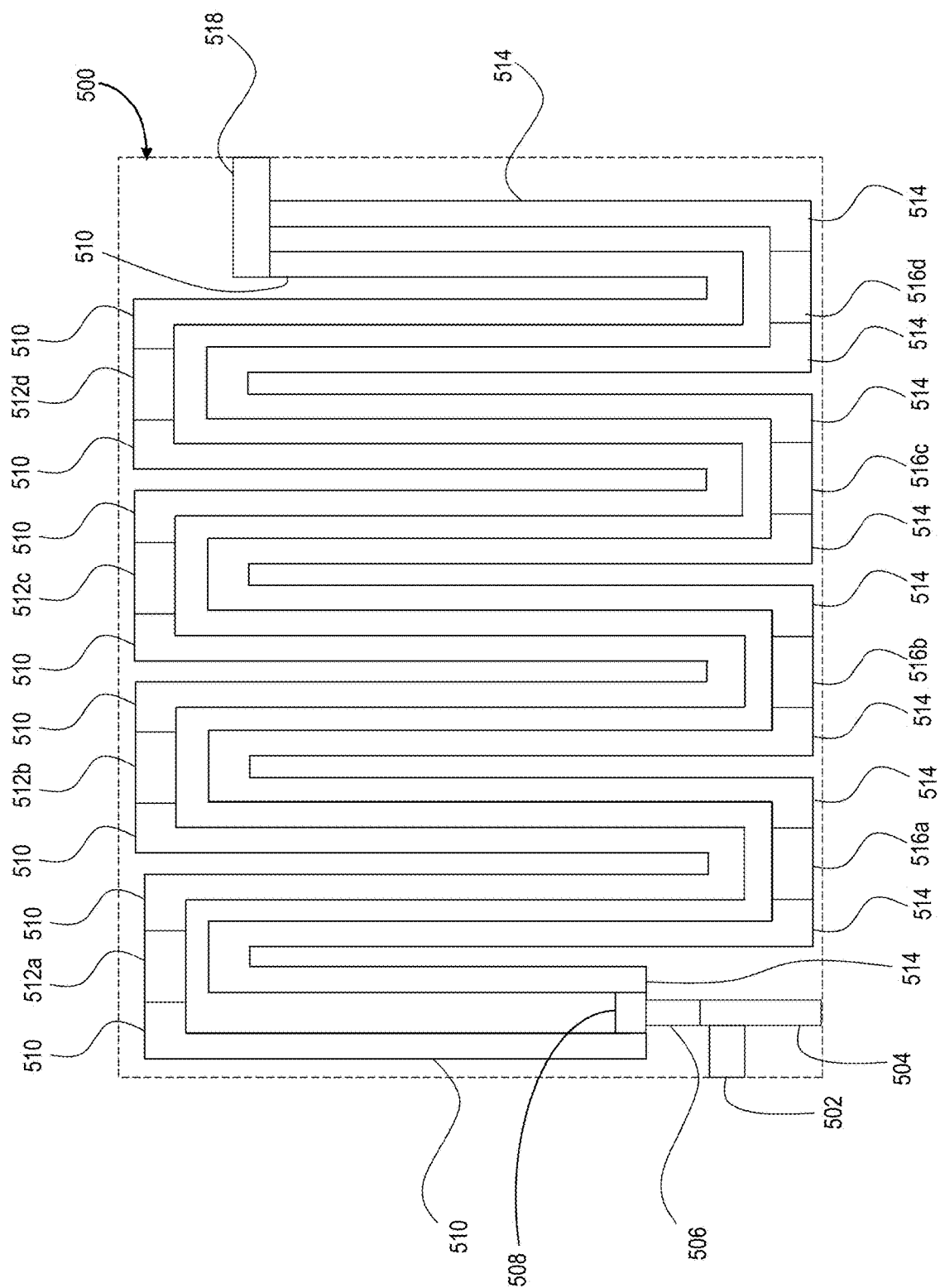
FIG. 20 is a schematic diagram of another exemplary embodiment of a SLIM filter of the present disclosure utilizing a plurality of guard gates.

FIG. 20 is a schematic diagram showing the regions of another exemplary SLIM filter 500 of the present disclosure utilizing a plurality of guard gates. The fifth SLIM filter 500 can be similar to the fourth SLIM filter 400 shown and described in connection with FIG. 18, for example, and function in a similar manner. However, the fifth SLIM filter 500 utilizes guard ion gates 512a-d, 516a-d in place of traveling wave ion gates 412a-d, 416a-d. For ease of comparing the fifth SLIM filter 500 and the fourth SLIM filter 400, components of the fifth SLIM filter 500 similar to those of the fourth SLIM filter 400 are provided with the same reference numeral incremented by one-hundred. Accordingly, the functionality of the similar components need not be described in detail, instead, reference can be made to the corresponding description provided in connection with the fourth SLIM filter 400, and any differences are detailed below.

Similar to the fourth SLIM filter 400, the fifth SLIM filter 500 includes a pre-filter separation region 502, a pre-filter gate 504, an on-board accumulation region 506, a path selection switch 508, a first long separation/gating path 510, a second long separation/gating path 514, and an exit region/path 514. However, in place of the traveling wave ion gates 412a-d, 416a-d, the fifth SLIM filter 500 includes guard ion gates 512a-d, 516a-d. In particular, the first long separation/gating path 510 includes a plurality of first path guard ion gates 512a-d that are periodically and spatially positioned along the first long separation/gating path 510, e.g., at every other bend thereof, and the second long separation/gating path 514 includes a plurality of second path guard ion gates 516a-d that are periodically and spatially positioned along the second long separation/gating path 514, e.g., at every other bend thereof.

The first and second path guard ion gates 512a-d, 516a-d can be similar in construction and functionality to the first and second path ion gates 158a-c, 160a-c shown and described in connection with FIGS. 4 and 5. In particular, each of the first and second path guard ion gates 512a-d, 516a-d can include a switchable DC guard electrode 162, as shown in FIG. 5, that can be switched between generating an electric field that attracts and eliminates ions, e.g., undesired ions, and generating an electric field that repels ions and maintains the ions on the first or second long separation/gating paths 510, 514. Accordingly, the first and second long separation/gating paths 510, 514 can separate ions based on mobility, and the first and second path guard ion gates 512a-d, 516a-d can sequentially eliminate ions having undesired mobilities. The plurality of first and second path guard ion gates 512a-d, 516a-d allow for a plurality of ion packets to be pulsed into the first and second long separation/gating paths 510, 514 e.g., by the path selection switch 508, and simultaneously filtered, as discussed in connection with FIGS. 12A-14B, which increases the duty cycle of the fifth SLIM filter 500.

The ions that fully traverse the first or the second long separation/gating paths 510, 514 enter the exit region/path 518, which transfers the ions to the mass spectrometer 106, or other detection device, for analysis. The first and second long separation/gating paths 510, 514 operate in parallel, which increases the duty cycle of the fifth SLIM filter 500. Furthermore, additional long separation/gating paths can be implemented in parallel to the first and second long separation/gating paths 510, 514 as needed to further increase the duty cycle of the fifth SLIM filter 500.

Figure 21:
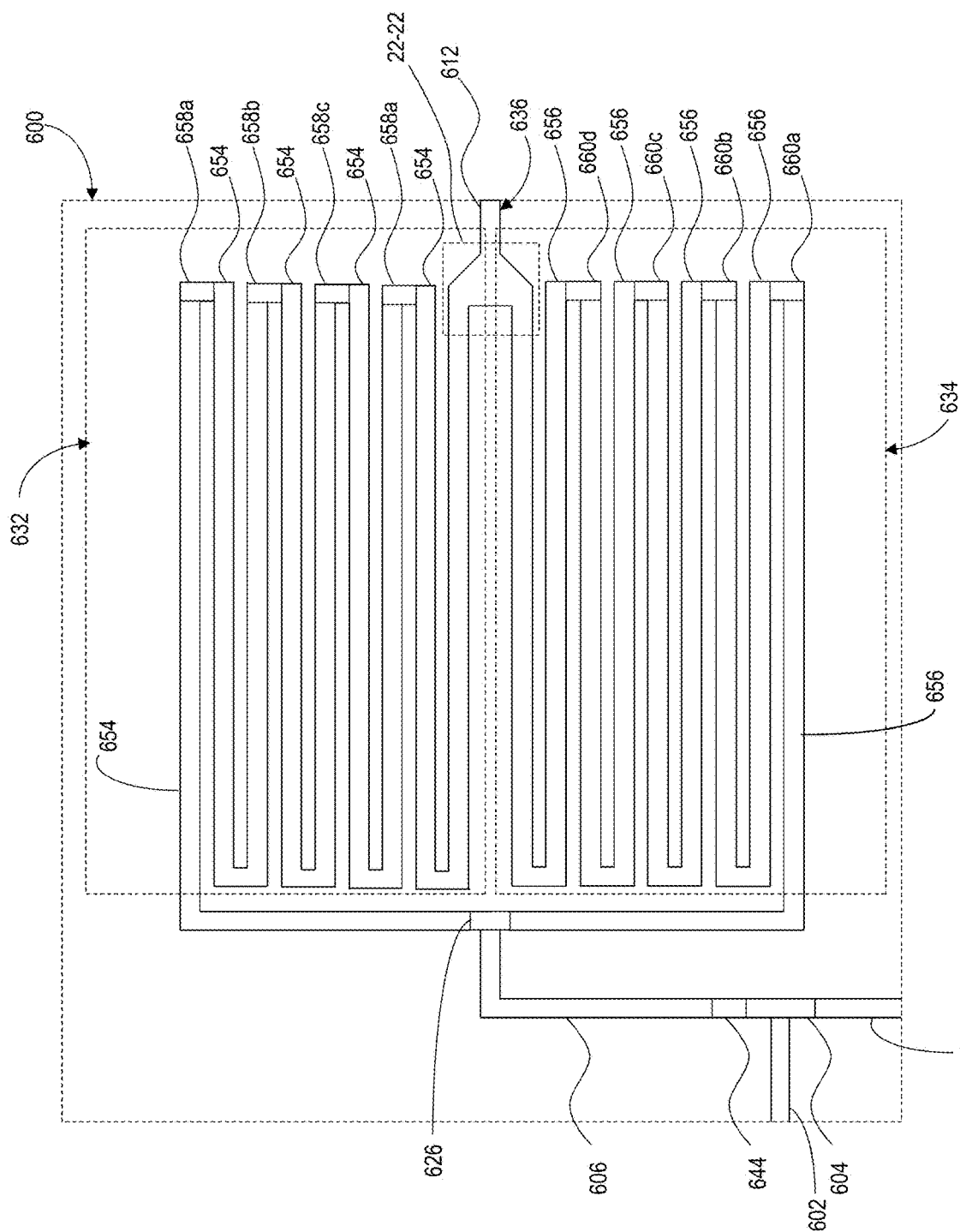
FIG. 21 is a schematic diagram of another exemplary embodiment of a SLIM filter of the present disclosure utilizing a plurality of guard gates.

FIG. 21 is a schematic diagram showing the regions of another exemplary SLIM filter 600 of the present disclosure utilizing a plurality of guard gates. The sixth SLIM filter 600 can be similar to the first SLIM filter 104 shown and described in connection with FIG. 4, for example, and function in a similar manner. However, the sixth SLIM filter 600 is configured to pre-filter ions prior to releasing the ions into first and second long separation/gating paths 654, 656, and can include an alternative exit region/path 636. For ease of comparing the sixth SLIM filter 600 and the first SLIM filter 104, some components of the sixth SLIM filter 600 that are similar to those of the first SLIM filter 104 are provided with the same reference numeral incremented by five-hundred. Accordingly, the functionality of the similar components need not be described in detail, instead, reference can be made to the corresponding description provided in connection with the SLIM filter 104, and any differences are detailed below.

The sixth SLIM filter 600 includes a pre-filter separation region 602, a pre-filter gate 604, an on-board accumulation region 644, a transfer region 606, a path selection switch 626, a discard region 608, a first separation/filter region 632, a second separation/filter region 634, and an exit region/path 636. The first separation/filter region 632 includes a first long separation/gating path 654 and a plurality of first path ion gates 658a-d. The second separation/filter region 634 includes a second long separation/gating path 656 and a plurality of second path ion gates 660a-d.

The pre-filter separation region 602 can be similar in construction and functionality to the pre-filter separation region 402 of the fourth SLIM filter 400 shown and described in connection with FIG. 17. That is, the pre-filter separation region 602 can transfer and separate ions based on mobility, and provide the separated ions to the pre-filter gate 604. The pre-filter gate 604 can function substantially in accordance with the pre-filter gate 404 of the fourth SLIM filter 400 shown and described in connection with FIG. 17. Specifically, the pre-filter gate 604 can be switchable between two different states wherein it receives and generates alternating opposite traveling waves. When in the first state, the pre-filter gate 604 can receive and generate a first waveform, e.g., a first traveling wave, that directs ions having an undesired mobility away from the on-board accumulation region 644 and to the discard region 608 for elimination. When in the second state, the pre-filter gate 604 can receive and generate a second waveform, e.g., a second traveling wave, that directs ions having a targeted mobility toward the on-board accumulation region 644 where they are accumulated. Alternatively, the pre-filter gate 604 can receive two opposing traveling waveforms simultaneously, and the magnitude of the two waveforms can dictate in which direction the ions flow, which is discussed in greater detail in connection with FIGS. 19A and 19B. Accordingly, the pre-filter gate 604 can switch between directing ions having a targeted mobility to the on-board accumulation region 644 and directing undesired ions to the discard region 608 to be eliminated. Thus, the pre-filter separation region 602 and the pre-filter gate 604 perform low resolution ion mobility separation and filtering, which increases the duty cycle of the sixth SLIM filter 600.

The on-board accumulation region 644 can function in accordance with the first and second on-board accumulation regions 144, 152 shown and described in connection with FIG. 4. In particular, the on-board accumulation region 644 accumulates ions and periodically releases/pulses the accumulated ions into the transfer region 606, which transfers the ions (e.g., without separating the ions) to the path selection switch 626, which alternatingly directs the ions received from the on-board accumulation region 644 into the first and second long separation/gating paths 654, 656 for high resolution ion mobility separation and filtering. The path selection switch 626 functions substantially in accordance with the path selection switch 126 shown and described in connection with FIG. 4, and can thus switch between providing ions to the first long separation/gating path 654 and the second long separation/gating path 656, e.g., by switching between oppositely directed traveling waves.

The first and second long separation/gating paths 654, 656 of the sixth SLIM filter 600 can be substantially similar to the first and second long separation/gating paths 154, 156 of the first SLIM filter 104 shown and described in connection with FIG. 4. In particular, the first long separation/gating path 654 includes the plurality of first path ion gates 658a-d that are periodically and spatially positioned along the first long separation/gating path 654, e.g., at every other bend thereof, and the second long separation/gating path 656 includes the plurality of second path ion gates 660a-d that are periodically and spatially positioned along the second long separation/gating path 656, e.g., at every other bend thereof. The plurality of first and second path ion gates 658a-d, 660a-d can be substantially similar to the plurality of first and second path ion gates 158a-d, 160a-d of the first SLIM filter 104 shown and described in connection with FIGS. 4 and 5.

In particular, each of the first and second path guard ion gates 658a-d, 660a-d can include a switchable DC guard electrode 162, as shown in FIG. 5, that can be switched between an attractive state where it generates an electric field that attracts and eliminates ions, e.g., undesired ions, and a repulsive state where it generates an electric field that repels ions and maintains the ions on the first or second long separation/gating paths 654, 656. Accordingly, the first and second long separation/gating paths 655, 656 can separate ions based on mobility, and the first and second path ion gates 658a-d, 660a-d can sequentially eliminate ions having undesired mobilities. The plurality of first and second path guard ion gates 658a-d, 660a-d allow for a plurality of ion packets to be pulsed into the first and second long separation/gating paths 654, 656, e.g., by the path selection switch 628, and simultaneously filtered, as discussed in connection with FIGS. 12A-14B, which increases the duty cycle of the sixth SLIM filter 600.

Figure 22:
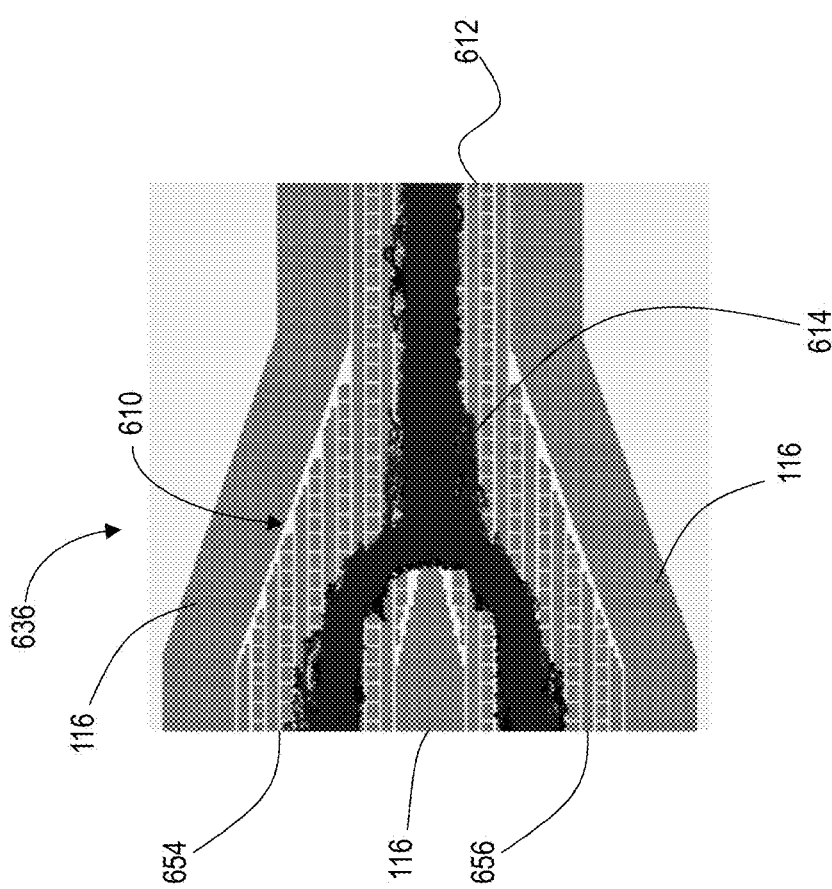
FIG. 22 is an enlarged view of Area 22-22 of FIG. 21 showing an exit junction of the SLIM filter of FIG. 21 where two paths combine and showing the ion flow paths.

The ions that fully traverse the first or the second long separation/gating paths 654, 656 enter the exit region/path 636, which is illustrated in greater detail in FIG. 22. As shown in FIG. 22, the exit region path 636 can include a gradual transition region 610 where the first and second long separation/gating paths 654, 656 can diagonally merge. In particular, additional rows of segmented electrodes and RF electrodes can be sequentially added so that the two paths 654, 656 gradually combine into a single exit path 612. DC guard electrodes 116 maintain the ions 614 within the first and second long separation/gating paths 654, 656, the gradual transition region 610, and the exit path 612. The exit path 612 transfers the ions to the mass spectrometer 106, or other detection device, for analysis.

The first and second long separation/gating paths 654, 656 operate in parallel, which increases the duty cycle of the sixth SLIM filter 600. Furthermore, additional long separation/gating paths can be implemented in parallel to the first and second long separation/gating paths 654, 656 as needed to further increase the duty cycle of the sixth SLIM filter 600.

Figure 23:
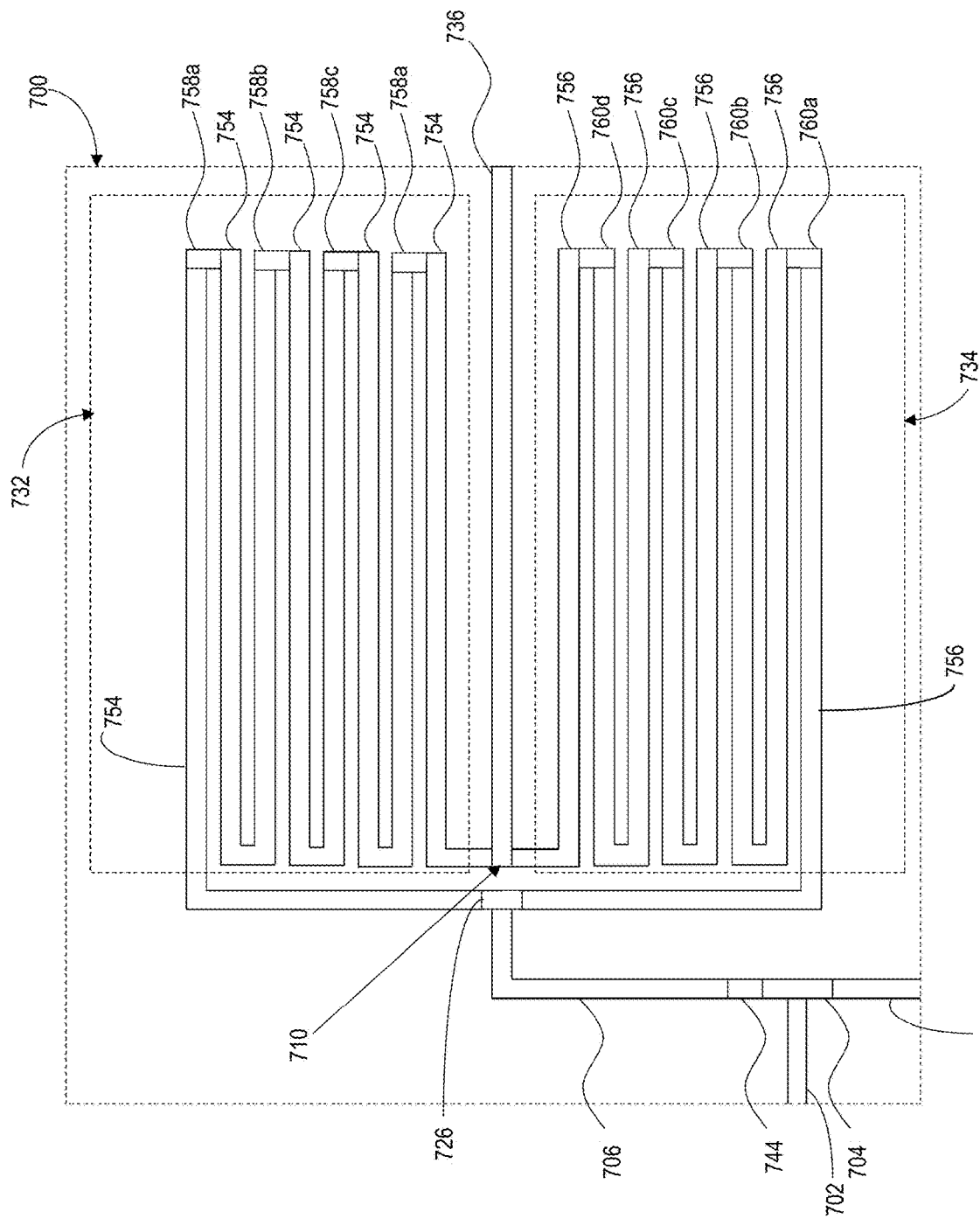
FIG. 23 is a schematic diagram of another exemplary embodiment of a SLIM filter of the present disclosure utilizing a plurality of guard gates.

FIG. 23 is a schematic diagram showing the regions of another exemplary SLIM filter 700 of the present disclosure utilizing a plurality of guard gates. The seventh SLIM filter 700 can be substantially similar to the sixth SLIM filter 600 shown and described in connection with FIG. 21, for example, and function in a similar manner. However, the seventh SLIM filter 700 includes an alternative exit region/path 736. For ease of comparing the sixth SLIM filter 600 and the seventh SLIM filter 700, components of the seventh SLIM filter 700 similar to those of the sixth SLIM filter 600 are provided with the same reference numeral incremented by one-hundred. Accordingly, the functionality of the similar components need not be described in detail, instead, reference can be made to the corresponding description provided in connection with the sixth SLIM filter 600, and any differences are detailed below.

Similar to the sixth SLIM filter 600, the seventh SLIM filter 700 includes a pre-filter separation region 702, a pre-filter gate 704, an on-board accumulation region 744, a transfer region 706, a path selection switch 726, a discard region 708, a first separation/filter region 732, a second separation/filter region 734, and an exit region/path 736. The first separation/filter region 732 includes a first long separation/gating path 754 and a plurality of first path ion gates 758a-d. The second separation/filter region 734 includes a second long separation/gating path 756 and a plurality of second path ion gates 760a-d.

However, instead of the gradual transition region 610, the first and second long separation/gating paths 754, 756 connect at a T-junction 710 with the exit region/path 736, which can be substantially similar to the exit region/path 136 of the SLIM filter 104 shown and described in connection with FIGS. 8A-F. That is, the exit region/path 736 can be positioned orthogonal to the first and second long separation/gating paths 754, 756, and can have a traveling wave applied thereto that travels in a direction perpendicular to the traveling wave applied to the portions of the first and second long separation/gating paths 754, 756 that connect with the exit region/path 736. Accordingly, the ions that pass though the SLIM filter 700 are transferred to the exit region/path 736 and directed to the mass spectrometer 106 by the exit region/path 736.

Figure 24:
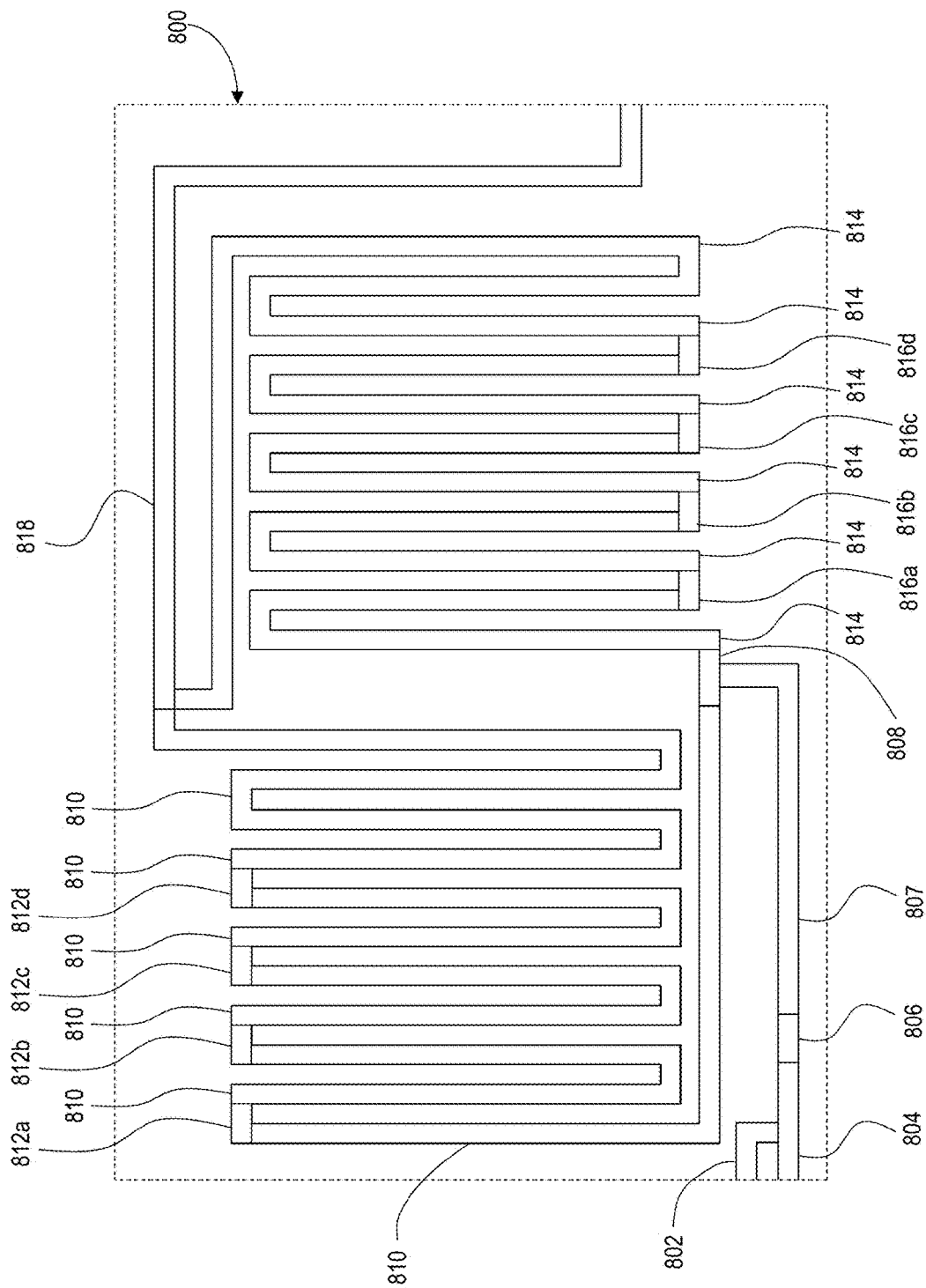
FIG. 24 is a schematic diagram of another exemplary embodiment of a SLIM filter of the present disclosure utilizing a plurality of guard gates.
Figure 25:
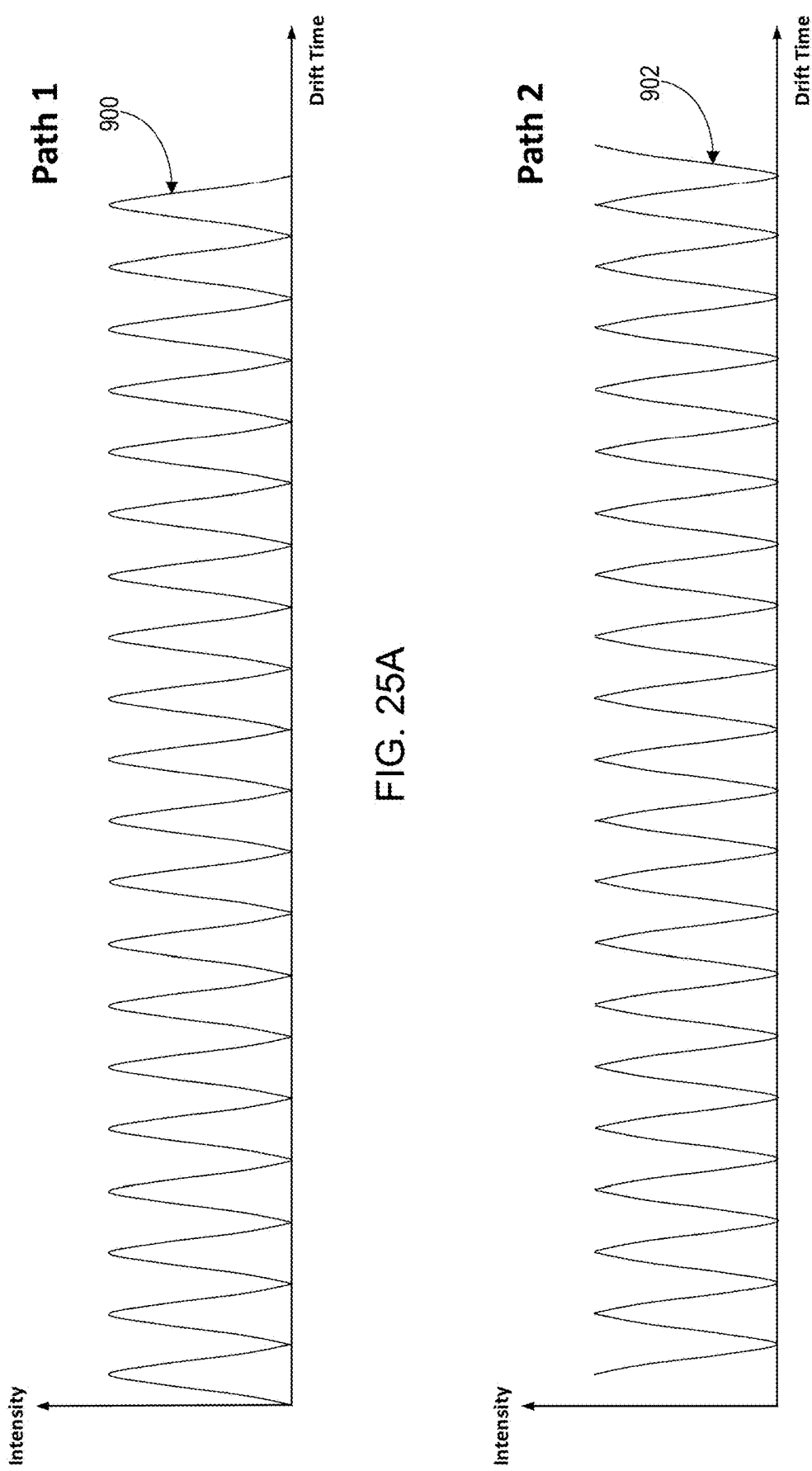
FIGS. 25A and B are plots of intensity versus drift time for first and second paths of a SLIM filter of the present disclosure receiving a constant stream of ions.

FIG. 24 is a schematic diagram showing the regions of another exemplary SLIM filter 800 of the present disclosure utilizing a plurality of guard gates. The eighth SLIM filter 800 includes a pre-filter separation region 802, a pre-filter gate 804, an on-board accumulation region 806, a transfer region 807, a path selection switch 808, a first long separation/gating path 810 that includes a plurality of first path ion gates 812a-d, a second long separation/gating path 814 that includes a plurality of second path ion gates 816a-d, and an exit region/path 818.

The pre-filter separation region 802 can receive ions from the ionization source 102 such that it functions similar to an entrance region/path, but can also be similar in construction and functionality to the first and second pre-filter separation regions 138, 146 of the first SLIM filter 104 shown and described in connection with FIG. 4. That is, the pre-filter separation region 802 can transfer and separate ions based on mobility, and provide the separated ions to the pre-filter gate 804. The pre-filter gate 804 can function substantially in accordance with the first and second path switches 140, 148 shown and discussed in connection with FIG. 4. Specifically, the pre-filter gate 804 can be switchable between two different states wherein it receives and generates alternating opposite traveling waves. When in the first state, the pre-filter gate 404 can receive and generate a first waveform, e.g., a first traveling wave, that directs ions having an undesired mobility away from the on-board accumulation region 806 for elimination. When in the second state, the pre-filter gate 804 can receive and generate a second waveform, e.g., a second traveling wave, that directs ions having a targeted mobility toward the on-board accumulation region 806 where they are accumulated. Alternatively, the pre-filter gate 804 can receive two opposing traveling waveforms simultaneously, and the magnitude of the two waveforms can dictate in which direction the ions flow, which is discussed in greater detail in connection with FIGS. 19A and 19B. Accordingly, the pre-filter gate 804 can switch between directing ions having a targeted mobility to the on-board accumulation region 806 and directing undesired ions to be eliminated. Thus, the pre-filter separation region 802 and the pre-filter gate 804 perform low resolution ion mobility separation and filtering, which increases the duty cycle of the eighth SLIM filter 800.

The on-board accumulation region 806 can function in accordance with the first and second on-board accumulation regions 144, 152 shown and described in connection with FIG. 4. In particular, the on-board accumulation region 806 accumulates ions and periodically releases/pulses the accumulated ions into the transfer region 807, which transfers the received ions (e.g., without separating the ions) to the path selection switch 808, which alternatingly directs the ions received from the on-board accumulation region 806 into the first and second long separation/gating paths 810, 814 for high resolution ion mobility separation and filtering. The path selection switch 808 functions substantially in accordance with the path selection switch 126 shown and described in connection with FIG. 4, and can thus switch between providing ions to the first long separation/gating path 810 and the second long separation/gating path 814, e.g., by switching between oppositely directed traveling waves.

The first and second long separation/gating paths 810, 814 are parallel paths that can have similar nonlinear configurations, and can be positioned adjacent to one another. Alternatively, the first and second long separation/gating paths 810, 814 can be nested within the turns of one another in alternating fashion, such as the first and second long separation/gating paths 410, 414 of the fourth SLIM filter 400 shown and described in connection with FIG. 18. Moreover, the first and second long separation/gating paths 810, 814 extend from the path selection switch 808 to the exit region/path 818, and include the first path ion gates 812a-d and the second path ion gates 816a-d positioned periodically within the respective path 810, 814. Accordingly, ions traversing the first long separation/gating path 810 must pass through all of the first path ion gates 812a-d in order to reach the exit region/path 818, and ions traversing the second long separation/gating path 814 must pass through all of the second path ion gates 816a-d in order to reach the exit region/path 818. The first and second long separation/gating paths 810, 814 can receive and generate a traveling wave that is configured to separate ions based on mobility, and the first and second path ion gates 812a-d, 816a-d are configured to filter ions based on mobility.

The first and second path ion gates 812a-d, 816a-d can be substantially similar to the first and second path ion gates 158a-c, 160a-c shown and described in connection with FIG. 4. In particular, each of the first and second path guard ion gates 812a-d, 816a-d can include a switchable DC guard electrode 162, as shown in FIG. 5, that can be switched between an attractive state where it generates an electric field that attracts and eliminates ions, e.g., undesired ions, and a repulsive state where it generates an electric field that repels ions and maintains the ions on the first or second long separation/gating paths 810, 814. Accordingly, the first and second long separation/gating paths 810, 814 can separate ions based on mobility, and the first and second path guard ion gates 812a-d, 816a-d can sequentially eliminate ions having undesired mobilities. The plurality of first and second path guard ion gates 812a-d, 816a-d allow for a plurality of ion packets to be pulsed into the first and second long separation/gating paths 810, 814 e.g., by the path selection switch 808, and simultaneously filtered, as discussed in connection with FIGS. 12A-14B, which increases the duty cycle of the eighth SLIM filter 800.

The ions that fully traverse the first or the second long separation/gating paths 810, 814 enter the exit region/path 818, which transfers the ions to the mass spectrometer 106, or other detection device, for analysis. The first and second long separation/gating paths 810, 814 operate in parallel, which increases the duty cycle of the SLIM filter 800. Furthermore, additional long separation/gating paths can be implemented in parallel to the first and second long separation/gating paths 810, 814 as needed to further increase the duty cycle of the eighth SLIM filter 800.

Figure 26:
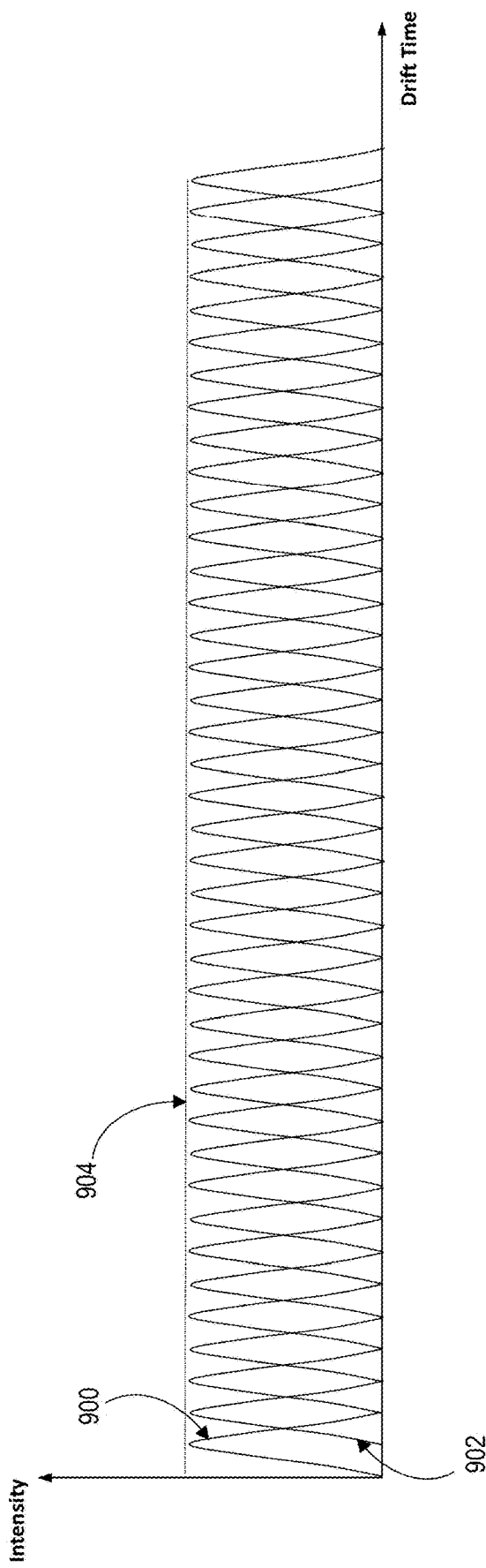
FIG. 26 is a plot of intensity versus drift time for first and second paths of a SLIM filter of the present disclosure operating in parallel.

FIG. 25A is a plot of intensity versus drift time for a first path of a SLIM filter of the present disclosure receiving a constant stream of ions and implementing multiplexing, and FIG. 25B is a plot of intensity versus drift time for a second path of a SLIM filter of the present disclosure receiving a constant stream of ions and implementing multiplexing. As shown in FIGS. 25A and 25B the intensity of ions received at the detector, e.g., the mass spectrometer 106, from each of the first and second paths, e.g., the first and second path signals 900, 902, follows a repeating pattern that oscillates between peaks of maximum intensity and valleys of zero intensity. As described above, the separation paths separate the ions based on mobilities, while the multiple gates sequentially filter the ions and remove the undesired ions from the SLIM filter. This allows for an increased duty cycle, which is demonstrated by the plurality of peaks, and overall increased positive intensity detections. However, there are still periods of low or zero intensity for each of the first and second paths. Additionally, the detector must dwell for the entire cycle, despite periods of lower or zero intensity. These issues can be addressed by having the first and second paths operate in parallel, as shown in FIG. 26, which is a plot of intensity versus drift time for first and second paths of a SLIM filter of the present disclosure operating in parallel, such as in the SLIM filter 104, and showing the total ion chromatogram signal 904. As can be seen in FIG. 26, by implementing parallel paths (e.g., the long path (parallel) mode of operation) and the multi-gate (multiple) mode of operation simultaneously the detector can receive a total ion chromatogram signal 904 that is constant and at a maximum intensity, thus providing 100% duty cycle. Additionally, this removes any time dependence of the detector since it is receiving a maximum signal at all times, and therefore does not have any wasted idle dwell time.

The duty cycle for a SLIM filter that implements the long path (parallel) mode of operation, the pre-filter (serial) mode of operation, and/or the multi-gate (multiplex) mode of operation, e.g., such as the SLIM filter 104 of FIG. 4, can be calculated using Equation 1, below:

$$\text{Duty Cycle} = \frac{t_{fill} \times \frac{1}{\%_{ion}} \times n_{packets} \times n_{paths}}{t_{separation}} \times 100\% \quad (1)$$

The variables of Equation 1 are defined as follows:

Duty Cycle=the % of ions of interest in incoming ion beam which are transmitted through the SLIM filter.

$t_{fill}$=the maximum time over which an ion trap can accumulate ions before deleterious space charge effects are observed if no pre-separation is performed.

$\%_{ion}$=the fraction of incoming ion beam charges selected by a pre-filter. For example, if 90% of the incoming ions are diverted or discarded, and the pre-selected or targeted ions correspond to 10% of the ion beam, then a 10× reduction in accumulated charges is achieved and an approximately 10× increase in the achievable fill time is potentially possible.

$n_{packets}$=the number of ion packets injected into the separation path during the separation period.

$n_{path}$=the number of separation paths operating in parallel.

$t_{separation}$=the time over which the ion mobility separation takes place. This can correspond, for example, to a period slightly longer than the arrival time for the slowest ion of interest traversing the separation path.

The duty cycle for exemplary SLIM filter configurations is shown in Table 1 below:

TABLE 1

| $t_{separation}$ (ms) | $t_{fill}$ (ms) | Charge reduction factor (1/% ion) | $n_{packets}$ | $n_{paths}$ | Duty Cycle (%) |
|---|---|---|---|---|---|
| 1000 | 10 | 1 | 1 | 1 | 1% |
| 1000 | 10 | 10 | 1 | 1 | 10% |
| 1000 | 10 | 100 | 1 | 1 | 100% |
| 1000 | 10 | 1 | 10 | 1 | 10% |
| 1000 | 10 | 1 | 100 | 1 | 100% |
| 1000 | 10 | 1 | 1 | 2 | 2% |
| 1000 | 10 | 1 | 1 | 10 | 10% |
| 1000 | 10 | 10 | 10 | 1 | 100% |
| 1000 | 10 | 10 | 5 | 2 | 100% |

As illustrated by Table 1, a standard SLIM filter that does not implement either the long path (parallel) mode of operation, the pre-filter (serial) mode of operation, nor the multi-gate (multiplex) mode of operation can have a duty cycle of 1%. In contrast, a SLIM filter, such as the SLIM filter 104 of FIG. 4 for example, that implements a pre-filter (serial) mode of operation with a charge reduction factor of 10, e.g., 10% of the ions introduced into the SLIM filter are accumulated (for example, 10% of the ions provided to the first pre-filter separation region/path 138 of the SLIM filter 104 are accumulated by the first path on-board accumulation region 144), has a duty cycle of 10%. If such a SLIM filter 104 has the charge reduction factor increased to 100, e.g., 1% of the ions introduced into the SLIM filter 104 are accumulated, the duty cycle is increased to 100%.

Alternatively, as illustrated by Table 1, a SLIM filter 104 that utilizes the multi-gate (multiplex) mode of operation and simultaneously filters ten (10) ion packets, e.g., ten (10) ion packets are simultaneously filtered by the first long separation/gating path 154 and associated first path ion gates 158a-c, has a duty cycle of 10%, whereas if that SLIM filter 104 were to simultaneously filter one-hundred (100) ion packets the duty cycle is increased to 100%. Furthermore, a SLIM filter 104 that utilizes the long path (parallel) mode of operation and includes two (2) parallel separation paths, e.g., the first and second long separation/gating paths 154, 156, has a duty cycle of 2%, whereas if that SLIM filter 104 were to be modified to have ten parallel separation paths the duty cycle increases to 10%. Still further, a SLIM filter 104 can implement two or more of the long path (parallel) mode of operation, the pre-filter (serial) mode of operation, and the multi-gate (multiplex) mode of operation to further increase the duty cycle without having to drastically alter any single characteristic, but to compound and leverage multiple smaller alterations. For example, a SLIM filter 104 that implements pre-filtering to achieve a charge reduction factor of ten (10), e.g., 10% of the ions introduced into the SLIM filter are accumulated, and implements multi-gate (multiplexing) to simultaneously filter ten (10) ion packets has a duty cycle of 100%. Alternatively, a SLIM filter 104 that implements pre-filtering to achieve a charge reduction factor of ten (10), e.g., 10% of the ions introduced into the SLIM filter are accumulated, implements two (2) parallel separation paths, and implements multi-gate (multiplexing) to simultaneously filter five (5) ion packets has a duty cycle of 100%.

It should also be understood that other methods and techniques can be implemented to determine the number of parallel paths, the number of simultaneously filtered ion packets, and the charge reduction factor necessary to achieve a 100% duty cycle. For example, a pseudorandom sequence can be implemented to determine how ion packets are introduced into the SLIM filter for separation during an ion mobility separation cycle, and the minimum number of ion packets can be determined therefrom.

Figures 27A, 27B:
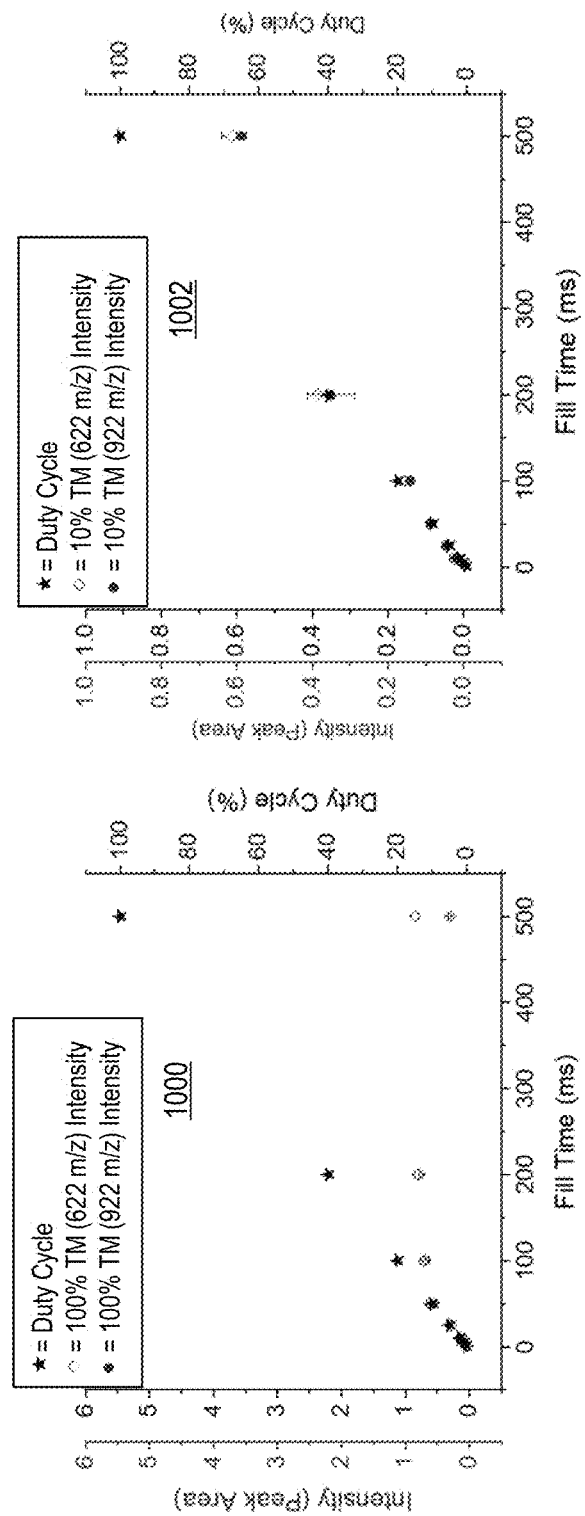
FIG. 27A is a plot of signal intensity (V) and duty cycle (%) as a function of on-board accumulation region fill time for 100% concentration Agilent™ 622 m/z ions and 100% concentration Agilent™ 922 m/z ions.
FIG. 27B is a plot of signal intensity (V) and duty cycle (%) as a function of on-board accumulation region fill time for 10% concentration Agilent™ 622 m/z ions and 10% concentration Agilent™ 922 m/z ions.

FIG. 27A is a plot 1000 of signal intensity (V) and duty cycle (%) as a function of first on-board accumulation region 144 fill time for 100% concentration Agilent™ 622 m/z ions and 100% concentration Agilent™ 922 m/z ions analyzed using the IMS system 100 with the SLIM filter 104 operating in a conventional IMS mode (e.g., spectrum mode) of operation with a 500 ms separation time. FIG. 27B is a plot 1002 of signal intensity (V) and duty cycle (%) as a function of first on-board accumulation region 144 fill time for 10% concentration Agilent™ 622 m/z ions and 10% concentration Agilent™ 922 m/z ions analyzed using the IMS system 100 with the SLIM filter 104 operating in the conventional IMS mode of operation with a 500 ms separation time. In the conventional IMS mode of operation, the ions are passed through the path selection switch 126, the first pre-filter region 128, and the first path switch 140 directly to the first on-board accumulation region 144 where they are accumulated/enriched and subsequently released into the long separation/gating path 154, 156 where they undergo ion mobility separation over a 500 ms separation time. That is, in the conventional IMS mode, the ions do not undergo pre-filtering via the pre-filter regions 128, 130 and path switches 140, 148, and are not filtered via the ion gates 158a-c, 160a-c. As shown in FIG. 27A, the signal intensity linearly increases in correlation with the increasing duty cycle (calculated as the on-board accumulation region 144 fill time divided by the separation time (500 ms)) until the signal intensities plateau, e.g., for fill times larger than 50 ms for the 100% Agilent™ 622 and 922 m/z ions, which indicates that the first on-board accumulation region 144 is saturated thus limiting the maximum duty cycle (e.g., ion utilization efficiency) to 15-20%. However, as shown in FIG. 27B, for 10% Agilent™ 622 and 922 m/z ions, 60-70% duty cycle can be attained by using a 500 ms first on-board accumulation region 144 fill time.

Figure 28:
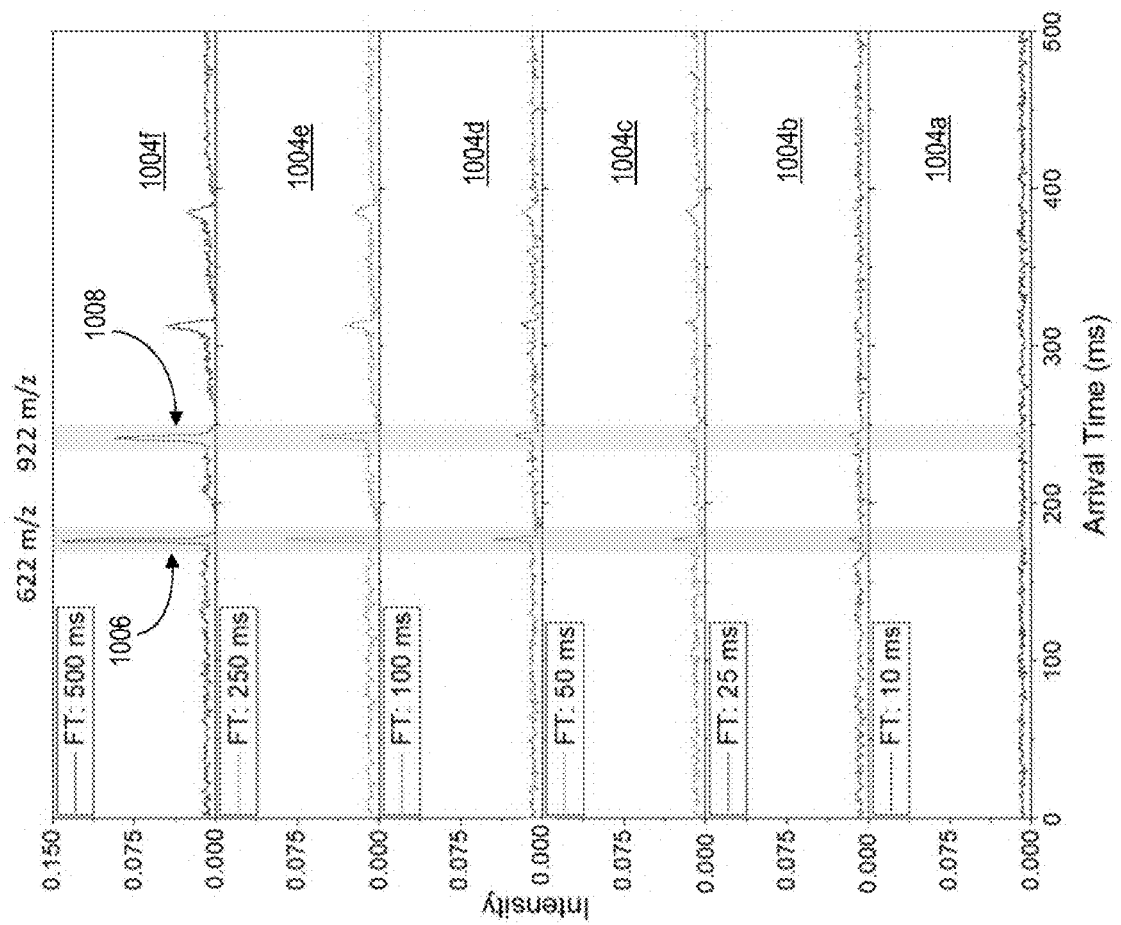
FIG. 28 is a set of plots corresponding to six different first on-board accumulation region fill times (10 ms, 25 ms, 50 ms, 100 ms, 250 ms, and 500 ms) and depicting mobiligrams of arrival time (ms) versus intensity (V) of 10% concentration Agilent™ 622 m/z ions and 922 m/z ions.

FIG. 28 is a set of plots 1004a-f corresponding to six different first on-board accumulation region 144 fill times (10 ms, 25 ms, 50 ms, 100 ms, 250 ms, and 500 ms) and depicting mobiligrams of arrival time (ms) versus intensity (V) of 10% concentration Agilent™ 622 m/z ions and 922 m/z ions that were analyzed using the IMS system 100 with the SLIM filter 104 operating in the conventional IMS mode of operation with a 500 ms separation time. A first band 1006 extending through the plots 1004a-f corresponds to the 622 m/z mobility peak and a second band 1008 extending through the plots 1004a-f corresponds to the 922 m/z mobility peak. As can be seen from FIG. 28, as the fill time and thus duty cycle increase, the signal intensity for the 622 m/z and 922 m/z ions also increases. As noted in connection with FIGS. 27A and 27B, a 60-70% duty cycle can be attained for 10% Agilent™ 622 and 99 m/z ions by using a 500 ms fill time. Accordingly, fills times and sample conditions can be optimized for better ion accumulation/enrichment to achieve a high duty cycle.

Figure 29A:
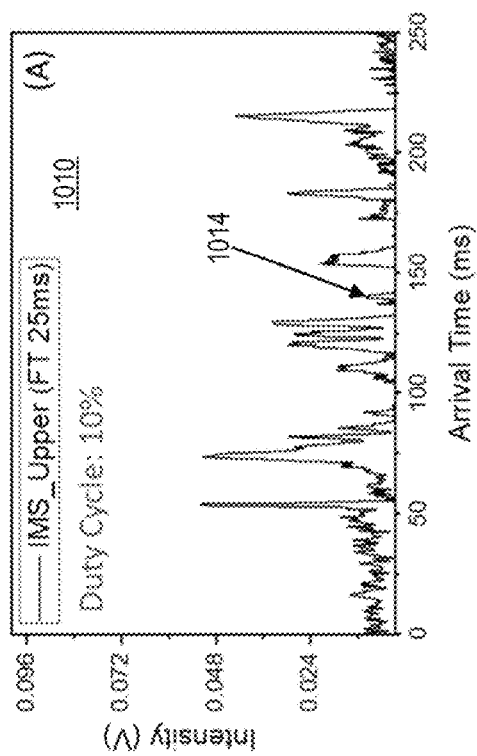
FIG. 29A is a total ion mobiligram plot of arrival time (ms) versus intensity (V) for a mixture sample of 775 nM reserpine, 500 nM 9 peptides, and 5% Agilent™.
Figure 29B:
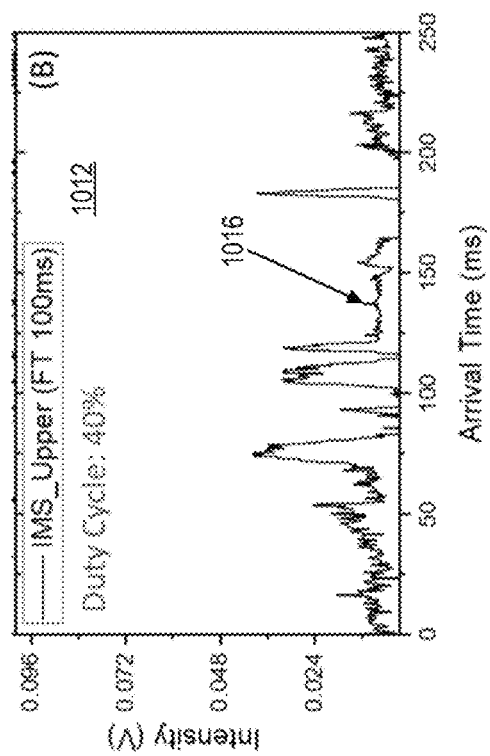
FIG. 29B is a total ion mobiligram plot of arrival time (ms) versus intensity (V) for a mixture sample of 775 nM reserpine, 500 nM 9 peptides, and 5% Agilent™.

FIG. 29A is a total ion mobiligram plot 1010 of arrival time (ms) versus intensity (V) for a mixture sample of 775 nM reserpine, 500 nM 9 peptides, and 5% Agilent™ analyzed using the IMS system 100 with the SLIM filter 104 operating in the conventional IMS mode of operation with a 250 ms separation time and a 25 ms first on-board accumulation region 144 fill time (e.g., a 10% duty cycle). FIG. 29B is a total ion mobiligram plot 1012 of arrival time (ms) versus intensity (V) for a mixture sample of 775 nM reserpine, 500 nM 9 peptides, and 5% Agilent™ analyzed using the IMS system 100 with the SLIM filter 104 operating in the conventional IMS mode of operation with a 250 ms separation time and a 100 ms first on-board accumulation region 144 fill time (e.g., a 40% duty cycle). As can be seen in FIG. 29A, for lower duty cycle settings, e.g., 10% or less, multiple mobility peaks are observed in the mobiligram with quality peak intensities, such as the reserpine mobiligram peak labelled as peak 1014. However, as shown in FIG. 29B, as the duty cycle is increased to 40% by increasing the fill time, the reserpine mobiligram peak is no longer observed as indicated by arrow 1016. This is because the space charge effect drives ion loss within the on-board accumulation regions 144, 148 due to the charge capacity constraint thereof for the complex mixture sample. Performance can be improved by increasing the volume of the on-board accumulation regions 144, 148 and/or reducing the sample complexity prior to accumulating ions, e.g., via the pre-filter regions 128, 130 including the first and second pre-filter separation regions/paths 138, 146 and the path switches 140, 148, as disclosed herein.

Figure 30:
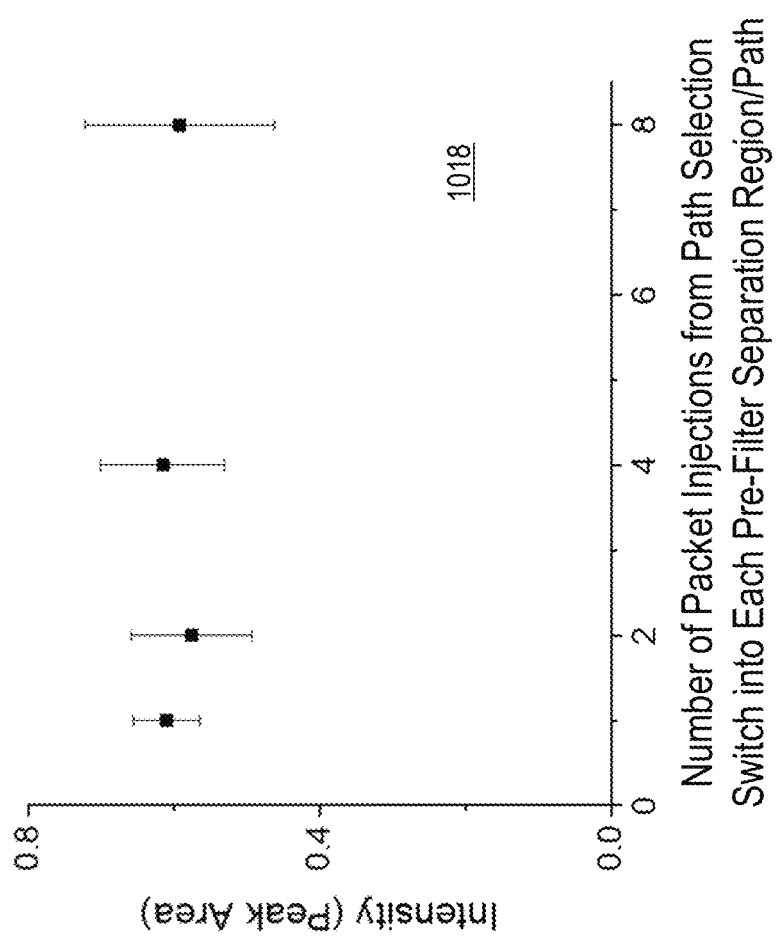
FIG. 30 is a chart of intensity (peak area) as a function of the number of path selection switch packet injections for 922 m/z target ions from a sample of 10% concentration Agilent™.

In particular, 100% duty cycle can be achieved with dual ion paths and various pre-filtering and ion enrichment settings, as shown in FIG. 30 and Table 2 below. FIG. 30 is a chart 1018 of intensity (peak area) as a function of the number of path selection switch 126 packet injections for 922 m/z target ions from a sample of 10% concentration Agilent™ analyzed using the IMS system 100 with the SLIM filter 104 operating with dual path separation, pre-filtering, and ion accumulation, with the characteristics shown in Table 2. The similar intensity levels shown in FIG. 30 for the different number of packet injections suggest a high duty cycle (e.g., 100%) operation is achievable under the appropriate pre-filtering conditions, which is also evident from Table 2.

TABLE 2

| Number of Packet Injections from Path Selection Switch 126 into Each Pre-Filter Separation Regions/Paths 138, 146. | Path Selection Switch 126 Fill Time | Separation Time (ms) | Calculated Duty Cycle (%) |
| --- | --- | --- | --- |
| 1 | 25 | 50 | 100 |
| 2 | 25 | 100 | 100 |
| 3 | 25 | 200 | 100 |
| 4 | 25 | 400 | 100 |

Figure 31B:
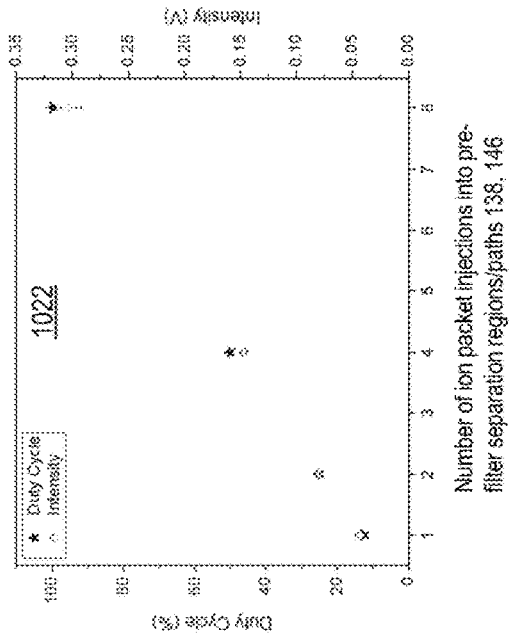
FIG. 31B is a plot of signal intensity (V) of 922 m/z ions and duty cycle (%) as a function of the number of ion packet injections in the pre-filter separation regions/paths.
Figure 31D:
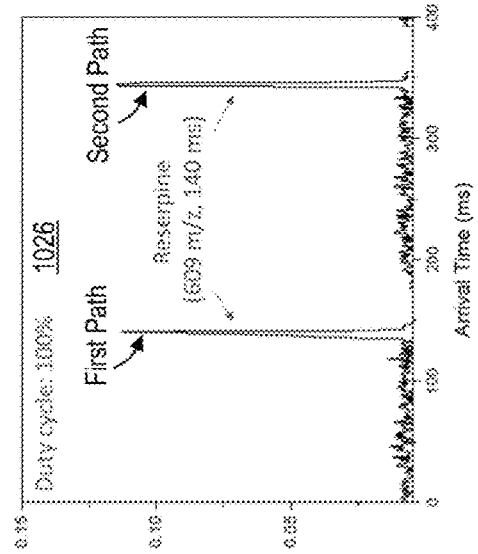
FIG. 31D is a mobiligram plot of arrival time (ms) versus intensity (V) for the mixture sample of FIG. 31C.
Figure 31A:
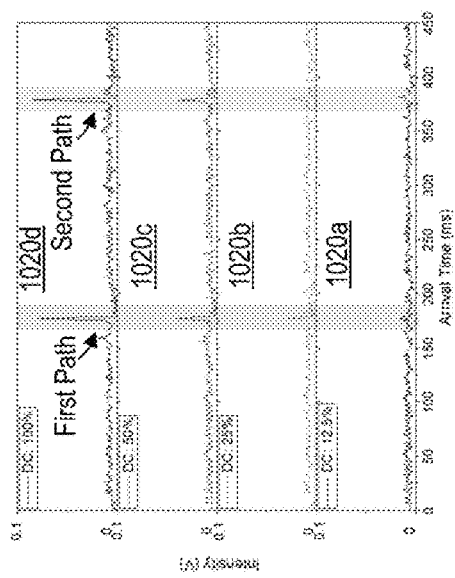
FIG. 31A is a set of plots depicting mobiligrams of arrival time (ms) versus intensity (V) of Agilent™ 922 m/z ions that were obtained for four different duty cycle settings (12.5% DC, 25% DC, 50% DC, and 100% DC)

FIG. 31A is a set of plots 1020a-d depicting mobiligrams of arrival time (ms) versus intensity (V) of Agilent™ 922 m/z ions that were obtained for four different duty cycle settings (12.5% DC—chart 1020a, 25% DC—chart 1020b, 50% DC—chart 1020c, and 100% DC—chart 1020d) of the SLIM filter 104 of FIG. 4 with an ion accumulation time of 400 ms for the first and second path on-board accumulation regions 144, 152 and a 25 ms fill time for the path selection switch 126. The different duty cycles are achieved based on the number of ion packets that are injected from the path selection switch 126 into each of the first and second pre-filter separation regions/paths 138, 146. For instance, one ion packet injection into each of the first and second pre-filter separation regions/paths 138, 146 results in a 12.5% duty cycle at least because the path selection switch 126 has a 50 ms accumulation/fill time (25 ms for each ion packet), two ion packet injections into each of the first and second pre-filter separation regions/paths 138, 146 results in a 25% duty cycle at least because the path selection switch 126 has a 100 ms accumulation/fill time (four periods of 25 ms), four ion packet injections into each of the first and second pre-filter separation regions/paths 138, 146 results in a 50% duty cycle at least because the path selection switch 126 has a 200 ms accumulation/fill time (eight periods of 25 ms), and eight ion packet injections into each of the first and second pre-filter separation regions/paths 138, 146 results in a 100% duty cycle at least because the path selection switch 126 has a 400 ms accumulation/fill time (sixteen periods of 25 ms). FIG. 31A shows nearly identical mobiligram peaks observed for the upper ion path (e.g., the first pre-filter region 128 and the first separation/filter region 132) and the lower ion path (e.g., the second pre-filter region 130 and the second separation/filter region 134) with increased peak intensity at higher duty cycles.

FIG. 31B is a plot 1022 of signal intensity (V) of 922 m/z ions and duty cycle (%) as a function of the number of ion packet injections in the pre-filter separation regions/paths 138, 146. As can be seen in FIG. 31B, the signal intensity improvement corresponds with the increases in duty cycle, which illustrates that there is no ion loss.

Figure 31C:
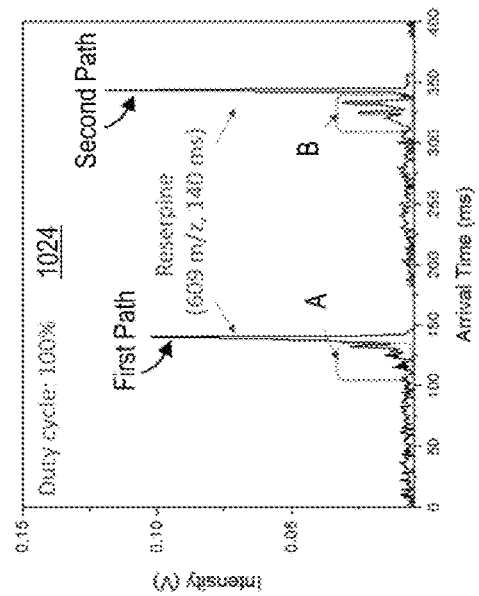
FIG. 31C is a mobiligram plot of arrival time (ms) versus intensity (V) for a mixture sample of 775 nM Resperine, 500 nM 9 peptides, and 5% Agilent™.

FIG. 31C is a mobiligram plot 1024 of arrival time (ms) versus intensity (V) for a mixture sample of 775 nM Resperine, 500 nM 9 peptides, and 5% Agilent™ separated in a SLIM filter 104 having an optimal path selection switch 126 that utilizes pre-filtering (e.g., pre-filter regions 128, 130 and path switches 140, 148) and on-board ion accumulation/enrichment (e.g., on-board accumulation regions 144, 152) with a 100% duty cycle. FIG. 31C illustrates that 100% duty cycle was achieved for the targeted reserpine ions; however, because the pre-filter regions 128, 130 have a fairly short path length (30 cm) and provide only low-resolution mobility filtering, several mobiligram peaks from interference ions were observed as shown in Areas A and B, which indicates that those ions were co-selected with the targeted reserpine ions by the path switches 140, 148 and enriched/accumulated in the on-board accumulation regions 144, 152. However, the interference ions can be filtered out by implementing the gates 158a-c, 160a-c within the first and second long separation/gating paths 154, 156 to perform high-resolution ion mobility filtering, as previously described. This is shown in FIG. 31D, which is a mobiligram plot 1026 of arrival time (ms) versus intensity (V) for the mixture sample of FIG. 31C analyzed in a SLIM filter 104 having an optimal path selection switch 126 that utilizes pre-filtering (e.g., with the pre-filter regions 128, 130 and path switches 140, 148), on-board ion accumulation/enrichment (e.g., with the on-board accumulation regions 144, 152), and multi-gate high-resolution ion mobility filtering (e.g., with the gates 158a-c, 160a-c) with a 100% duty cycle. Accordingly, precisely controlling the timing of the gates 158a-c, 160a-c can efficiently isolate the targeted reserpine ions.

Figure 32B:
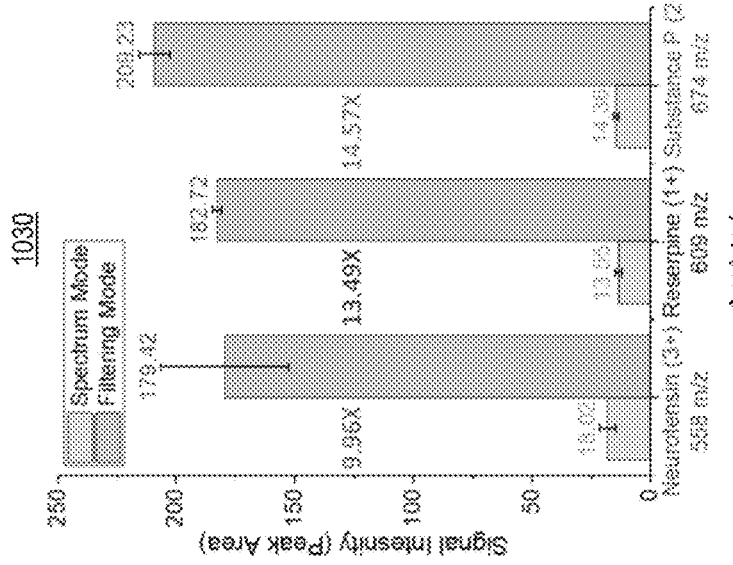
FIG. 32B is a graph of the signal intensity (peak area) for the mobiligrams of FIG. 32A comparing two different modes of operation.

As referenced at least in connection with FIG. 1, the high duty cycle and high-resolution SLIM filter 104 can be combined in tandem with the mass spectrometer 106, which can be a QQQ mass spectrometer, as part of the IMS system 100 such that ions that have been filtered based on mobility by the SLIM filter 104 can subsequently undergo mass-to-charge ratio filtering by the mass spectrometer 106. Accordingly, the IMS system 100 can provide two-dimensional filtering capability based upon ion mobility and mass-to-charge ratio information. The signal enhancement provided by the foregoing is illustrated in FIGS. 32A-C.

Figure 32A:
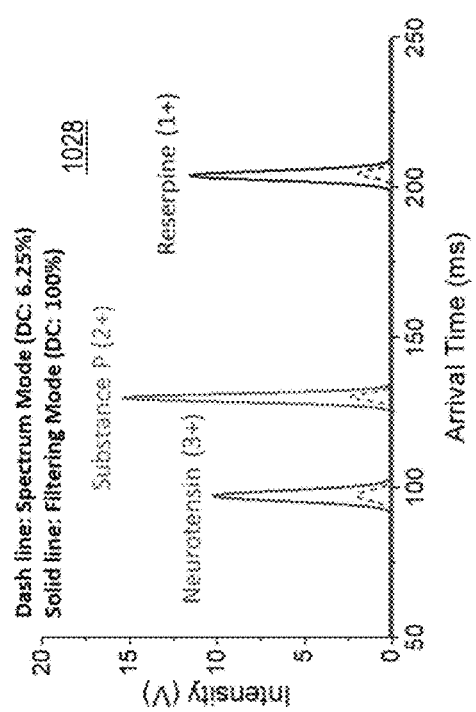
FIG. 32A is a mobiligram plot of arrival time (ms) versus intensity (V) for the peptides neurotensin (3+) and substance P (2+), and the drug molecule reserpine (1+)
Figure 32C:
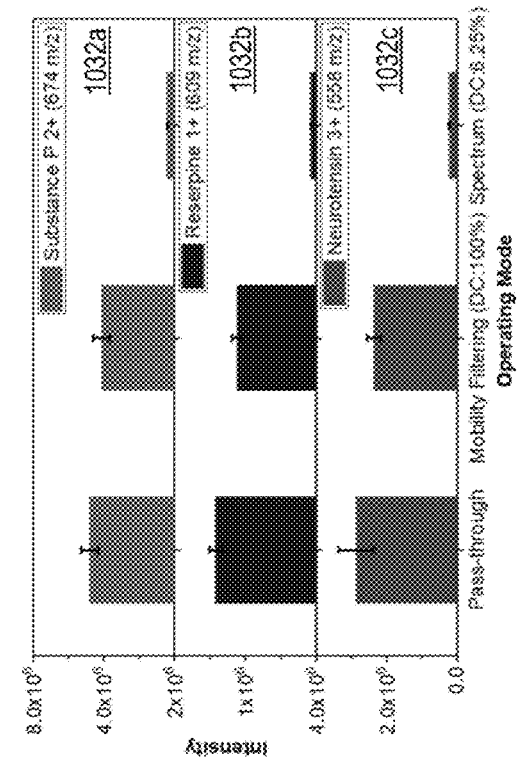
FIG. 32C is a set of flow injection analysis charts for each of neurotensin 3+ (558 m/z), reserpine 1+ (609 m/z), and substance P 2+ (674 m/z) illustrating the signal intensity of each for three different modes of operation.

FIG. 32A is a mobiligram plot 1028 of arrival time (ms) versus intensity (V) for the peptides neurotensin (3+) and substance P (2+), and the drug molecule reserpine (1+) analyzed using the IMS system 100 with the SLIM filter 104 operating in a mobility filtering mode of operation and a spectrum mode of operation. The mobility filtering mode involves pre-filtering (e.g., with the pre-filter regions 128, 130 and path switches 140, 148), on-board ion accumulation/enrichment (e.g., with the on-board accumulation regions 144, 152), and multi-gate high-resolution ion mobility filtering (e.g., with the gates 158a-c, 160a-c). For the generation of plot 1028, the mobility filtering mode was performed using the following criteria:

path selection switch 126 fill time=25 ms;
eight (8) ion packet injections from the path selection switch 126 into the pre-filter regions 128, 130;
long separation/gating path 154, 156 separation time=400 ms;
3.0 ms path switch 140, 148 delay for neurotensin (3+);
2.0 ms path switch 140, 148 duration for neurotensin (3+);
5.5 ms path switch 140, 148 delay for substance P (2+);
2.0 ms path switch 140, 148 duration for substance P (2+);
10 ms path switch 140, 148 delay for reserpine (1+); and
3 ms path switch 140, 148 duration for reserpine (1+).

In the spectrum mode, the ions are passed through to the on-board accumulation region 144, 152 where they are accumulated/enriched and subsequently released into the long separation/gating path 154, 156 where they undergo ion mobility separation. That is, in the spectrum mode, the ions do not undergo pre-filtering via the pre-filter regions 128, 130 and path switches 140, 148, and are not filtered via the ion gates 158a-c, 160a-c. For the generation of plot 1028, the spectrum mode was performed using the following criteria:

first on-board accumulation region fill time=25 ms; and
long separation/gating path 154 separation time=400 ms.

FIG. 32B is a graph 1030 of the signal intensity (peak area) for the mobiligrams of FIG. 32A comparing mobility filtering mode to spectrum mode. As can be seen from FIGS. 32A and 32B, the signal intensities are significantly greater in mobility filtering mode (the solid lines of FIG. 32A) compared to the spectrum mode (the dashed lines of FIG. 32A). In particular, the resulting signal intensities are improved by a factor of ~10 for neurotensin (3+) (558 m/z), and ~14 for reserpine (1+) (609 m/z) and substance P (2+) (674 m/z).

FIG. 32C is a set of flow injection analysis charts 1032a-c, one for each of neurotensin 3+ (558 m/z) (chart 1032c), reserpine 1+ (609 m/z) (chart 1032b), and substance P 2+ (674 m/z) (chart 1032a), illustrating the signal intensity of each for three different modes of operation of the SLIM filter 104. In particular, a flow injection analysis (FIA) of the SLIM filter 104 was conducted to compare the signal intensities of neurotensin 3+ (558 m/z), reserpine 1+ (609 m/z), and substance P 2+ (674 m/z) in pass-through mode (continuous transmission with no ion accumulation), mobility filtering mode, and spectrum mode. The FIA involved injecting a mixture sample of 774 nM reserpine, 500 nM 9 peptides, and 5% Agilent™ by an autosampler with 1 µL injection volume and 5 µL/min flow rate, and separating the ions with the SLIM device 104. The signal response was calculated by integrating the extracted ion chromatogram peak area. As can be seen in FIG. 32C, the signal intensities acquired in spectrum mode are approximately 5.4-7.9% of those obtained in pass-through mode for neurotensin 3+ (558 m/z), reserpine 1+ (609 m/z), and substance P 2+ (674 m/z), but are increased to 78.8-85.6% in the mobility filtering mode. The results of the foregoing test are shown in Table 3 below, and demonstrate that ~80% ion utilization efficiency has been achieved by the SLIM filter 104 for multiple standard peptides.

TABLE 3

| SLIM Filter Operating Mode | Duty Cycle (%) | Relative Intensity (%) | | |
|---|---|---|---|---|
| | | Neurotensin 3+ (588 m/z) | Reserpine 1+ (609 m/z) | Substance P 2+ (674 m/z) |
| Pass-through | 100 | 100 | 100 | 100 |
| Mobility Filtering | 100 | 84.88 | 78.81 | 85.64 |
| Spectrum | 6.25 | 7.85 | 5.44 | 7.93 |

Figure 33:
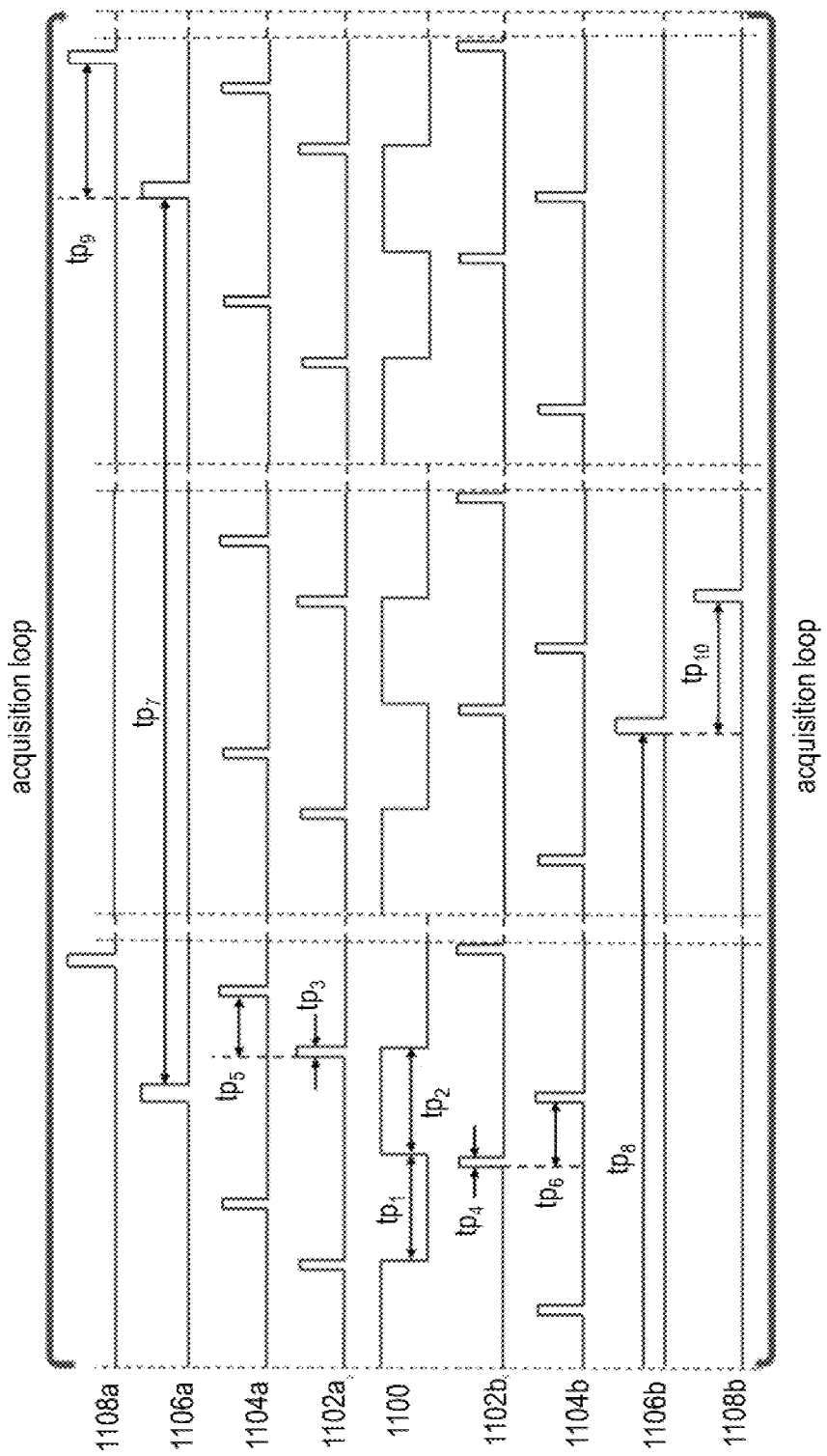
FIG. 33 is another exemplary timing control schematic diagram for signals applied to components of the first and second paths of the SLIM filter of the present disclosure.

FIG. 33 is another exemplary timing control schematic diagram for signals applied to components of the first and second paths of the SLIM filter 104, e.g., to the path selection switch 126, the first path switch 140, the first on-board accumulation region 144, a first path ion gate 158a, the second path switch 148, the second on-board accumulation region 152, and a second path ion gate 160a. Signal 1100 represents the direction of travel for the traveling wave of the path selection switch 126 with a high signal representing that the traveling wave travels in the direction of the first pre-filter separation region 138 and a low signal representing that the traveling wave travels in the direction of the second pre-filter separation region 146. Accordingly, time period $tp_1$ represents the first path fill time for the path selection switch 126 and time period $tp_2$ represents the second path fill time for the path selection switch 126.

Signals 1102a and 1102b respectively represent the state of the first (upper) and second (lower) path gate electrodes of the path selection switch 126 with a low signal representing that the high DC potential is applied to the respective gate electrodes such that the path selection switch 126 is in an accumulation state, and a high signal representing that the high DC potential has been removed from the respective gate electrodes such that the path selection switch 126 is in a release state and the accumulated ions are being released into the adjacent pre-filter separation region 138, 146. Time period $tp_3$ represents the path selection switch 126 gate release time for the first (upper) path gate electrodes, e.g., the time period for which the high DC potential has been removed from the first path gate electrodes. Time period $tp_4$ represents the path selection switch 126 gate release time for the second (lower) path gate electrodes, e.g., the time period for which the high DC potential has been removed from the second (lower) path gate electrodes.

Signals 1104a and 1104b respectively represent the state of the first (upper) and second (lower) path switches 140, 148 with a low signal representing that the path switch 140, 148 is directing ions toward the respective first (upper) and second (lower) discard region/ion detector 142, 150 and a high signal representing that the path switch 140, 148 is directing ions toward the respective first (upper) and second (lower) on-board accumulation region 144, 152. Time period $tp_5$ represents the first (upper) path switch 140 arrival time delay, e.g., the time between releasing ions from the path selection switch 126 into the first (upper) pre-filter separation region 138 and switching the signal applied to the first (upper) path switch 140 to provide ions to the first (upper) on-board accumulation region 144. Time period $tp_6$ represents the second (lower) path switch 148 arrival time delay, e.g., the time between releasing ions from the path selection switch 126 into the second (lower) pre-filter separation region 146 and switching the signal applied to the second (lower) path switch 148 to provide ions to the second (lower) on-board accumulation region 152.

Signals 1106a and 1106b respectively represent the state of the first (upper) and second (lower) on-board accumulation regions 144, 152 with a low signal representing that the on-board accumulation region 144, 152 is in an accumulation or enrichment state such that it is accumulating ions and a high signal representing that the on-board accumulation region 144, 152 is in a release state whereby ions are being released into the respective first (upper) and second (lower) separation/gating path 154, 156. Time period $tp_7$ represents the targeted ion accumulation/enrichment time period for the first (upper) on-board accumulation region 144, with the amount of ions accumulated depending upon the number of high states for signal 1104a that fall within time period $tp_7$. Time period $tp_8$ represents the targeted ion accumulation/enrichment time period for the second (lower) on-board accumulation region 152, with the amount of ions accumulated depending upon the number of high states for signal 1104b that fall within time period $tp_8$.

Signals 1108a and 1108b respectively represent the state of the first (upper) path ion gate 158a and the second (lower) path ion gate 160a with a lower signal representing that the ion gate 158a, 160a is in an ion transmission state whereby ions are permitted to pass and a high signal representing that the ion gate 158a, 160a is in a filtering state whereby ions are filtered thereby. Time period $tp_9$ represents the first (upper) path ion gate 158a arrival time delay, e.g., the time period between release of ions from the first (upper) on-board accumulation region 144 and filtering of ions with the first (upper) path ion gate 158a. Time period $tp_{10}$ represents the second (lower) path ion gate 160a arrival time delay, e.g., the time period between release of ions from the second (lower) on-board accumulation region 152 and filtering of ions with the second (lower) path ion gate 160a. FIG. 29 shows the implementation of only a single ion gate 158a, 160a for each of the first (upper) and second (lower) separation/gating paths 154, 156, however, it should be understood that additional ion gates 158a-c, 160a-c can be implemented in similar fashion and in accordance with the foregoing disclosure.

As shown in FIG. 33, signals 1100, 1102a-b, 1104a-b, 1106a-b, and 1108a-b can be continuously repeated in an acquisition loop as many times as needed for a given analysis.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor can receive instructions and data from a read-only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. An apparatus for ion manipulation having improved duty cycle, comprising:
   a first separation region configured to receive ions and generate a first traveling drive potential;
   a second separation region configured to receive ions and generate a second traveling drive potential; and
   a switch configured to receive ions and alternate between generating a first electric field and a second electric field, the first electric field configured to guide a first portion of the ions toward the first separation region and the second electric field configured to guide a second portion of the ions toward the second separation region,
   wherein the first separation region is positioned between the switch and an exit region, and the first traveling drive potential is configured to guide the first portion of the ions to the exit region through the first separation region and separate the first portion of the ions based on mobility of the ions during a first separation time period, wherein the second separation region is positioned between the switch and the exit region, and the second traveling drive potential is configured to guide the second portion of the ions to the exit region through the second separation region and separate the second portion of the ions based on mobility of the ions during a second separation time period, wherein the first separation time period and the second separation time period at least partially overlap.

2. The apparatus of claim 1, wherein the switch is configured to accumulate the first portion of the ions prior to generating the first electric field, and accumulate the second portion of the ions prior to generating the second electric field.

3. The apparatus of claim 1, comprising a pre-filter region and an accumulation region positioned between the switch and the first separation region, wherein the pre-filter region is configured to receive the first portion of the ions from the switch and perform a first ion mobility filtering operation on the first portion of the ions to separate the first portion of the ions into a first group of ions and a second group of ions based on mobility of the ions, wherein the accumulation region is configured to receive the first group of ions from the pre-filter region, accumulate the first group of ions into a packet, and release the packet into the first separation region, the first separation region configured to separate the ions based on mobility of the ions, and wherein the pre-filter region is configured to selectively reduce the amount of ions provided to the accumulation region and increase the amount of time the accumulation region can accumulate ions.

4. The apparatus of claim 3, wherein the pre-filter region includes a separation path and a pre-filter switch, the separation path positioned between the switch and the pre-filter switch and the pre-filter switch positioned between the separation path and the accumulation region.

5. The apparatus of claim 4, wherein the separation path is configured to generate a third traveling drive potential, the third traveling drive potential configured to separate the ions based on mobility of the ions, and wherein the pre-filter switch is configured to be operable in a first mode of operation wherein the pre-filter switch transfers the first group of ions entering the pre-filter switch from the separation path to the accumulation region, and a second mode of operation wherein the pre-filter switch transfers the second group of ions entering the pre-filter switch from the separation path to a discard region.

6. The apparatus of claim 1, comprising a pre-filter region, an accumulation region, and a transfer region, wherein the pre-filter region is configured to receive a plurality of ions and perform a first ion mobility filtering operation on the plurality of ions to separate the ions into a first group of ions and a second group of ions based on mobility of the ions, wherein the accumulation region is configured to receive the first group of ions from the pre-filter region, accumulate the first group of ions into one or more ion packets, and release the one or more ion packets into the transfer region, the transfer region configured to transfer the one or more ion packets to the switch, wherein the pre-filter region is configured to reduce the amount of ions provided to the accumulation region and increase the amount of time the accumulation region can accumulate ions.

7. A method of ion manipulation having improved duty cycle, comprising:

providing a first plurality of ions to an ion manipulation device having a first separation region, a second separation region, a switch configured to receive ions and alternate between guiding ions to the first separation region and the second separation region, and an exit region, the first separation region and the second separation region being positioned between the switch and the exit region;

receiving, at the switch, the first plurality of ions, guiding, by the switch, the first plurality of ions to the first separation region;

providing a second plurality of ions to the ion manipulation device;

receiving, at the switch, the second plurality of ions;

guiding, by the switch, the second plurality of ions to the second separation region;

separating, by the first separation region, the first plurality of ions based on mobility of the ions during a first separation time period; and separating, by the second separation region, the second plurality of ions based on mobility of the ions during a second separation time period that at least partially overlaps the first separation time period.

8. The method of claim 7, wherein the switch is configured to alternate between generating a first electric field and a second electric field, wherein the step of guiding, by the switch, the first plurality of ions to the first separation region, comprises:

applying a first voltage signal to the switch; and generating, by the switch, the first electric field based on the first voltage signal, the first electric field guiding the first plurality of ions to the first separation region, and wherein the step of guiding, by the switch, the second plurality of ions to the second separation region, comprises:

applying a second voltage signal to the switch; and generating, by the switch, the second electric field based on the second voltage signal, the second electric field guiding the second plurality of ions to the second separation region.

9. The method of claim 8, wherein the first electric field comprises a first traveling drive potential, and the second electric field comprises a second traveling drive potential.

10. The method of claim 7, wherein the first separation region is configured to generate a first traveling drive potential and the second separation region is configured to generate a second traveling drive potential, wherein the step of separating, by the first separation region, the first plurality of ions based on mobility of the ions, comprises:

applying a first voltage signal to the first separation region; and generating, by the first separation region, the first traveling drive potential based on the first voltage signal, the first traveling drive potential guiding the first plurality of ions through the first separation region to the exit region and separating the ions based on mobility of the ions during the first separation time period, and wherein the step of separating, by the second separation region, the second plurality of ions based on mobility of the ions, comprises:
applying a second voltage signal to the second separation region; and
generating, by the second separation region, the second traveling drive potential based on the second voltage signal, the second traveling drive potential guiding the second plurality of ions through the second separation region to the exit region and separating the ions based on mobility of the ions during the second separation time period that at least partially overlaps the first separation time period.

11. The method of claim 7, comprising:
accumulating, by the switch, the first plurality of ions prior to guiding, by the switch, the first plurality of ions to the first separation region; and
accumulating, by the switch, the second plurality of ions prior to guiding, by the switch, the second plurality of ions to the second separation region.

12. The method of claim 7, comprising:
providing the ion manipulation device with a pre-filter region and an accumulation region positioned between the switch and the first separation region;
receiving, at the pre-filter region, the first plurality of ions from the switch;
filtering, by the pre-filter region, the first plurality of ions into a first group of ions and a second group of ions based on mobility of the ions,
receiving, at the accumulation region, the first group of ions;
accumulating, by the accumulation region, the first group of ions into an ion packet;
releasing the ion packet into the first separation region; and
separating, by the first separation region, the ions of the ion packet based on mobility of the ions.

13. The method of claim 12, wherein the pre-filter region is configured to selectively reduce the amount of ions received by the accumulation region and increase the amount of time the accumulation region accumulates ions for.

14. The method of claim 12, wherein the pre-filter region includes a separation path and a pre-filter switch, the separation path positioned between the switch and the pre-filter switch and the pre-filter switch positioned between the separation path and the accumulation region.

15. The method of claim 14, comprising:
applying a first voltage signal to the separation path;
generating, by the separation path, a first traveling drive potential based on the first voltage signal, the first traveling drive potential separating the first plurality of ions based on mobility of the ions;
operating the pre-filter switch in a first mode of operation;
transferring, by the pre-filter switch operating in the first mode of operation, the first group of ions entering the pre-filter switch from the separation path to the accumulation region,
operating the pre-filter switch in a second mode of operation; and
transferring, by the pre-filter switch operating in the second mode of operation, the second group of ions entering the pre-filter switch from the separation path to a discard region.

16. The method of claim 12, wherein the ion manipulation device includes a plurality of gates positioned along the first separation region, the plurality of gates configured to successively filter ions based on mobility.

17. The method of claim 7, comprising:
receiving, at a pre-filter region of the ion manipulation device, the plurality of ions,
filtering, by the pre-filter region, the plurality of ions to separate the plurality of ions into a first group of ions and a second group of ions based on mobility of the ions;
receiving, at an accumulation region of the ion manipulation device, the first group of ions;
accumulating, by the accumulation region, the first group of ions into one or more ion packets;
releasing the one or more ion packets from the accumulation region into a transfer region of the ion manipulation device; and
transferring, by the transfer region, the one or more ion packets to the switch.

18. The method of claim 17, wherein the pre-filter region is configured to reduce the amount of ions received by the accumulation region and increase the amount of time the accumulation region can accumulate ions.

* * * * *